(12) United States Patent
Hanada et al.

(10) Patent No.: US 10,033,890 B2
(45) Date of Patent: Jul. 24, 2018

(54) DISPLAY INPUT DEVICE FOR CREATING AND REGISTERING A WORKFLOW AND IMAGE FORMING DEVICE EQUIPPED WITH THE SAME

(71) Applicant: KYOCERA Document Solutions Inc., Osaka (JP)

(72) Inventors: Naoto Hanada, Osaka (JP); Dai Shigenobu, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/303,003

(22) PCT Filed: Mar. 30, 2015

(86) PCT No.: PCT/JP2015/059829
§ 371 (c)(1),
(2) Date: Oct. 10, 2016

(87) PCT Pub. No.: WO2015/156159
PCT Pub. Date: Oct. 15, 2015

(65) Prior Publication Data
US 2017/0070624 A1  Mar. 9, 2017

(30) Foreign Application Priority Data

Apr. 9, 2014  (JP) ................. 2014-080190
Apr. 9, 2014  (JP) ................. 2014-080194
(Continued)

(51) Int. Cl.
*H04N 1/00* (2006.01)
*G03G 15/00* (2006.01)

(52) U.S. Cl.
CPC ....... *H04N 1/00506* (2013.01); *G03G 15/502* (2013.01); *H04N 1/00408* (2013.01);
(Continued)

(58) Field of Classification Search
CPC combination set(s) only.
See application file for complete search history.

(56) References Cited

U.S. PATENT DOCUMENTS 9,191,531 B2 * 11/2015 Shigenobu ......... H04N 1/00411
9,727,280 B2 *  8/2017 Choi ..................... G06F 3/1205
(Continued)

FOREIGN PATENT DOCUMENTS

JP  2012-243203 A  12/2012
JP  2013-140600 A   7/2013
(Continued)

*Primary Examiner* — Barbara Reinier
(74) *Attorney, Agent, or Firm* — Hawaii Patent Services; Nathaniel K. Fedde; Kenton N. Fedde

(57) ABSTRACT

A display input device is provided that is capable of improving user convenience. A control part of the display input device causes a display input part to display a workflow creation and registration screen, which is prepared for creating and registering a workflow, to receive operations for creating and registering the workflow, the workflow being a combination of basic and combination functions and including data that is indicative of each of a first function that is the basic function selected as a function to be registered, a setting content of the first function, a second function that is the combination function selected as a function to be registered, and a setting content of the second function.

15 Claims, 27 Drawing Sheets

(30) Foreign Application Priority Data

Apr. 9, 2014 (JP) ................................ 2014-080199
Apr. 9, 2014 (JP) ................................ 2014-080203
Apr. 9, 2014 (JP) ................................ 2014-080211

(52) U.S. Cl.
CPC ..... *H04N 1/00411* (2013.01); *H04N 1/00424* (2013.01); *H04N 1/00474* (2013.01); *G03G 2215/0132* (2013.01); *H04N 2201/0094* (2013.01)

(56) References Cited

U.S. PATENT DOCUMENTS

| | | | |
|---|---|---|---|
| 2006/0028690 A1* | 2/2006 | Kunori | H04N 1/00408 358/401 |
| 2009/0009795 A1* | 1/2009 | Kong | H04N 1/00222 358/1.15 |
| 2011/0313934 A1* | 12/2011 | Van Roy | G06Q 10/10 705/301 |
| 2012/0033255 A1 | 2/2012 | Touyamasaki et al. | |
| 2012/0050781 A1 | 3/2012 | Morita | |
| 2012/0243028 A1* | 9/2012 | Dumitrescu | G06F 3/1204 358/1.15 |
| 2012/0300253 A1 | 11/2012 | Omori | |
| 2013/0107314 A1* | 5/2013 | Steely | G06F 3/1204 358/1.15 |
| 2014/0071487 A1 | 3/2014 | Sato | |

FOREIGN PATENT DOCUMENTS

| | | |
|---|---|---|
| JP | 2013-225871 A | 10/2013 |
| JP | 2014-027454 A | 2/2014 |
| JP | 2014-056488 A | 3/2014 |

\* cited by examiner

FIG.23
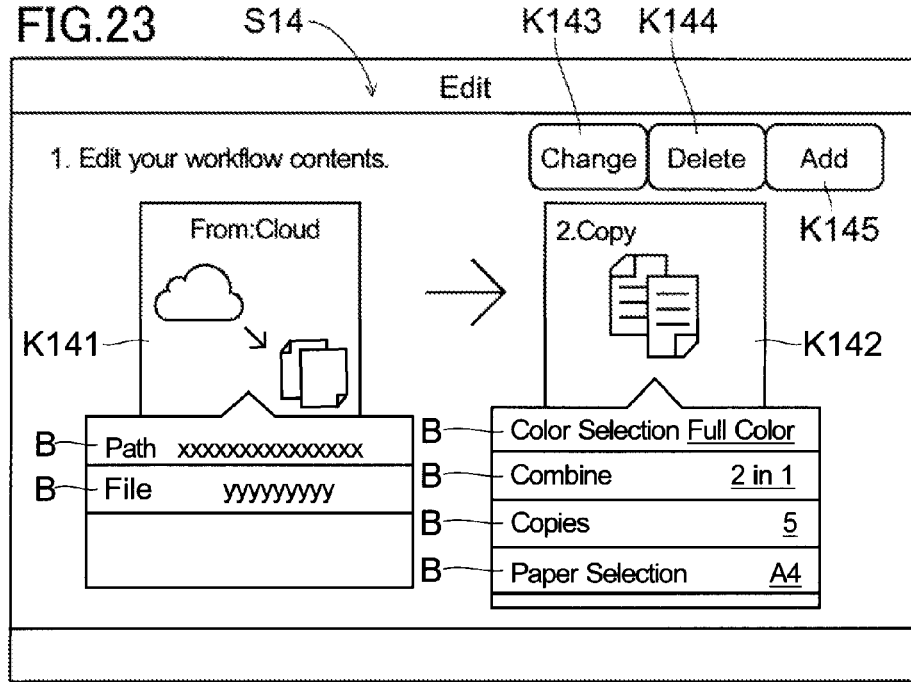
FUNCTION REARRANGEMENT
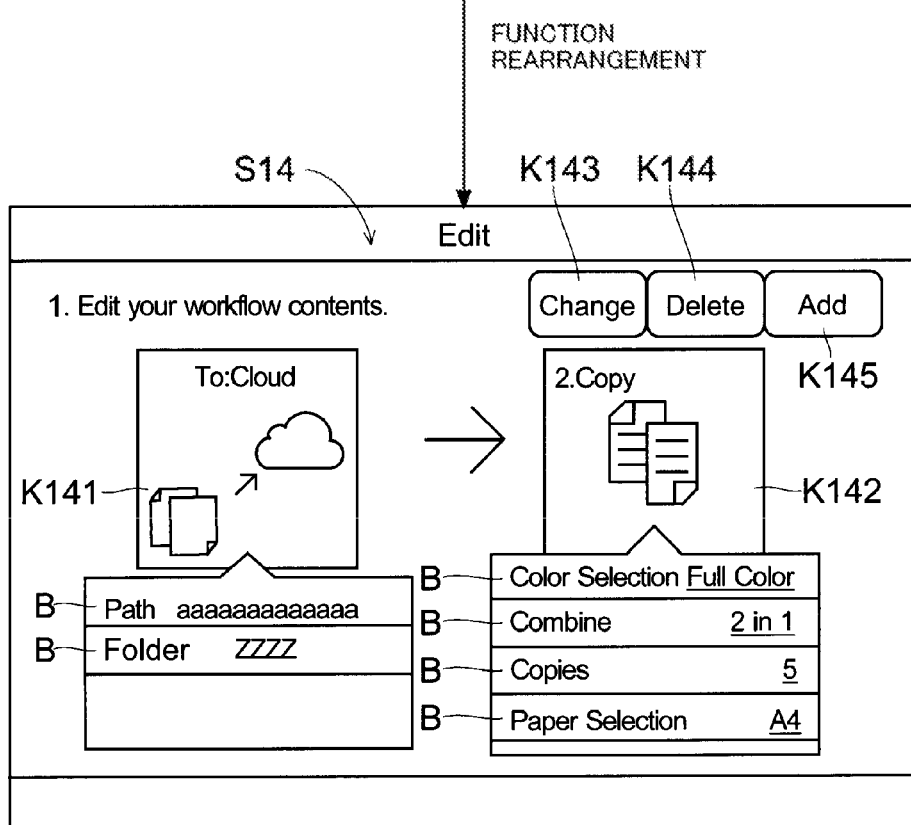

FIG.24
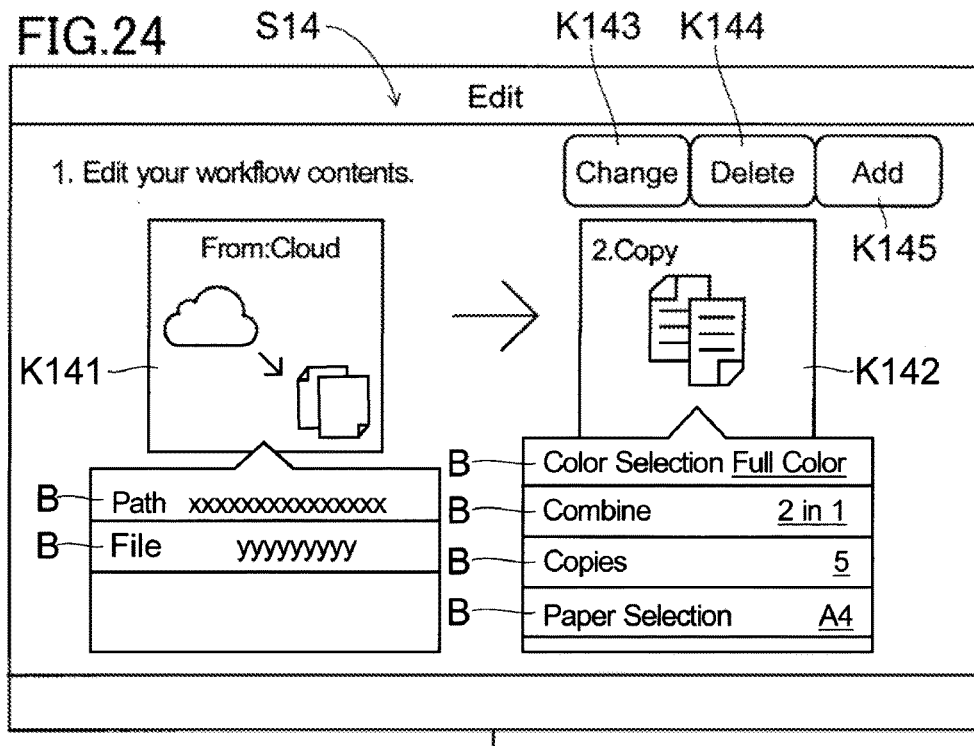
FUNCTION DELETION
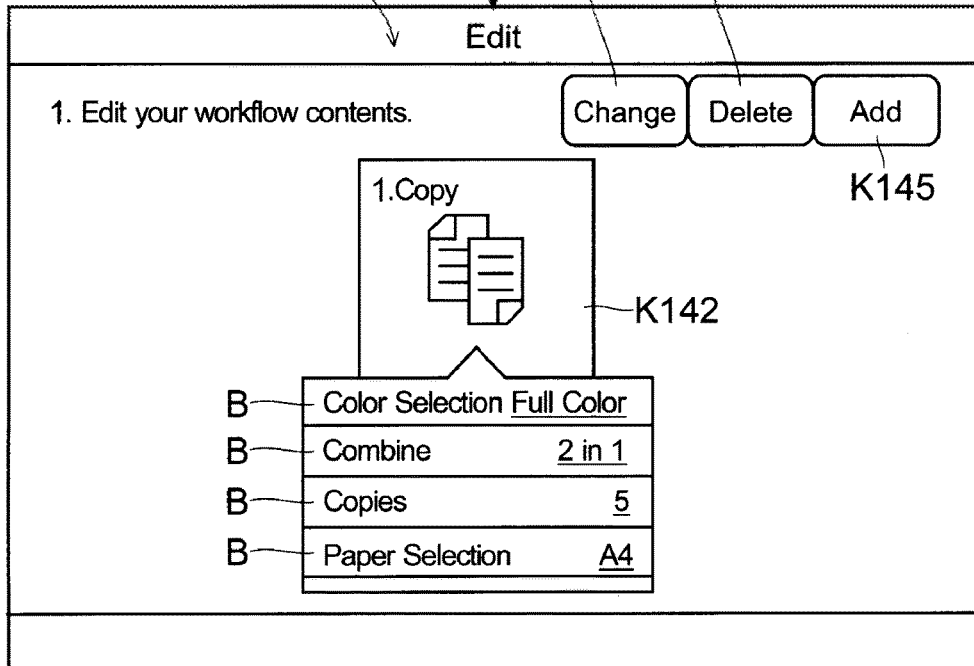

FIG.25
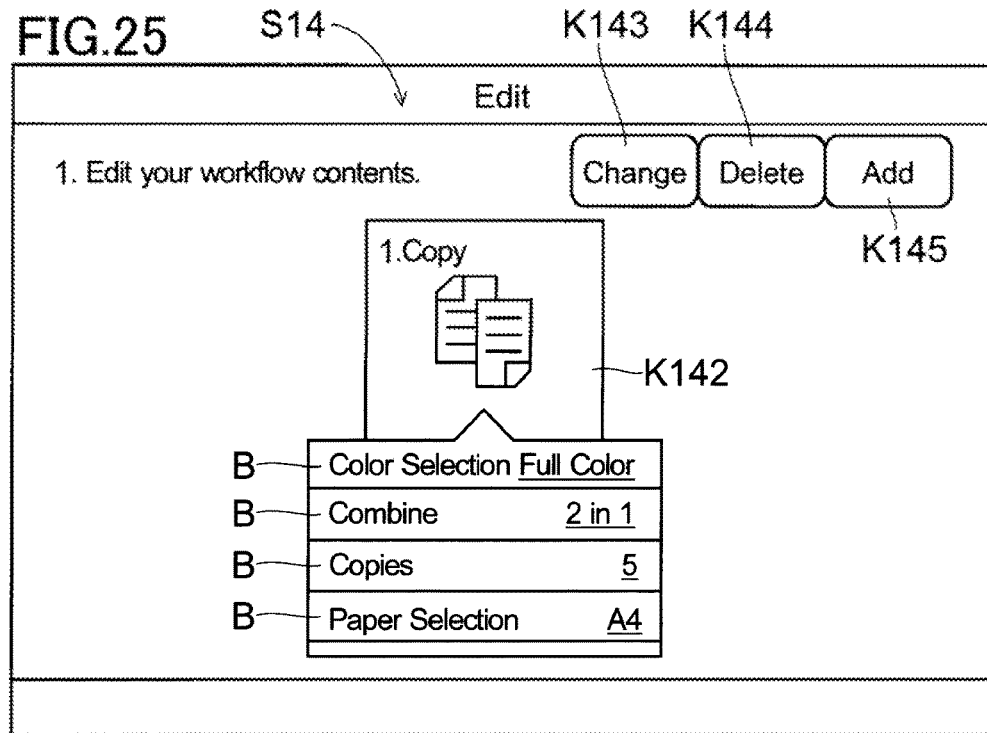
FUNCTION ADDITION
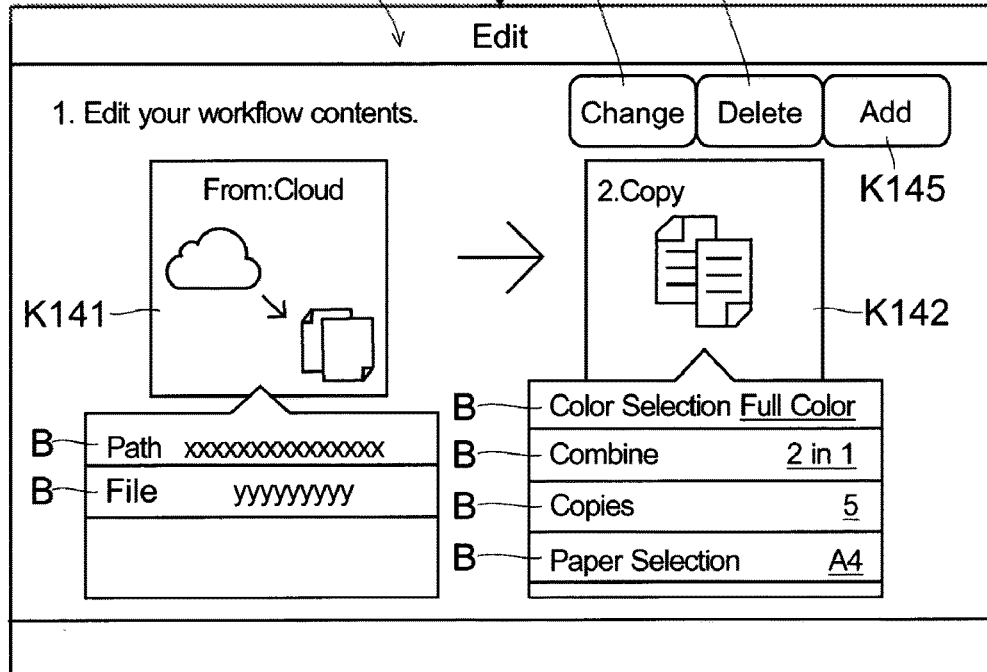

FIG. 26
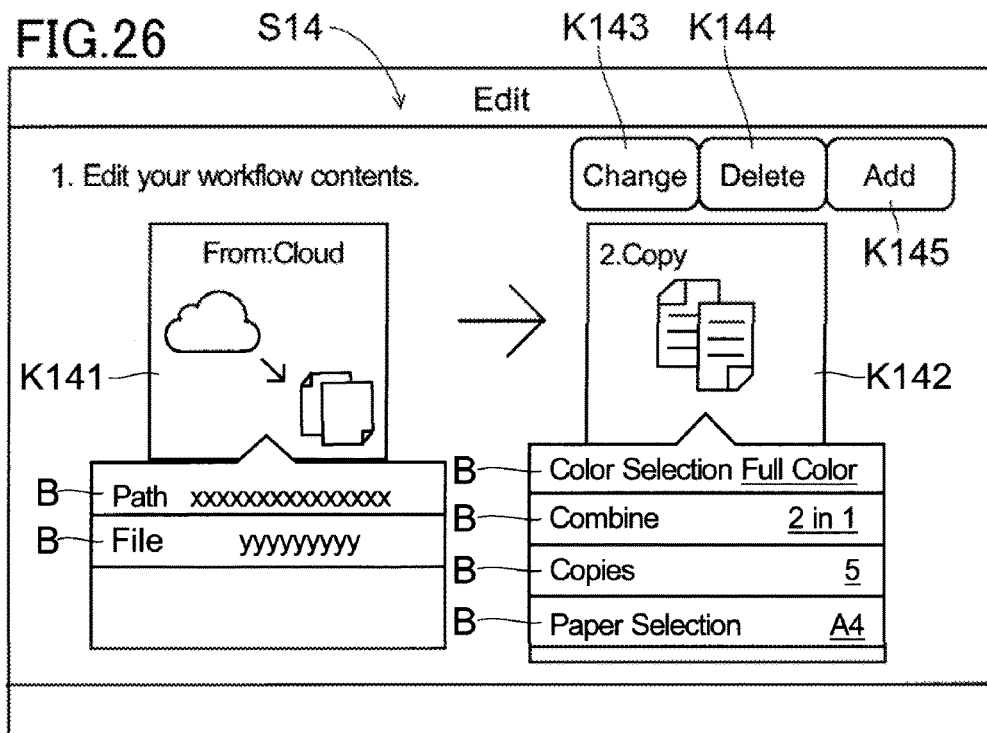
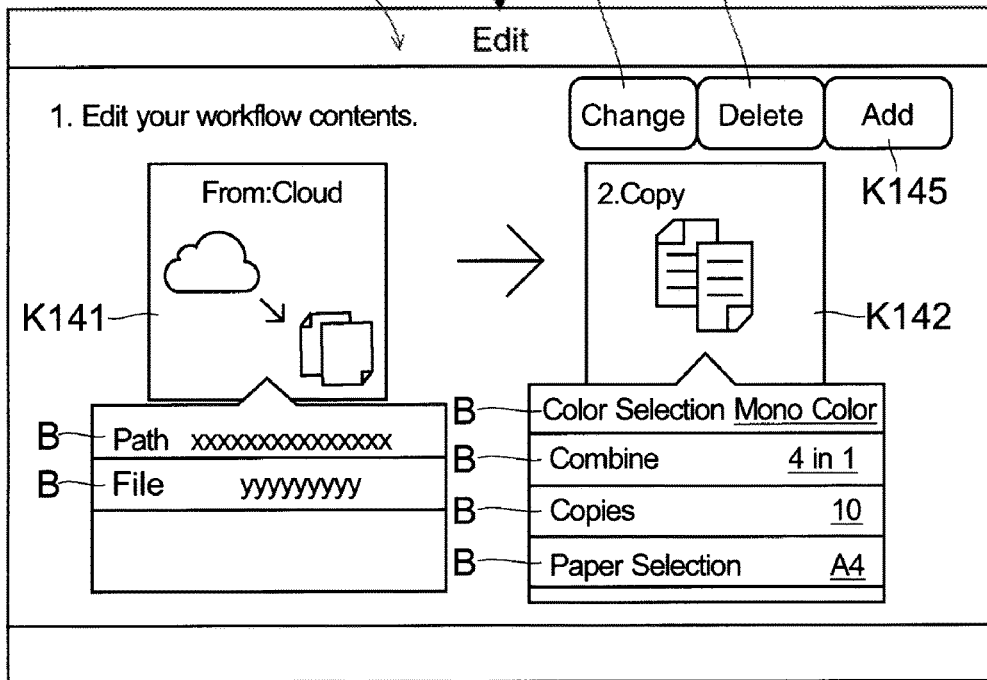

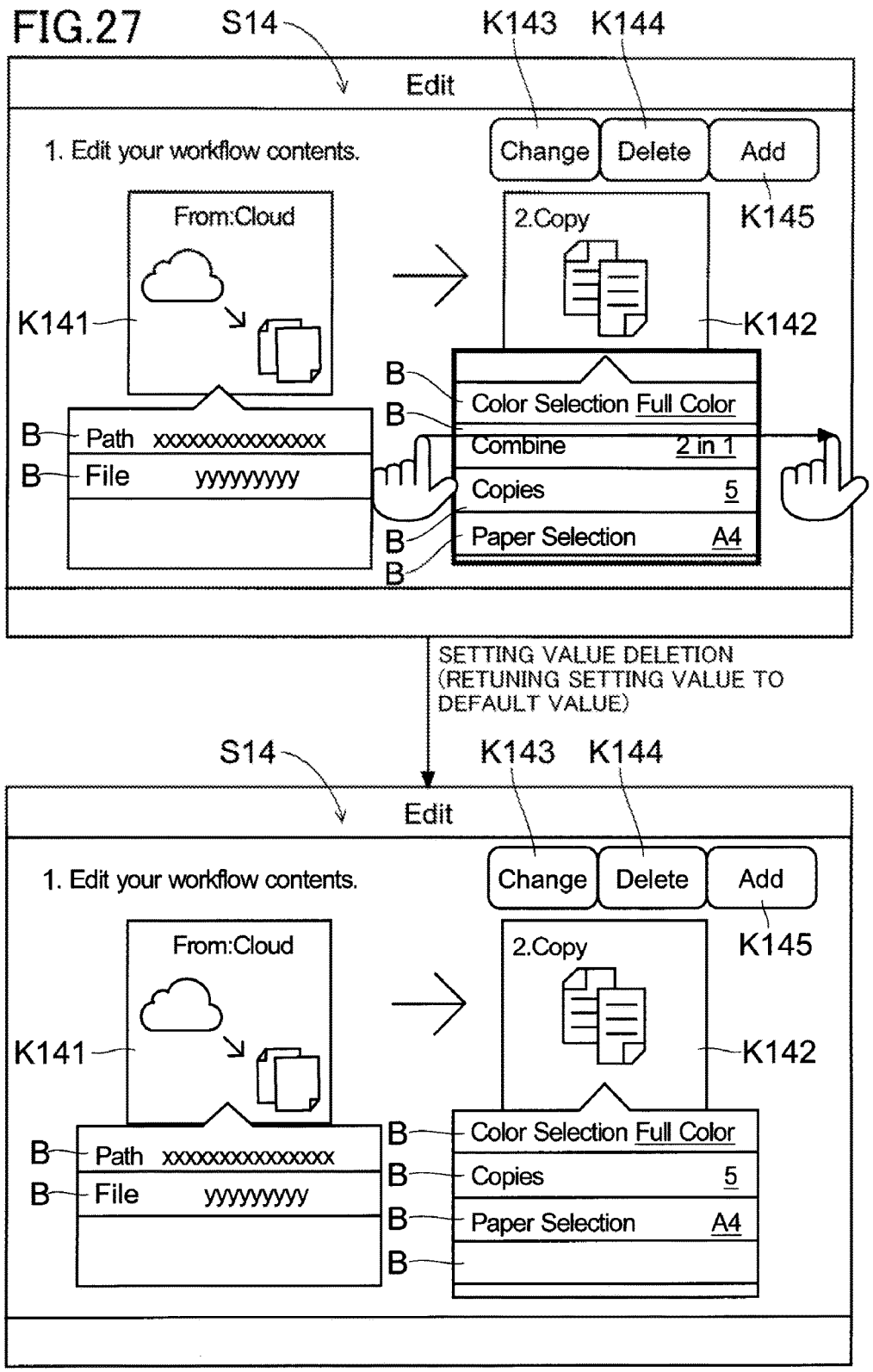

DISPLAY INPUT DEVICE FOR CREATING AND REGISTERING A WORKFLOW AND IMAGE FORMING DEVICE EQUIPPED WITH THE SAME

TECHNICAL FIELD

The present invention relates to a display input device and an image forming device equipped with the same.

BACKGROUND

Until now, there has been known an image forming device that is provided with plural kinds of functions including a copy function and a transmission function (function for transmitting image data to a designated user terminal or a FAX device). Such an image forming device is provided with a display input device that is configured to perform various configuration settings for the image forming device (see, for example, Patent Literature 1).

For example, the display input device is configured to display a screen for accepting one function that is selected for use from the plural kinds of functions that are provided in the image forming device and accepts a selected function to be used. Once a function is selected, the display input device displays a screen that illustrates plural kinds of setting items in the resulting function whose respective setting values can be changed as options and accepts a selection of each of one or more of the setting items whose setting value (s) is (are) to be changed. When one or more of the setting items are selected, the display input device displays a screen for changing the setting value of each one or more of the selected setting items and accepts a change in the set value of each of one or more of the selected setting items.

For example, in the copy function, for example, combined print and print resolution are setting items whose setting values can be changed. In addition, for example, in the combined print whose default set value is "OFF (no combined print)", the default set value may be changed to "2in1" or "4in1".

In this way, the display input device provided in the image forming device is configured to select the function to be used, select the setting item(s) to change its (their) setting value(s), and accepts changing the set value(s). Thus, a user of the image forming device, when he/she wishes to execute job(s) of his/her desired function(s) with his/her desired set value(s), will make various settings for the display input device.

PRIOR ART DOCUMENT

Patent Literature

Patent Literature 1: Japanese Patent Laid-open Print No. 2014-027454 (JP 2014-027454 A1)

SUMMARY OF THE INVENTION

Problem to be Solved by the Invention

Some of the conventional display input devices are capable of registering the setting content of a function that is selected from among plural kinds of functions. In such a display input device, calling the registered setting content will be capable of executing a job pursuant to the resulting setting content without having to select a function to be used and setting the setting content of the function. Thereby, it is convenient for the user in that calling the registered setting content will execute a job having a desired function pursuant to the desired setting content.

However, sometimes, some users want to execute collectively each of two or more functions among plural kinds of functions. For example, while a manuscript is being subject to copy, the image data of such a manuscript is desired to transmit to a user terminal or a FAX device. In such a case, for example, despite the registration of the setting content of a copy function, after the completion of the copy job that is executed pursuant to the called setting content, it is requested to conduct operations that include resetting the manuscript as an original of copying on the image forming device, selecting a transmission function, as a function to be used, selecting setting items whose setting values are to be changed, and configuring the setting values (image data as a transmission object and path) of the selected setting items. Otherwise, it is requested to conduct operations that include resetting the manuscript as an original of copying on the image forming device and calling the setting content of the transmission function.

The present invention, which has been made for solving the aforementioned problems in the display input device that is configured to provide settings to the image forming device on which plural functions are mounted, has an object to provide a display input device that is capable of enhancing conveniences of users who want to execute collectively each jobs of two or more functions and an image forming device that is provided with the preceding input display device.

Means for Solving the Problems

To achieve the above object, a display input device of the present invention is a device that is configured to provide settings on an image forming device on which plural functions are mounted, the plural functions including basic functions each of which is available alone, and combination functions each of which is available when being combined with one of the basic functions. The display input device includes a display input part that is configured to display a screen and receive an operation, a storage part that is configured to store data, and a control part that is configured to control a display operation of the display input part and recognize an operation conducted on the display input part. Then, the control part is configured to cause the display input part to display a workflow creation and registration screen for creating and registering a workflow and to receive an operation for creating and registering the workflow, the workflow being of a combination of the basic function and the combination function, the workflow including data that is indicative of a first function selected from basic functions which is to be registered, setting contents of the first function, a second function selected from a combination functions which is to be registered, and setting contents of the second function and combining the basic function and the combination function. In addition, the control part is configured to cause the display input part to display a workflow management screen for calling the registered workflow and to cause the workflow management screen to receive an operation that calls the registered workflow. In addition, the control part causes, when it recognizes that the operation for the registration of the workflow is conducted on the display input part, the storage part to store the workflow. In addition, the control part being configured to cause, when it recognizes that the operation of calling the workflow is conducted on the display input part, the image forming device to execute a job pursuant to the setting contents that are indicated by the data that is included in the called workflow.

Further, a display input device of the present invention is a device that is configured to provide settings on an image forming device on which plural functions are mounted which include basic functions each of which is available alone, and combination functions each of which is available when being combined with one of the basic functions, the display input device including a display input part that is configured to display a screen and receive an operation, a storage part that is configured to store data, and a control part that is configured to control a display operation of the display input part and recognize an operation of the display input part. Then, the control part is configured to cause the display input device to display a workflow creation and registration screen to receive an operation for creating and registering a workflow that is a combination of the basic function and the combination function which includes data that is indicative of a first function that is selected from the basic operations to be registered, setting contents of the first function, a second function that is selected from the combination functions to be registered, and setting contents of the second function, the control part being configured to cause the display input part to display a workflow management screen for receiving an operation for calling the registered workflow in order to call the registered workflow. In addition, the control part is configured to cause, when it recognizes that the operation for the registration of the workflow is made to the display input part, the storage part to store the workflow, the control part being configured to perform a process that causes the image forming device to execute a job pursuant to the setting contents that are indicated by data that is included in the called workflow.

Furthermore, a display input device of the present invention is a device that is configured to provide settings on an image forming device on which plural functions are mounted which include basic functions each of which is available alone, and combination functions each of which is available when being combined with one of the basic functions, the display input device including a display input part that is configured to display a screen and receive an operation, a storage part that is configured to store data, and a control part that is configured to control a display operation of the display input device and recognize the operation manipulated to the display input part, the control part being configured to instruct the display input device to display a workflow creation and registration screen to receive operations for creating and registering a workflow that is a combination of the basic function and the combination function which includes data that is indicative of a first function that is selected from the basic operations to be registered, setting contents of the first function, a second function that is selected from the combination functions to be registered, and setting contents of the second function, the control part being configured to instruct the display input device to display a workflow management screen for calling the registered workflow WF in order to call the registered workflow, when it recognizes that an operation for calling the workflow is conducted on the display input part, the control part being configured to cause, when the operation for the registration of the workflow is made to the display input device, the storage part to store the workflow, the control part being configured to perform a process that causes the image forming device to execute a job pursuant to the setting contents that are indicated by data that is included in the called workflow.

Moreover, a display input device of the present invention includes a storage part that is configured to store a workflow, the workflow being created and registered by a user, wherein the workflow is for executing a job pursuant to a setting that is included in the workflow when the workflow is called, a display input part that includes a display part that is configured to display a screen and a touch panel that is configured to receive an operation of the user by detecting a touch on a display position, and a control part that is configured to recognize a setting operation by the user based on an output from the display input device and to recognize a calling operation for determining a workflow to be called from among the workflows registered in the storage part, the display being configured to display a new registration key for an initiation instruction of a new creation and registration of a workflow by selecting function, a setting item and a setting value from a first slate, the control part, during the creation and registration of the new workflow, recognizing a first function that is selected as a function to be used in the newly created workflow from among a plurality of pre-specified functions, and the setting item and the setting value are both elected in the first function, as a setting contents of the first function, the control part causes the display input part to display a template screen that is configured to select a combination function from among specified combination functions which is to be combined with the first function, the control part recognizing a second function that is the combination function selected through the template screen based on the output from the display input device and setting contents of the second function, the control part being configured to cause the storage part to register data of the setting content of the first function as the new workflow in the storage part when the second function is not selected, and to cause the storage part to register data of the setting content of the first function and the setting content of the second function as the new workflow.

Furthermore, a display input device of the present invention includes a storage part that is configured to store a workflow, the workflow being created and registered by a user, wherein the workflow is for executing a job pursuant to a setting that is included in the workflow when the workflow is called, a display input part that includes a display part that is configured to display a screen and a touch panel that is configured to receive an operation of the user by detecting a touch on a display position, and a control part that is configured to recognize a setting operation by the user based on an output from the display input device and to recognize a calling operation for determining a workflow to be called from among the workflows registered in the storage part. The storage part, as to the first function that is selected from among the predetermined basic functions, stores the setting content of the first function which includes the setting item and setting value both of which being selected therein as data of the workflow, the storage part also stores the data of the setting content of the first function and the data of the setting content of the second function as the combined combination function as the data of the workflow when the workflow is defined to combine the first function and the predetermined combination function, and the control part causes, when it recognizes an instruction to conduct a content confirmation for selecting a workflow of which its content is to be confirmed from among registered workflows based on an output from the display part, the display input part to display a confirmation and editing screen and causes the display input part to display a setting content of the second function when a setting content of the combination function is combined to a setting content of the first function of the workflow to which the content confirmation is instructed in the confirmation and editing screen.

BRIEF DESCRIPTION OF THE DRAWINGS

FIG. 23 shows one exemplary embodiment i.e. an example of an editing of rearranging a function.

FIG. 24 shows one exemplary embodiment i.e. an example of an editing of deleting a function.

FIG. 25 shows one exemplary embodiment i.e. an example of an editing of adding a function.

FIG. 26 shows one exemplary embodiment i.e. an example of an editing of changing a setting value.

FIG. 27 shows one exemplary embodiment i.e. an example of an editing of deleting a setting value.

MODES FOR CARRYING OUT THE INVENTION

First Exemplary Embodiment

With reference to FIGS. 1 to 27, a description is made as to a display input device 10 according to a first exemplary embodiment of the present invention. On the display input device 10 of the present exemplary, a workflow is available. The display input device 10 is a device through which configuration settings and inputs are provided to an image forming device, whose operation target is the image forming device, and which causes the image forming device to perform a job pursuant to the configured setting. In the following description, the display input device 10 of a multi-function device (image forming device) is exemplified which is allowed to execute a basic function available that is selected from plural kinds of basic functions including, for example, a printer function, a copy function, a transmission function such as a network transmission or facsimile transmission, and a box function.

Here, in the present exemplary embodiment, the display input device 10 stores the workflow as data. It is possible to cause the workflow to include a name of a first function, setting items of the first function, a setting value of the setting item selected (which is different from default setting value), whether or not a combination function is selectable, a second function that is selected, and configuration settings (an upload destination path about the cloud, such as a network storage, a download source path, information to authenticate the cloud service, the destination address in the copy image transmission function) of the second function, a utilizing format that is selected, the name of the workflow, and other data (information) such as the workflow creation date. Then, calling the workflow allows for deploying configuration or executing a job pursuant to contents that are included in the workflow.

The "basic function" in present exemplary embodiment, which is in a specified state, is indicative of large classifications that include a printer function, a copy function, a transmission function and a box function, and is a function that is available on the multi-function device. The "first function" is the function that is selected by the "user" for use in the workflow from the "basic functions". The "combination function", which is an in-advance specified function that is available in combination with the basic function (The "combination function" will be detailed later). The "second function" is the function that is selected by the "user" for use in the workflow from the "combination functions". The "setting item" is an item (small function) (for example, zoom or concentration or double-sided printing or combined printing or the like in the copy function) which is configured in, for example, the first function and the second function. The "Setting Value" is a value that is selected by the user for the selected "setting item" (for example, magnification to be given to the configuration setting of zoom).

(Overview of the Display Input Device 10)

Figure 1:
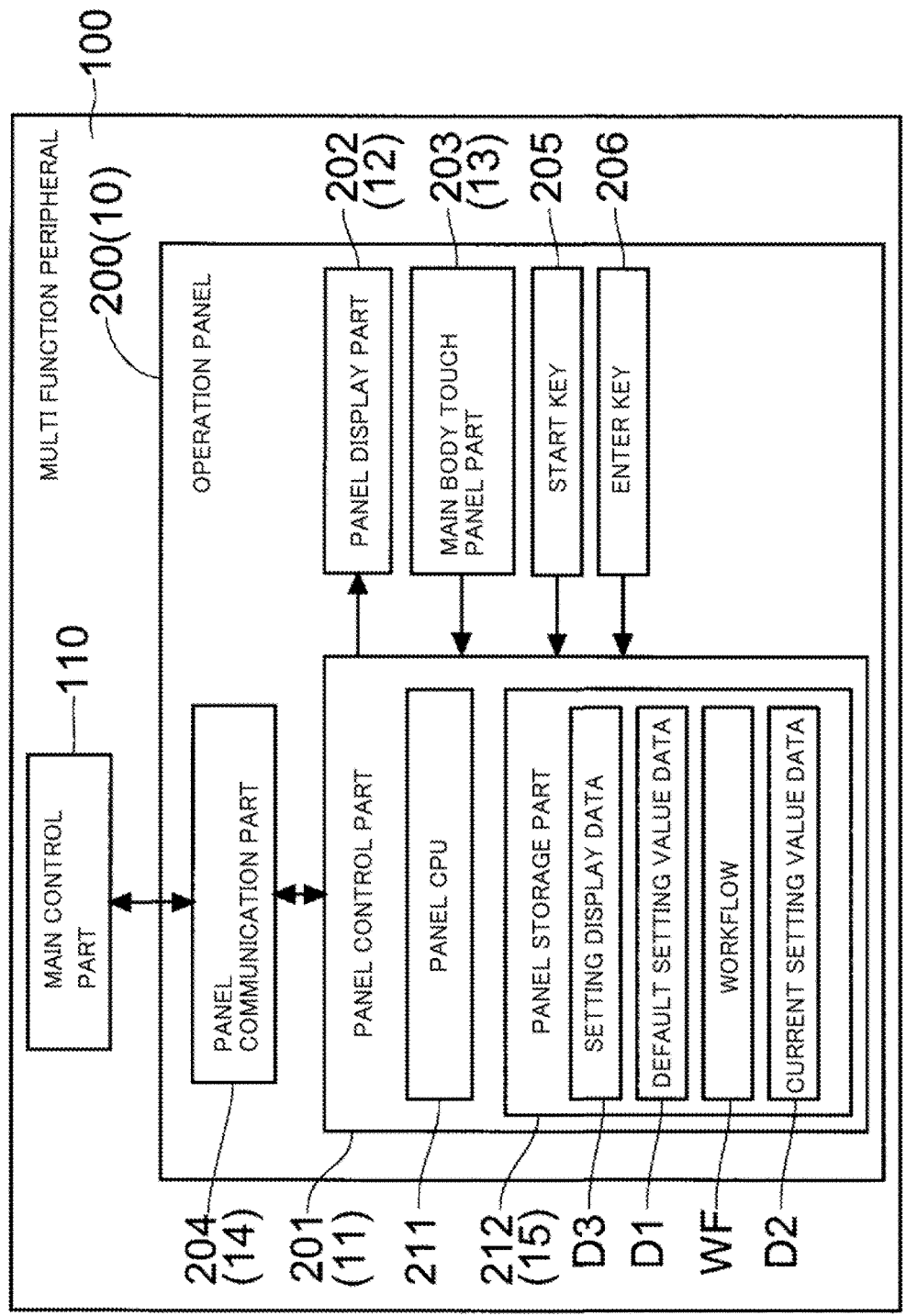
FIG. 1 shows a first exemplary embodiment i.e. an example of an operation panel as a display input device.
Figure 2:
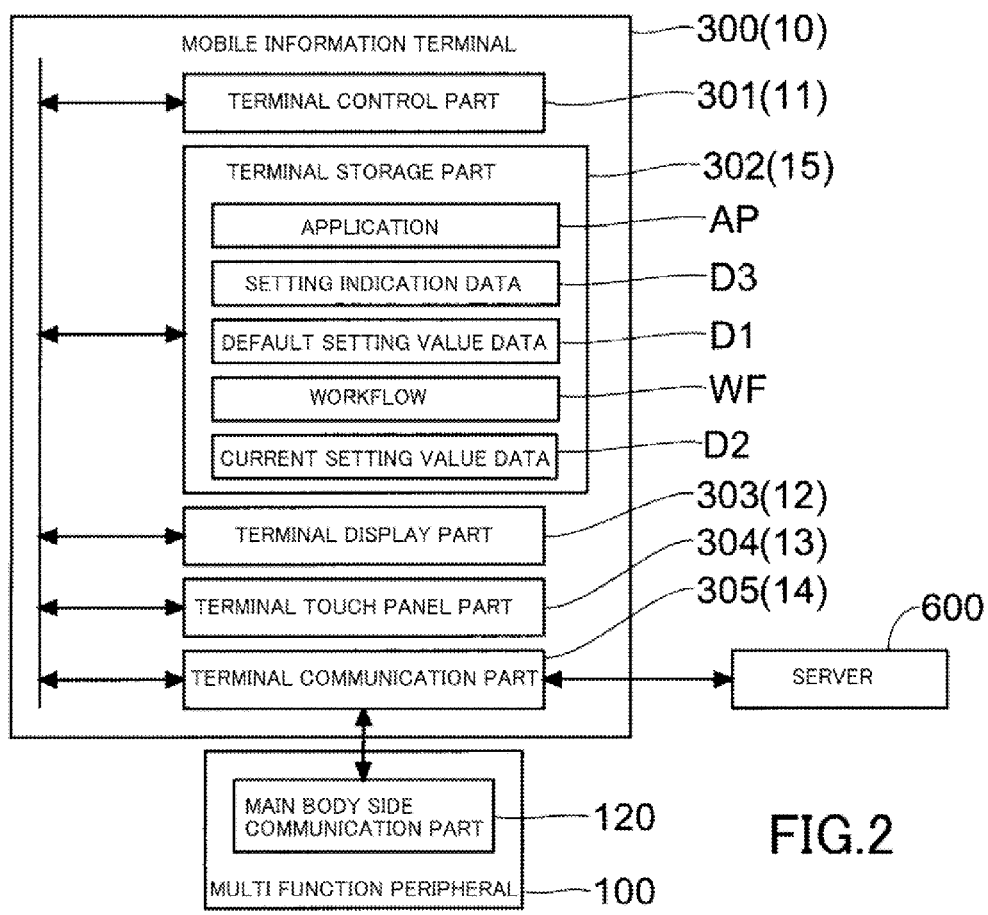
FIG. 2 shows one exemplary embodiment i.e. an example of a mobile communication terminal as a display input device.

With reference to FIGS. 1 and 2, an outline of the display input device 10 according to an exemplary embodiment will be described. FIG. 1 is a diagram that illustrates an example of an operation panel 200 as the display input device 10 according to the present exemplary embodiment. FIG. 2 is a diagram that shows an example of the portable information terminal 300 as the display input device 10 according to an exemplary embodiment.

The display input device 10 is configured to receive configuration setting inputs related to a job to be executed by the MFP and an execution instruction of the job. As the display input devices 10, there are provided the operation panel 200 (ref. FIG. 1) that is fixedly mounted on the MFP and the portable information terminal 300 that is capable of being separated from the MFP for portable use.

At first, based on FIG. 1, the operation panel 200 as the display input device 10 is described. The operation panel 200 includes a panel control part 201 as a control part (operation control part 11) of the display input device 10, a panel display part 202 (corresponding to the display input part) as a display part 12 (a display panel) of the display input device 10, a main body touch panel part 203 (corresponding to the display input part) as a touch panel part 13 of the display input device 10, and a panel communication part 204 as a communication part 14 of the display input device 10. The panel control part 201 includes a panel CPU 211 and a panel memory part 212 as a storage part 15 of the display input device 10. The panel CPU 211 controls an operation of parts included in the operation panel 200, and recognizes contents of settings, selections, operations and instructions that are made on the operation panel 200. A panel storage part 212 stores a screen that appears on the panel display part 202, image related data, and control data and programs that are required for controlling the operation panel 200. In addition, in relation to the present exemplary embodiment, the panel memory part 212 stores the workflow WF.

The panel control part 201 is configured to cause the panel display part 202 to display a screen and an image that are related to the configuration settings of the MFP. Then, the panel control part 201 displays keys (software keys) for the configuration settings of the MFP. A main body touch panel 203 is provided in opposition to the panel display part 202. The main-body touch panel part 203 is configured to issue a signal that depends on a position on which the user touches. The panel control part 201 recognizes, based on an output from the main touch panel part 203, the position that the user touches. Then, the panel control part 201 recognizes that an operation is conducted on a key where the touch position and the display position are overlapped. In other words, the panel control part 201 recognizes, based on the output from the main touch panel 203, contents of the configuration settings, selections, operations, and instructions that are made by the user. Then, the panel control part 201 causes the panel display 202 to switch the screen depending on the operation key that is manipulated.

It is also possible to provide a plurality of hardware keys. The panel controller 201 is configured to recognize (accept) manipulations on the plural hardware keys. For example, as the hardware keys, for example, a Start key 205 for an instruction of starting an execution of a job and an Enter key 206 for instructing an execution and an invocation of the workflow WF (which will be detailed later). It is also to be noted that keys corresponding to the hardware keys may be realized as software keys.

By the recognition of the manipulations to the displayed keys (software keys) and the hardware keys, the panel control part 201 recognizes inputting the contents of the configuration settings for a job that is to be executed by the MFP. Also, the panel control part 201 transmits (notifies) the inputted contents of the configuration settings regarding the recognized job from a panel communication part 204 to a main control part 110. The panel communication part 204 is a data communication circuit for communicating with the main control part 110.

Next, based on FIG. 2, the portable information terminal 300 as the display input device 10 is described. More specifically, the portable information terminal 300 is in the form of a mobile type computer 400, such as a smartphone or a tablet. This portable information terminal 300 includes a terminal control part 301 as the control part (operation control part 11) of the display input device 10, a terminal storage part 302 as the storage part 15 of the display input device 10, a terminal display part 303 as the display part 12 (which corresponds to the display input part), a terminal touch panel part 304 as the touch panel part 13 of the display input device 10 (which corresponds to the display input part), and a terminal communication part 305 as the communication part 14 of the display input device 10.

The terminal control part 301 includes a circuit such as a SoC circuit for performing processing that is necessary for the control and display. The terminal control part 301 is coupled, via an internal bus, to the terminal storage part 302 and the terminal communication part 305, acquires data therefor, executes various mathematical operations using the resulting data, and controls the portable information terminal 300. The terminal memory part 302 stores control data that is required for controlling the portable information terminal 300, programs, and an application AP. Moreover, the terminal storage part 302 stores an application AP for performing the configuration setting, instructions, and operations of the MFP 100. Also, in relation to the present exemplary embodiment, the terminal storage part 302 stores the workflow WF. The stored applications AP and data are read out, via the internal bus, to the terminal control part 301 and the terminal communication part 305.

The terminal control part 301 is configured to cause the terminal display part 303 to display icons for launching the application AP and screen and image of the launched application AP. Executing the application AP that sets, instructs and operates the MFP 100 allows the terminal display part 303 to display a screen and an image related to the setting of the MFP 100 (for example, software keys for setting the MFP 100), similar to the operation panel 200 mounted on the MFP 100. It is to be noted that the application AP for setting, instructing, and operating the MFP 100 may be stored in the terminal storage part 302 by, for example, download from a server on the network via the terminal communication part 305.

Also, a terminal touch panel 304 is provided in opposition to the terminal panel display part 303. The terminal touch panel part 304 is configured to issue a signal that depends on a position on which the user touches. The terminal control part 301 recognizes, based on an output from the terminal touch panel part 304, the position in the terminal display part 303 which the user touches. Then, the terminal control part 301 recognizes that an operation is conducted on a key where the touch position and the display position are overlapped. Then, the panel control part 201 causes the display part 12 to switch the screen depending on the operation key that is manipulated.

Based on such an output of the terminal touch panel 304 that receives an operation on the software key, the terminal control part 301 recognizes the setting input, such as a job by the user or the work flow WF, regarding the MFP 100. In other words, the application AP, the terminal display part 303, and the terminal touch panel part 304 make it possible to configure settings and issue operation instructions to the MFP 10, which are equivalent to those achieved by the operation panel 200. In addition, the terminal control part 301, based on the recognition result of inputting the configuration setting (operations) that are made to the terminal touch panel part 304, causes the terminal communication part 305 to transmit (notify) the inputted setting or operated contents to the main control part of the MFP 100.

The terminal communication part 305 is configured to communicate with the MFP 100 (notification of the setting contents to the main control part 110) and the network. The terminal communication part 305 is to be in communication with the MFP 100 via a wireless communication (for example, WiFi or Bluetooth (registered trademark). In addition, the terminal communication part 305 is capable of performing data communications by using the available radio communication systems to be in connection with a network such as the Internet (registered trademark). Then, the terminal control part 301 transmits the contents of the configuration settings of the job, the configuration settings being performed at the portable information terminal 300, the job being to be executed by the MFP 100, via the terminal communication part 305, to the main-body-side communication part 120 of the MFP 100.

It is to be noted that the portable information terminal 300 may be in the form of an attachment of the MFP 100. In such a case, the operation panel 200 may be omitted or the MFP 100 may be available as both the operation panel 200 and the portable information terminal 300.

Thus, the operation panel 200 that is mounted to the MFP 100 and the portable information terminal 300, such as the smartphone or the tablet, are available as the display input device 10 for setting the job that is to be executed by the MFP 100.

(Overall Configuration of the MFP 100)

Figure 3:
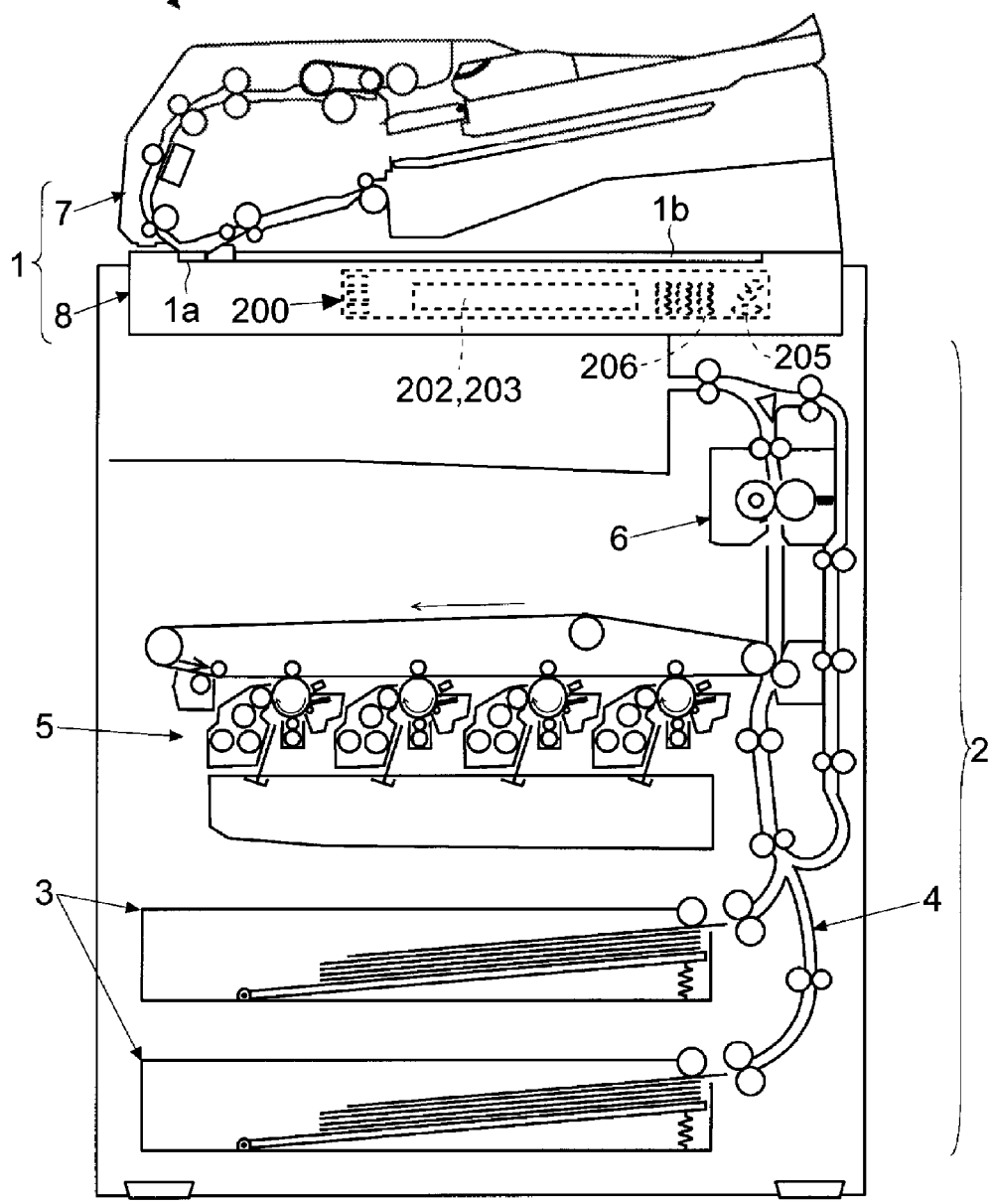
FIG. 3 shows one exemplary embodiment i.e. an example of a multiple function periphery.

Next, referring to FIG. 3, a description is made as to the MFP 100 according to the present exemplary embodiment. FIG. 3 is a diagram showing an example of the MFP 100 according to the present exemplary embodiment.

As shown in FIG. 3, the MFP 100 includes a reading part 1. The reading part 1 includes a manuscript transport part 7 and an image reading part 8. The manuscript transport part 7 conveys a manuscript D onto a conveyance reading contact glass 1a. In addition, the image reading part 8 reads the manuscript D while the manuscript D passes on a conveyance reading contact glass 1a, and creates image data of the manuscript (doing conveyance reading). Alternatively, the image reading part 8, reads the manuscript D that is mounted on a mounted-manuscript reading glass 1b and creates image data of the manuscript D (doing mounted-manuscript reading)

In addition, the MFP 100 includes a print part 2. The print part 2 includes a sheet feeding part 3, a conveyance part 4, an image forming part 5 and a fixing part 6. Then, the main control part 110, when it recognizes that an instruction for executing a copy job is issued from the display input device 10, causes the print part 2 to make a print on a sheet P pursuant to the image data that has been read by the image reading part 8 via the reading part 1 (copy function). Alternatively, the printing part 2 prints an image based on the print data received by the main body side communication part 120 on the paper P (printer function).

The sheet feeding part 3 feeds the sheet P to the conveyance part 4. The conveyance part 4 is configured to convey the sheet P and to discharge the paper P that has been printed outside the device. The image forming part 5 forms a toner image based on the image data and transfers the resulting toner image on the sheet P. A Fixing part 6 heats and applies pressure on the toner image transferred to the sheet P for fixing.

(Hardware Configuration of MFP 100)

Figure 4:
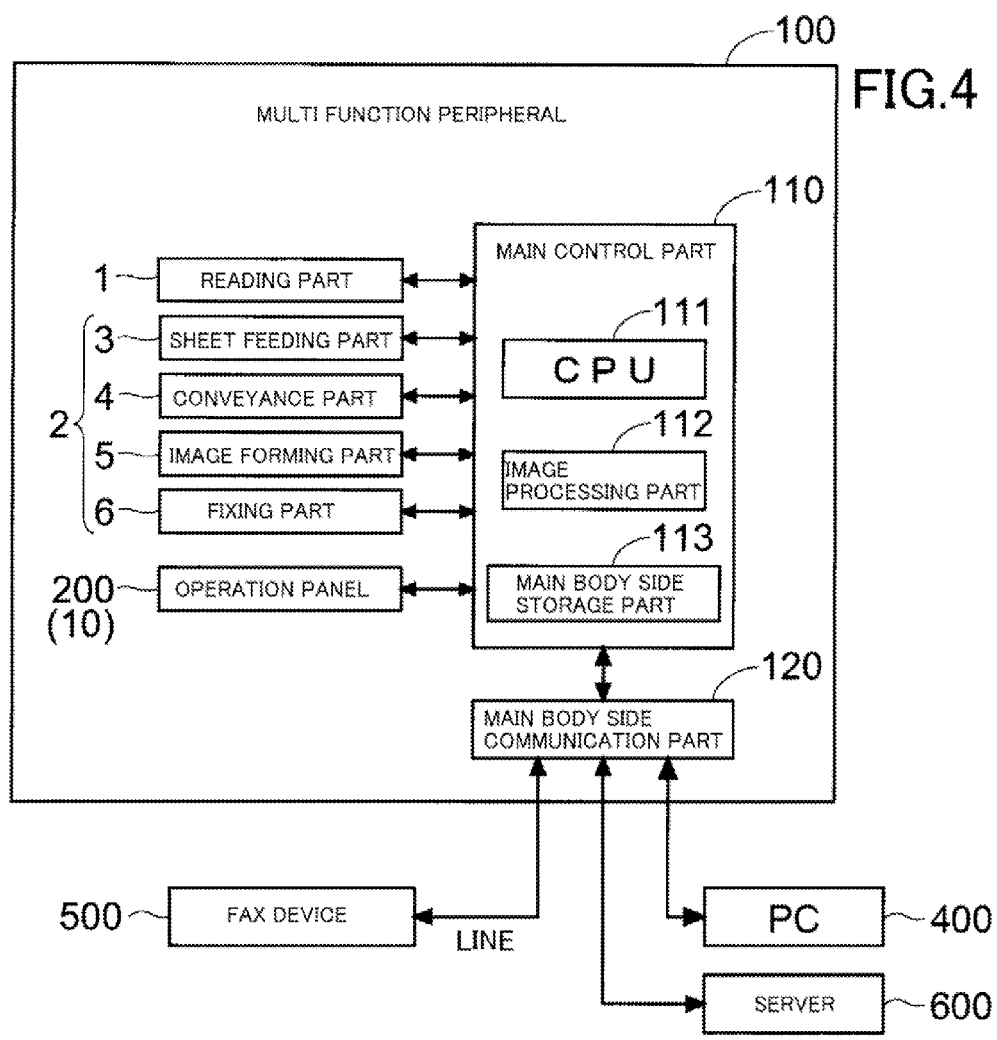
FIG. 4 shows one exemplary embodiment i.e. an example of a multiple function periphery.

Next, referring to FIG. 4, a description is made as to the MFP 100 according to the exemplary embodiment. FIG. 4 is a diagram showing an example of the MFP 100 according to the exemplary embodiment.

As shown in FIG. 4, the MFP 100 includes the main control part 110. The main control part 110 includes a CPU 111, an image processing part 112, and amain body side storage part 113. The image processing part 112 performs various images processing on the image data. The main body side storage part 113 stores programs and data for controlling the MFP 100. Then, the main control part 110, based on the program and data for the control, controls reading operations of the image reading part 8, and controls printing operations of the print part 2.

The main body side storage part 113 is also referred to as a box and has a storage area for storing the image data that results from the manuscript reading. Then, the storage area of the main body side storage part 113 is capable of storing, for example, the image data that is obtained by reading the manuscript D at the image reading part 8 and image data that is contained in print data received by the main body side communication part 120, and is capable of making a print or transmission using the stored image data at any time (box function).

Furthermore, as described above, the main control part 110 is connected to the panel control part 201 for communication therewith. In addition, the MFP 100 includes the main body side communication part 120. The main body side communication part 120 is in communication, via a communication network, such as a public network or a LAN or the Internet (registered trademark), with external devices, such as a computer 400 (personal computer), a FAX device 500, and a server 600. Then, the main control part 110 causes the main body side communication part 120 to establish transmissions and receptions of various data including the image data to/from the external devices.

As shown in FIG. 4, the main control part 110, when the main body side communication part 120 receives print data based on documents and drawings that are created by the computer 400 (image data and the print setting data), causes the print part 2 to make a print pursuant to the print data (printer function). In addition, the main control part 110, when it receives an instruction for executing a transmission job from the display input device 10, causes the reading part 1 to read the manuscript and create image data, and causes the main body side communication part 120 to transmit the resulting manuscript and image data to the computer 400 and the FAX device 500 that are specified as transmission destinations (transmission function, FAX function).

(Basic Function, Setting Items, Setting the Setting Value)

Figure 5:
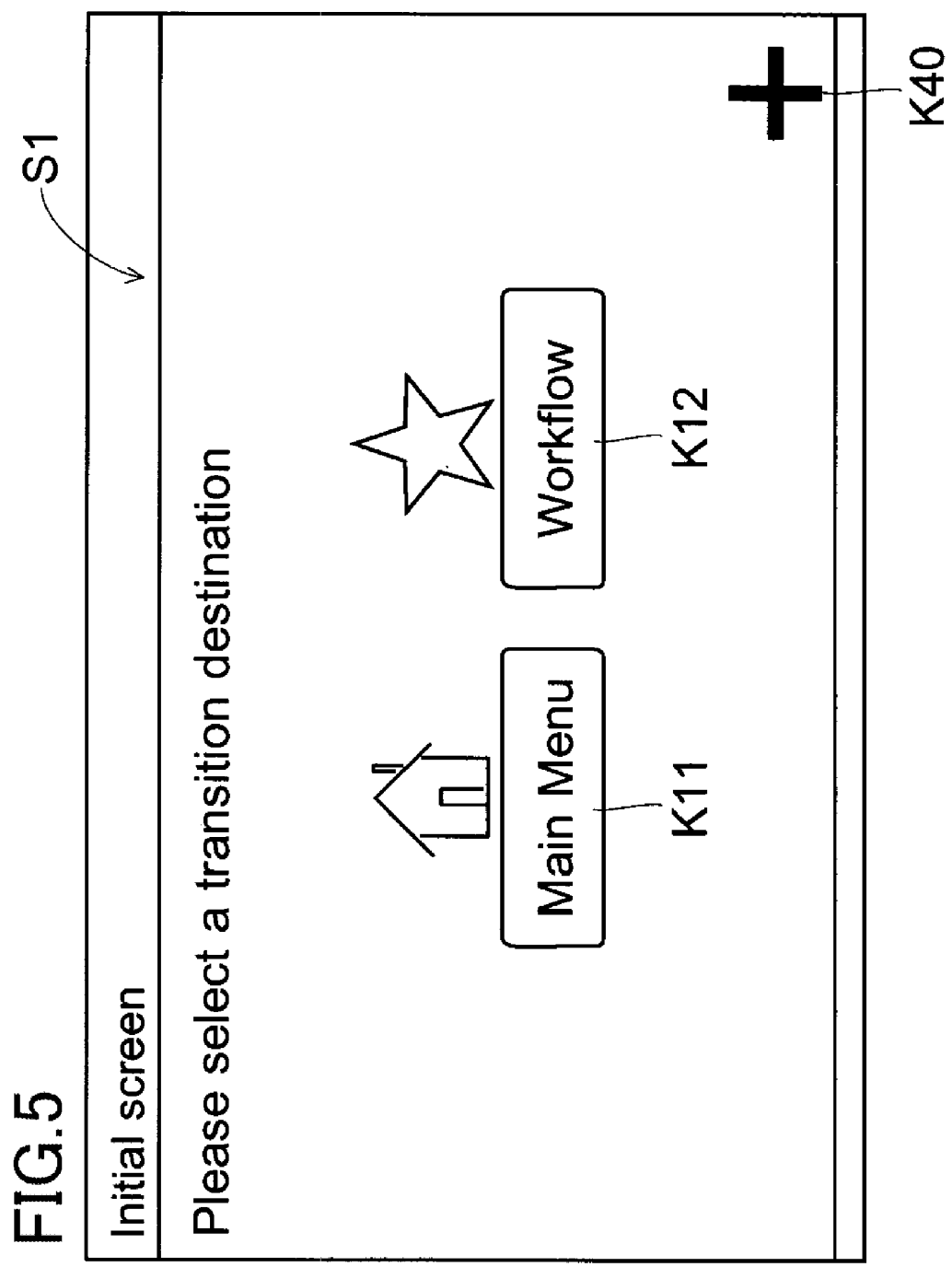
FIG. 5 shows one exemplary embodiment i.e. an example of an initial screen on a display input device.
Figure 6:
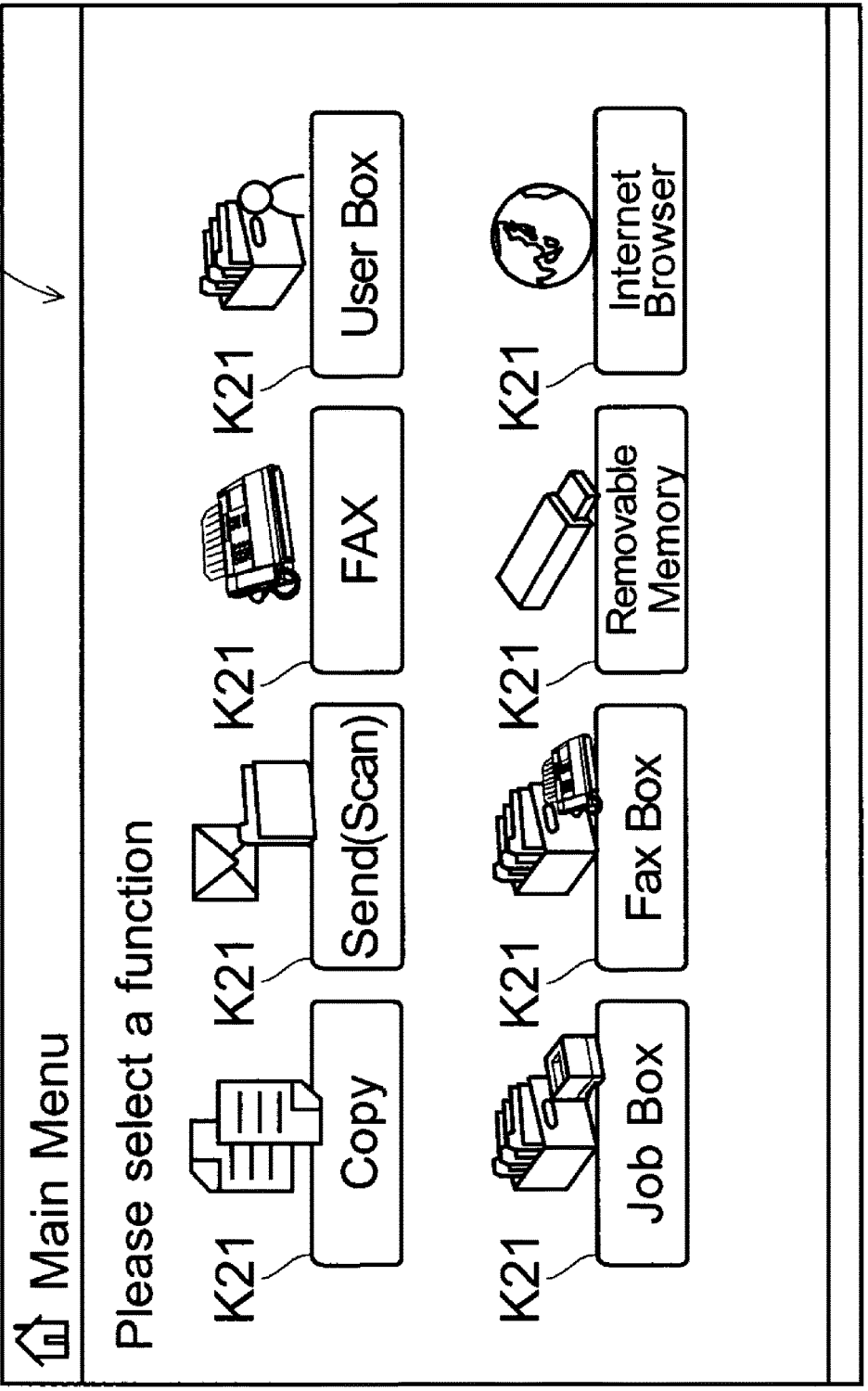
FIG. 6 shows one exemplary embodiment i.e. an example of a home screen for selecting a function to be used from among basic functions.
Figure 7:
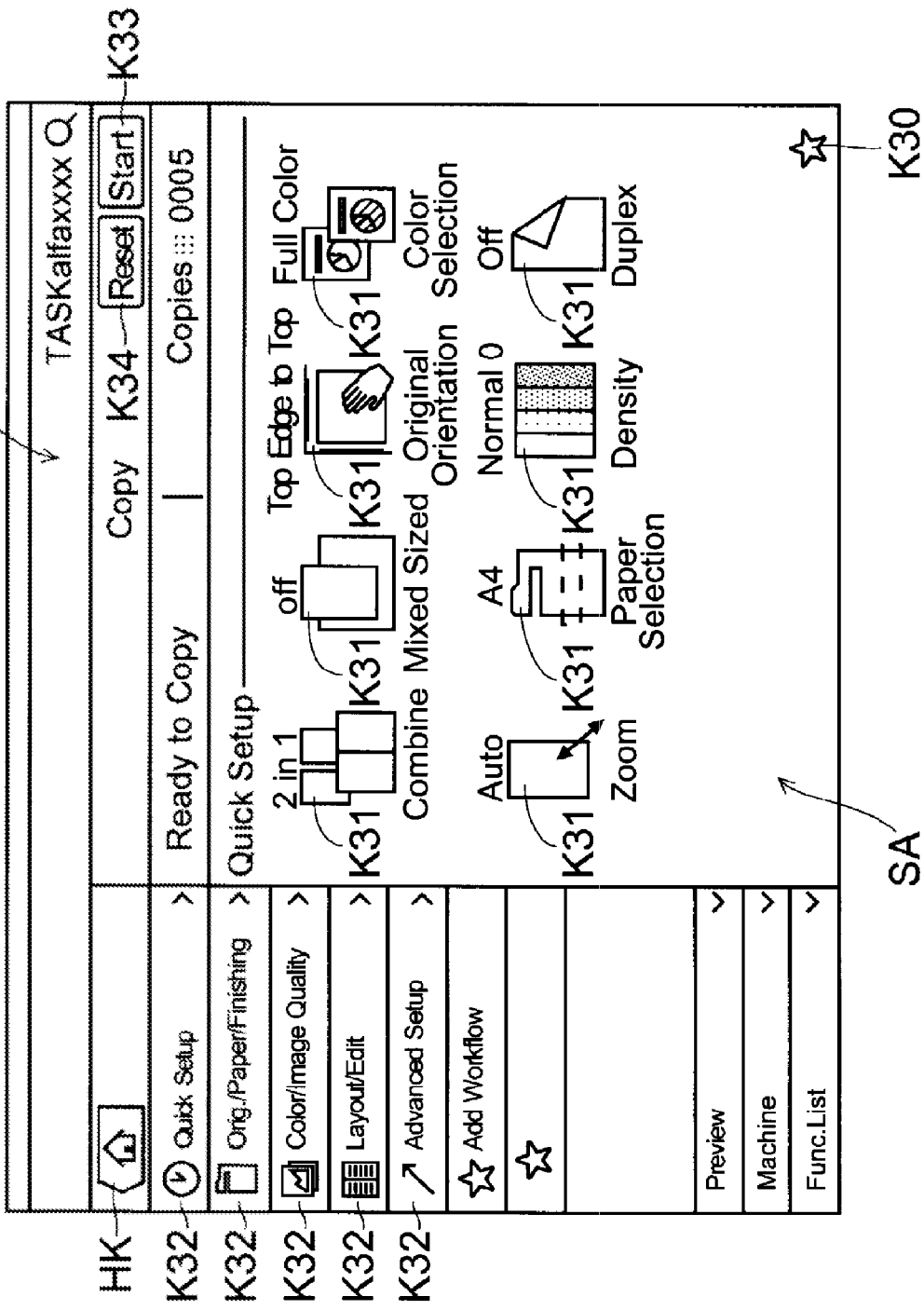
FIG. 7 shows one exemplary embodiment i.e. an example of an item selection screen for a setting item of the selected basic function.
Figure 8:
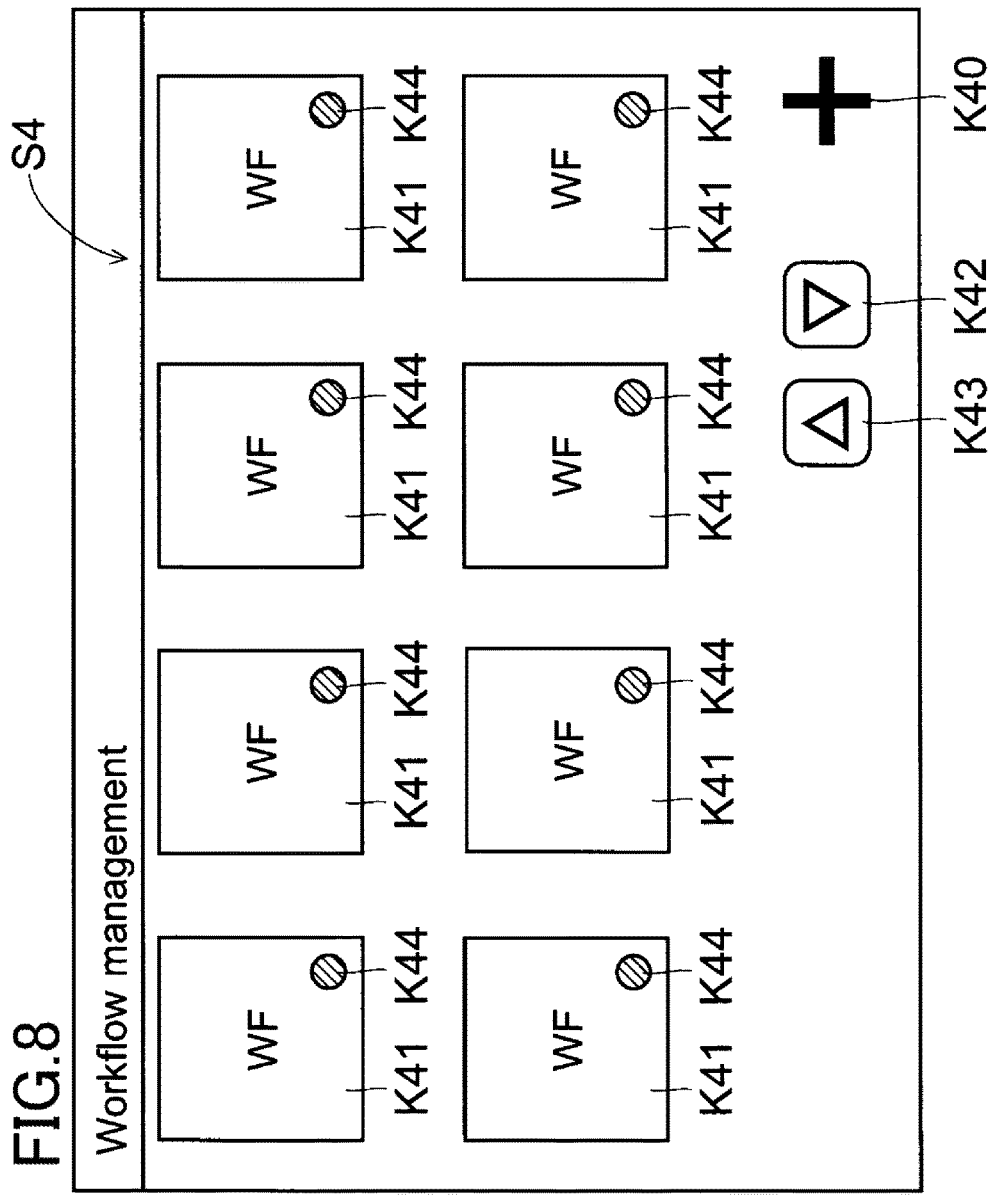
FIG. 8 shows one exemplary embodiment i.e. an example of a workflow management screen.

Next, with reference to FIGS. 5 to 8, the setting of the display input device 10 according to the exemplary embodiment is described. FIG. 5 is a view showing an example of an initial screen of the display input device 10 according to the exemplary embodiment. FIG. 6 is a view showing an example of a home screen through which a selection of function is made among the basic functions. FIG. 7 is a view showing an example of an item selection screen of the setting item for the selected basic function. FIG. 8 is a diagram showing an example of a workflow management screen according to the exemplary embodiment.

It is to be noted that the following description apply either the operation panel 200 or the portable information terminal 300 which are used as the display input device 10. Thus, in the following description, for convenience, a word "operation control part 11" is used to mean the panel control part 201 and/or the terminal control part 301, a word "display part 12" is used a panel display part 202 and/or terminal display part 303, a word "touch panel part 13" is used to mean the main body touch panel part 203 and/or the terminal touch panel part 304, a word "communication part 14" is used to mean the panel communication part 204 and/or terminal communication part 305, and a word "storage part 15" is used to mean the panel storage part 212 and/or the terminal storage part 302. It is to be noted that each of the display part 12 and the touch panel part 13 corresponds to the "display input part".

At a time of starting up or when the main power of the MFP 100 is activated (when a switch of the main power is turned on), when returning from a power saving mode to an ordinary mode, or when a displayed position of a RESET key K34 is touched on an item selection screen S3, the operation control part 11 of the display input device 10 causes the display part 12 to display an initial screen S1 that is shown in FIG. 5.

The initial screen S1 is an uppermost layer screen in hierarchy among set screens related to the MFP 100. The initial screen S1 is provided with a main menu key K11 and a workflow use key K12. Providing the workflow use key on the top screen will allow the workflow function to be frequently used, which results in that the display input device 10 and the MFP 100 come to be easy to use. It is to be noted that the workflow use key K12 may be provided on within a home screen S2 as will be described later.

The operation control part 11, when it recognizes that a touch is made on the display position of the main menu key K11 on the basis of an output of the touch panel part 13, causes the display part 12 to display the home screen S2 that is shown in FIG. 6. The home screen S2 is a screen for selecting a function that is intended to be used from among the basic functions that are available on the MFP 100. On the home screen S2, a basic function keys K21 are assigned to the corresponding plural basic functions. The operation control part 11 recognizes touching the display position of the basic function key K21 as the selection of the basic function (function to be used).

Then, the operation control part 11 causes the display part to display an item selection screen S3 (a screen for selecting setting items that are available in a first function) of the basic function (the first function) corresponding to the manipulated basic function key K21 on the display part 12. More specifically, as shown in FIG. 7, when selecting the copy function is made, the operation control part 11 causes the display part 12 to display the item selection screen S3 for selecting setting items of the copy function. Also, when selecting the transmission function is made, the operation control part 11 causes the display part 12 to display an item selection screen S3 (not shown) for selecting setting items of the transmission function. Also, when selecting the FAX transmission function is made, the operation control part 11 causes the display part 12 to display the item selection screen S3 (not shown) for selecting setting items of the FAX transmission function. Also, when selecting the box function is made by, for example, touching the display position of the user box key, the operation control part 11 causes the display part 12 to display an item selection screen S3 (not shown) for selecting setting items of the box function.

In this way, the MFP 100 includes, as the basic functions, the copy function (function for printing copies on the basis of image data obtained by reading the reading part), the transmission function (function for transmitting image data that is based on the manuscript reading to a network or a specified path), the FAX transmission function (function for transmitting the image data based on the manuscript reading to a designated FAX device 500), and the box function (storing image data in the box storage area allocated to the user in the main storage 15, and printing and transmission of the image data stored in the storage area). Then, the display input device 10 accepts the selection of the basic functions, configure settings for each of the selected basic functions, inputs, and operations.

It is to be noted that the basic functions of the MFP 100 are not limited to the four functions as described above and even two, three, and five or more basic functions may be employed.

Next, using FIG. 7, an description is made as to selecting setting items and setting of setting values by exemplifying the item selection screen S3 of the copy function which is displayed when the basic function of copy is elected. Incidentally, touching the display position of the home screen key HK arranged in the upper left corner of the item selection screen S3 will cause the home screen S2 to return, which allows for a re-selection of the basic function. The operation control part 11, when it recognizes the operation on the home screen key HK based on the output of the touch panel part 13, causes the display part 12 to display the home screen S2 instead of the item selection screen S3.

At first, in the MFP 100 of the present exemplary embodiment, the setting items (combine print, print resolution, print color, paper size, number of copies, zoom and many others) related to the copy function are large in number. Therefore, all of the keys for selecting setting items included in the copy function cannot be displayed within a single screen. Thus, groups are provided to separate the setting items of the copy function. Which setting items belong to which group is previously determined. The number of the groups to which the setting items belong may be only one or more than one.

Of the item selection screen S3, in the left portion thereof, there is provided a group selection region for selecting a group of the classification of setting items. As groups, five groups (Quick Setup, manuscript/Paper/Finishing, Color/Image Quality, Layout/Edit, Advanced Setup) are provided. For example, setting items related to color and image quality such as color settings of the print (full-color printing or monochrome printing) are determined to belong to the group of color/image quality. In addition, the setting items related to page layout such as the combine printing and two-sided printing and processing and editing of the image data are determined to belong to the group of layout/editing. In addition, the setting item that is extracted due to being frequently used by the user on experience is determined to belong to the group of Quick Setup. Thus, the respective setting items that can be set within one basic function are allocated in one or more groups previously. It is to be noted that describing the other groups in detail is omitted.

The user touches a display position of a group selection key K32 corresponds to the group to which the desired setting item belongs, the group selection key being selected from among group selection keys K32 contained in the group selection areas. Thus, the operation control part 11 displays keys for selecting set items, in a side by side manner, which correspond to the touched group selection key K32 on a setting item display area SA. As shown in FIG. 7, on the right side of the item selection screen S3, there is provided the setting item display area SA. The example of FIG. 7 illustrates a condition under which on the setting item display area SA, there are displayed the setting item keys K31 of the setting items (Combine Printing, Zoom, Duplex Printing, etc.) which are defined to belong to the group of Quick Setup.

On the setting item display area SA, there are arranged a plurality of setting item keys K31. Each of the setting item keys K31 is made up of a combination of an icon and character string that is indicative of a setting item name. Then, as shown in FIG. 7, the operation control part 11 causes the display part 12 to display the setting item name at a lower side of each of the setting item keys K31. In addition, the operation control part 11 causes the display part to allow for an indication of a setting value of the setting item at an upper side of each of the setting item keys K31 such that as to the setting item whose setting value is changed from its default value, the setting value to be displayed is the changed setting value, while as to the setting item whose setting value is not changed from the default value, the setting value to be displayed is the default setting value.

In the example of FIG. 7, with respect to the setting items of Combine Print, characters "Combine" are assigned at a lower side of the icon (the image as a key) characters "Combine" is assigned, while characters "2 in 1" are assigned at an upper side of the icon (The default setting value is "No Combine Print"). Also, as to the setting item key K31 of "Mixed Sized Manuscripts", characters "Mixed Sized" and characters "OFF" are respectively assigned at upper and lower sides of the icon (The default setting value is "OFF"). The setting value of the number of copies is displayed within a "Copies" column and 5 pieces are set in the example of FIG. 7 (The default setting value is "1 piece").

The operation control part 11, when it recognizes that the display position of the setting item key K31 is touched on the basis of an output of the touch panel part 13, causes the display part to display a set value setting screen (not shown) for selecting (setting) the setting value of the selected setting item. For example, when an operation is conducted on the Combine Print item, key K31 allows for displaying a setting value setting screen of Combine Print. As to setting items other than Combine Print, respective setting value setting screen are prepared.

It is to be noted that the screens and data (for example, the initial screen S1, the home screen S2, various items selection screens S3, and each of the setting item keys K31, the image data and text data for displaying each setting value setting screen) to be displayed on the display part 12 are stored as setting display data D3 in the storage part 15 of the display input device 10. Thus, the operation control part 11 causes the display part 12 to display the setting value setting screen corresponding to the operated setting item key K31.

Here, for all of the setting items, the default setting values are determined in advance. For example, in a setting item of Duplex Print (corresponding to a key with characters "Duplex" in FIG. 7), "No duplex Print (OFF)" is the default setting. Then, a bundle of the default settings for each of the setting items, is stored, as default setting data D1, in the storage part 15. Data (the default value data D1) that is indicative of a default value of each of the setting items is stored in the storage part 15 of the display input device 10.

Then, the operation control part 11 regards an operation that is made on the START key K33 (that may be provided as hardware keys) that is disposed at the upper right side of the item selection screen S3 as an instruction for executing a job. When the job execution instruction is issued to the display input device 10, the operation control part 11 causes the communication part 14 to transmit data that is indicative of the selected basic function, selected setting items, and data that is indicative of the contents, for example, the setting values, of the job to the main control part 100 of the MFP 100. The setting values of all of the setting items may be notified such that as to the setting item whose setting value is changed from its default value or whose setting value is not changed from its default value, the operation control part 11 notifies the changed setting value or the default setting value to the main control part 110 of the MFP 100. Alternatively, it may be available to cause each of the display input device 10 (the operation control part 11) and the main control part 110 to store and recognize the default setting value of each of the setting items, which is followed by a step in which the operation control part 11 notifies only the setting value (s) of the setting item (s) which is (are) changed from the default value (s).

Then, the main control part 110 causes the print part to execute a printing (copy job) pursuant to the default value (s) and the notified setting contents (set value (s) of each of the setting item (s)). For example, if the setting value of "2 in 1" is set in the setting item of Combine Print, in this copy job, the main control part 110 causes the print part to execute a print such that two pages of the original are allocated on a single sheet.

Meanwhile, the operation control part 11, when it recognizes that an operation is conducted on a Workflow utilization key on the initial screen S1 based on an output of the touch panel part 13, allows for displaying a Workflow management screen S4 as shown in FIG. 8. The Workflow management screen S4 is a screen that is only one level below the initial screen S1 in hierarchy. The operation control part 11 causes the workflow management screen S4 to display a workflow key K41 that corresponds to the workflow WF being under registration. In the example of FIG. 8, the workflow key K41 is shown in a plain white finished manner for simplicity. However, it is possible for the operation control part 11 to display, in the workflow key K41, characters and/or image data that are indicative of, for example, a name of the workflow WF that is set upon registration, combination functions, and characters or images that are indicative of the setting item(s) and/or setting value(s) that is (are) changed from their default setting item name(s) and/or setting value(s).

The operation control part 11 is configured to accept a specified calling operation that is made on the workflow key K41 that is displayed on the workflow management screen S4. Then, the operation control part 11 recognizes a calling of the workflow WF that corresponds to the workflow key K41 on which the calling operation is conducted. The specified calling operation may be defined, in an appropriate manner, as, for example, a single touch on the workflow key K41 or a double-click-like touching.

Calling the workflow WF will make it possible to initiate the job of the first function immediately on which the contents of the workflow WF (first function selected from among the basic functions, regarding first function, the previously selected and configured setting item(s) and set value(s)) are reflected and bring the display input device 10 into a condition under the first function with the previously selected and configured setting item(s) and set value(s) (reproduction of the condition defined in the workflow) (which will be detailed later). The workflow WF is stored in the storage part 15 as data that includes various parameter values.

Also, by way of the work flow management screen S4, it is possible to delete the workflow WF, edit the contents of the workflow WF, perform an instruction for initiating a registration of new workflow WF as well as calling (using) the workflow WF that is registered (stored) in the storage part 15 of the display input device 10.

It is to be noted that though the number of registrable workflows WF has an upper limit, at least dozens of workflows WF or more can be registered. Thus, sometimes the workflow management screen S4 may not display all the registered workflows WF. Hence, a next page key K42 is provided on the workflow management screen S4. When the next key K42 is manipulated, the operation control part 11 performs a page switch operation and causes the display part 12 to display a workflow key K41 that does not appear on the preceding page. A preceding page key K43 is also provided for going the workflow management screen S4 back to the preceding page.

(Creating a Workflow WF & Procedure for the Registration Thereof)

In the display input device 10 of the present exemplary embodiment, as to the procedure for registering a workflow WF, there are roughly two ways. Hereinbelow, as a first procedure, a procedure is described which is for creating a workflow WF using setting value(s) (that are different from the default value (s)) which is (are) set for executing a job on the item selection screen S3.

A second procedure is for creating and registering a new workflow WF by manipulation (s) with the work flow management screen S4, the manipulation(s) being performed in such a manner that the first function to be used is selected from among the basic functions, a setting item (setting items) is (are) selected, and a set value (set values) is (are) defined for the setting item (s). In the following descriptions, at first the first procedure is described and subsequently the second procedure is described.

(Creating a Workflow WF & the First Procedure of the Registration)

Figure 9:
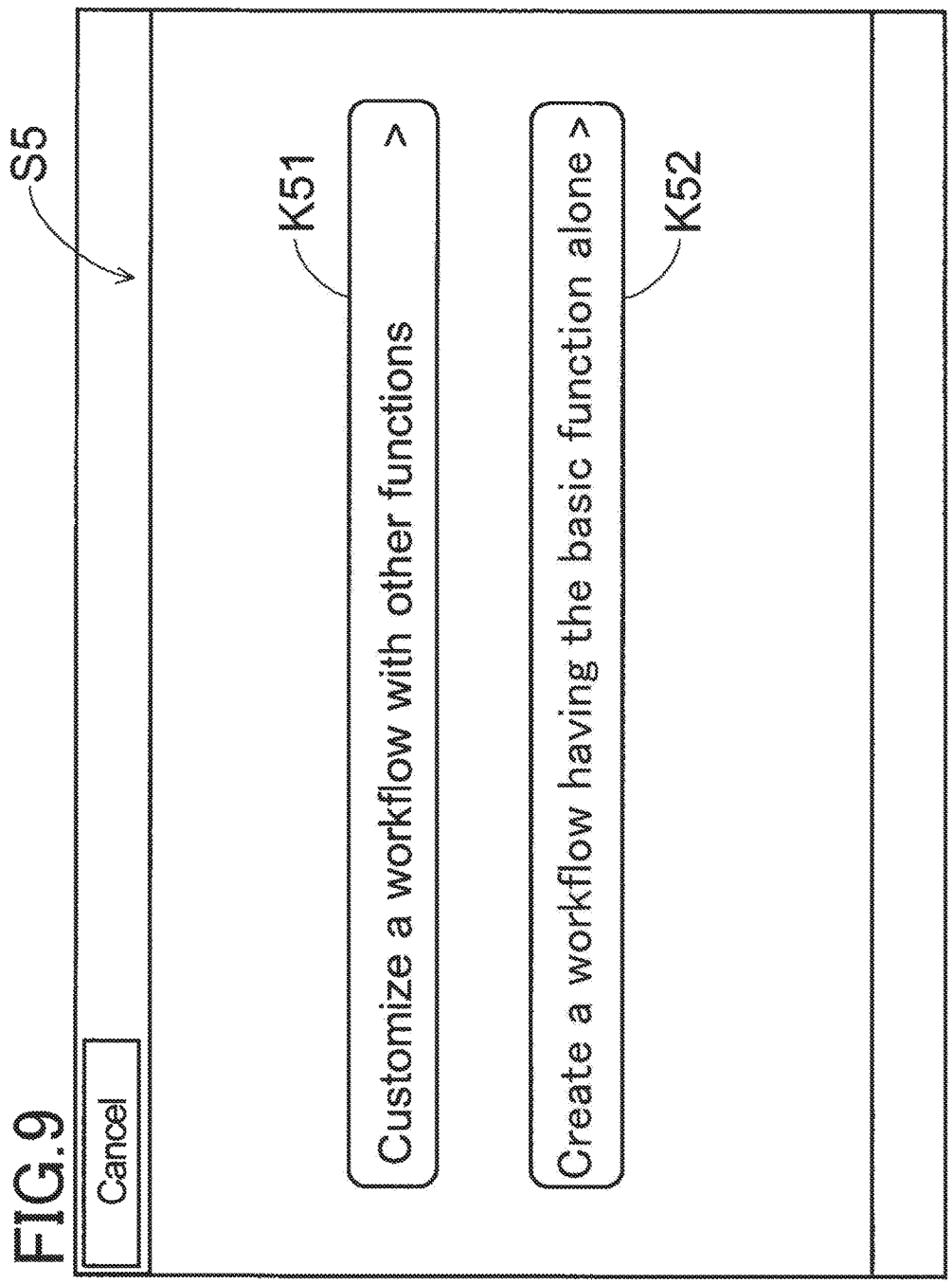
FIG. 9 shows one exemplary embodiment i.e. an example of a combination confirmation screen for selecting whether to create a workflow having a basic function alone or create a workflow having a combination of plural functions.
Figure 10:
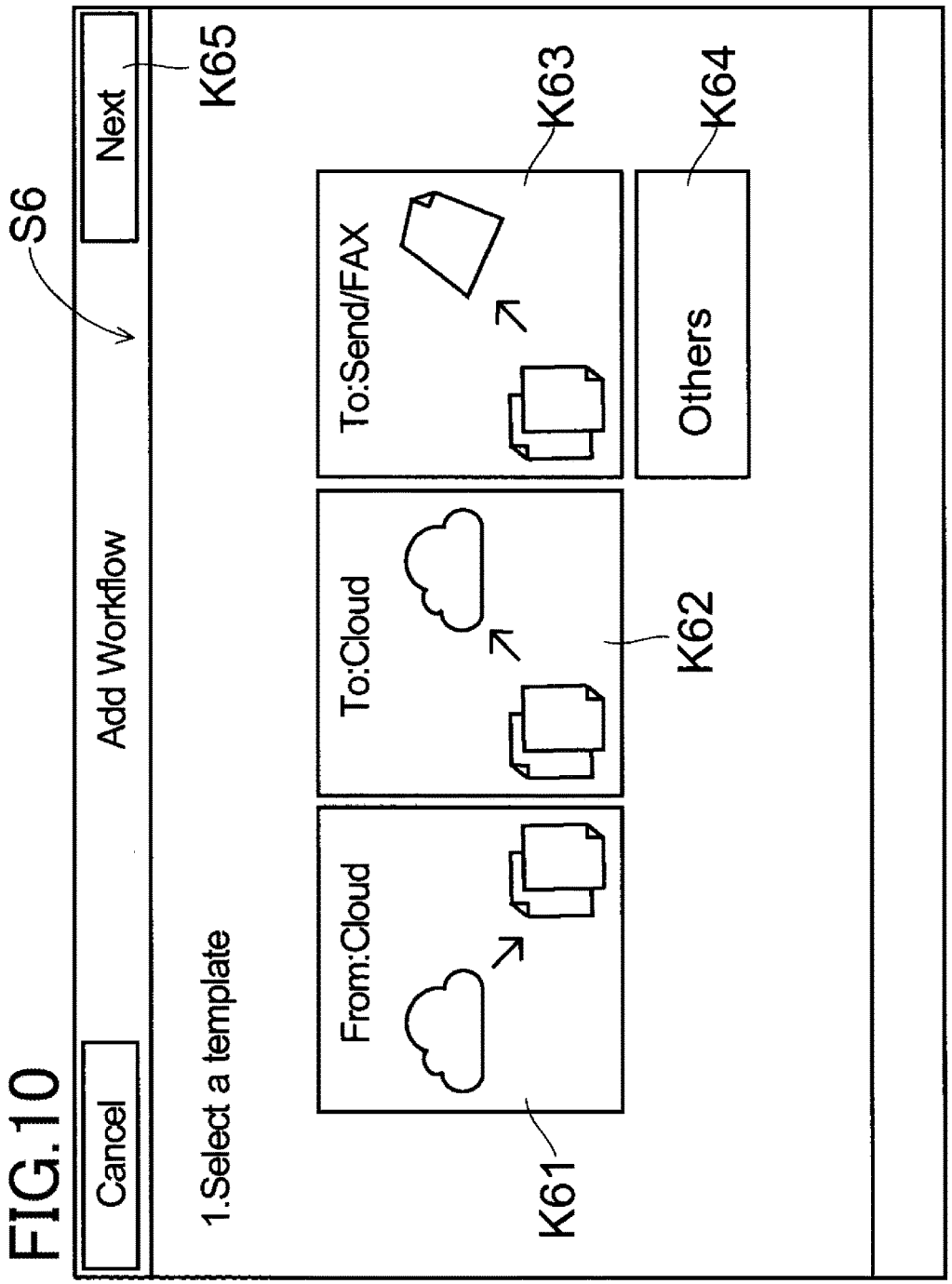
FIG. 10 shows one exemplary embodiment i.e. an example of a template screen that is displayed when a workflow is registered.
Figure 11:
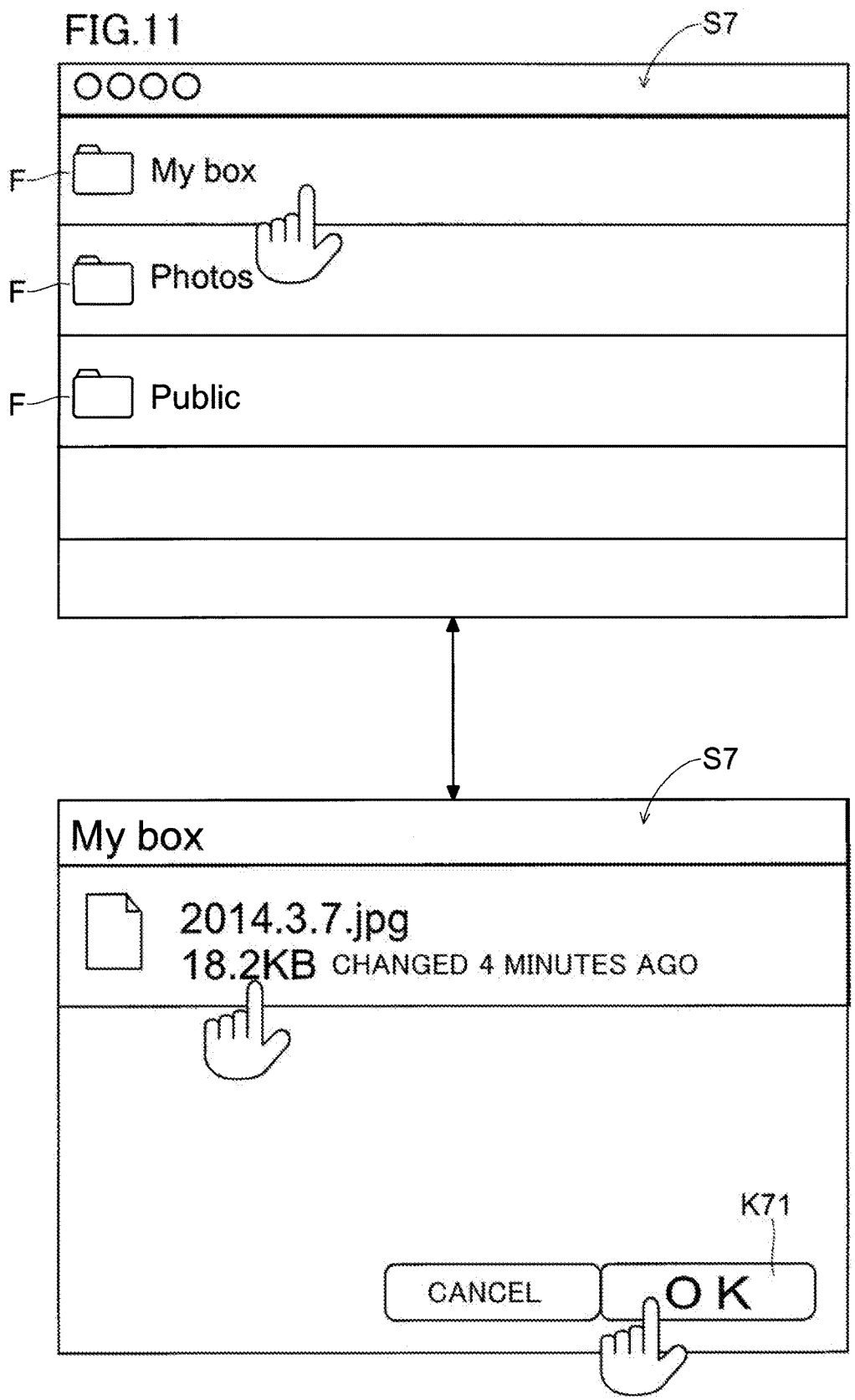
FIG. 11 shows one exemplary embodiment i.e. an example of a cloud setting screen when using a cloud utilized function.
Figure 12:
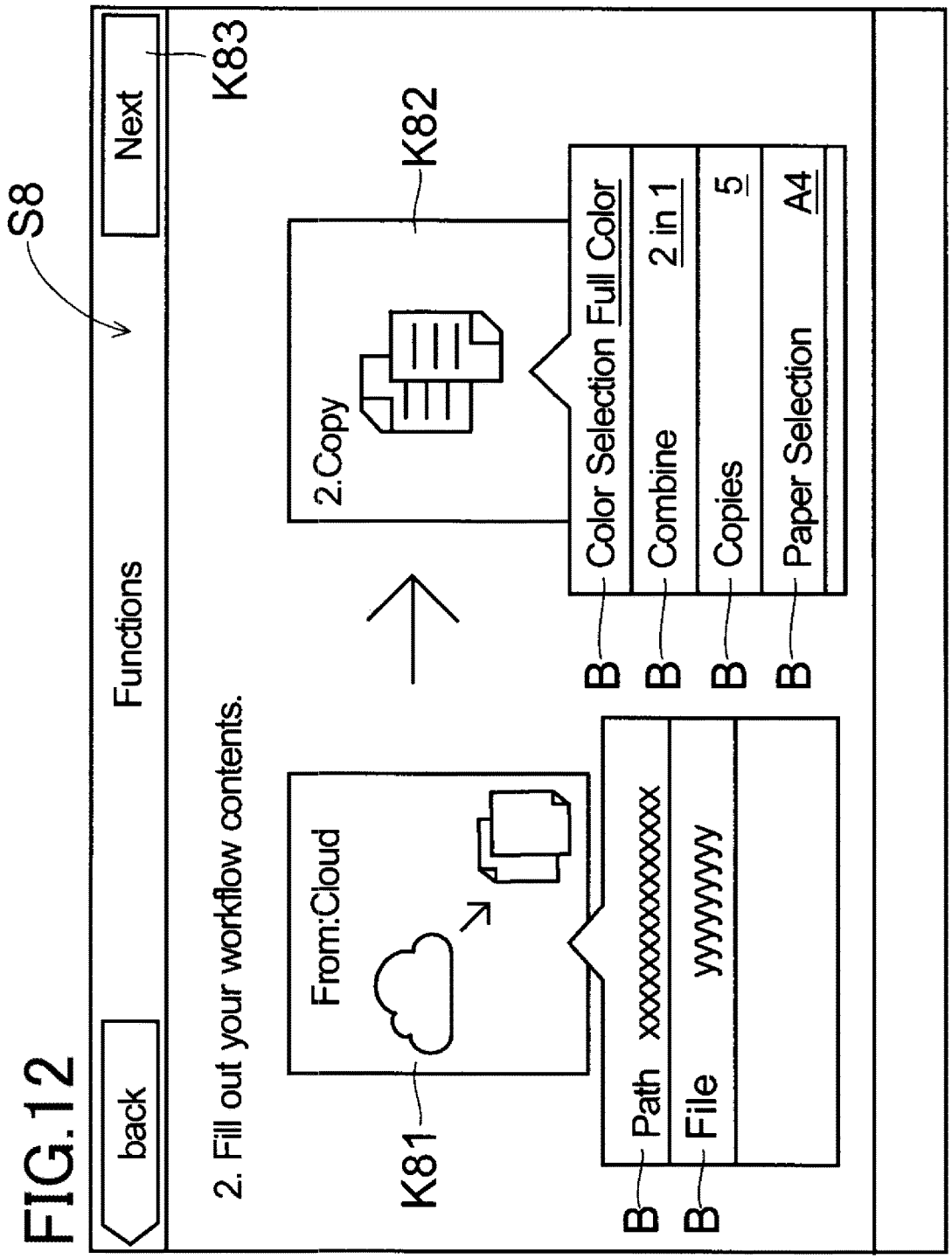
FIG. 12 shows one exemplary embodiment i.e. an example of a content confirmation screen.
Figure 13:
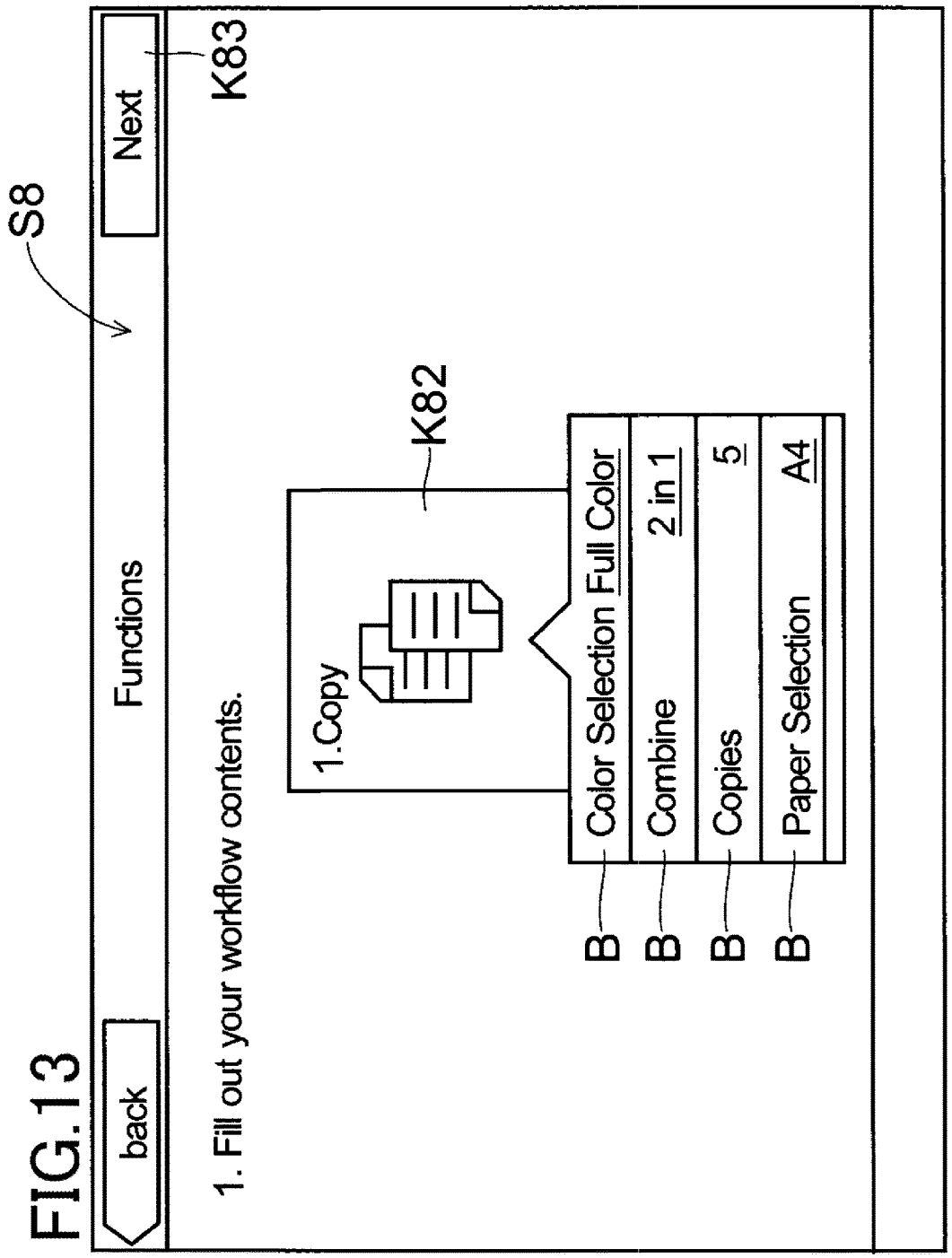
FIG. 13 shows one exemplary embodiment i.e. an example of a content confirmation screen.
Figure 14:
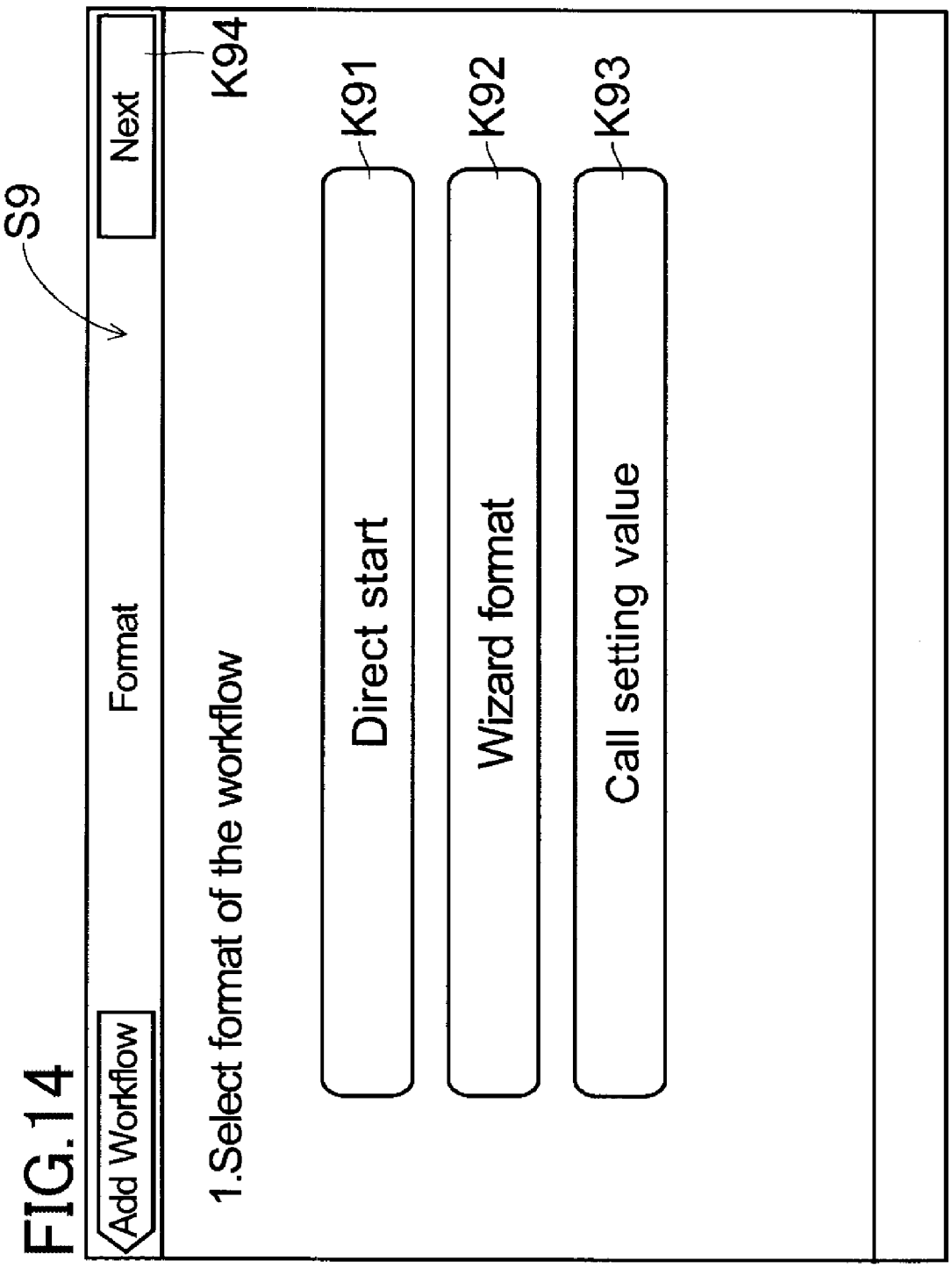
FIG. 14 shows one exemplary embodiment i.e. an example of a workflow utilization setting screen.
Figure 15:
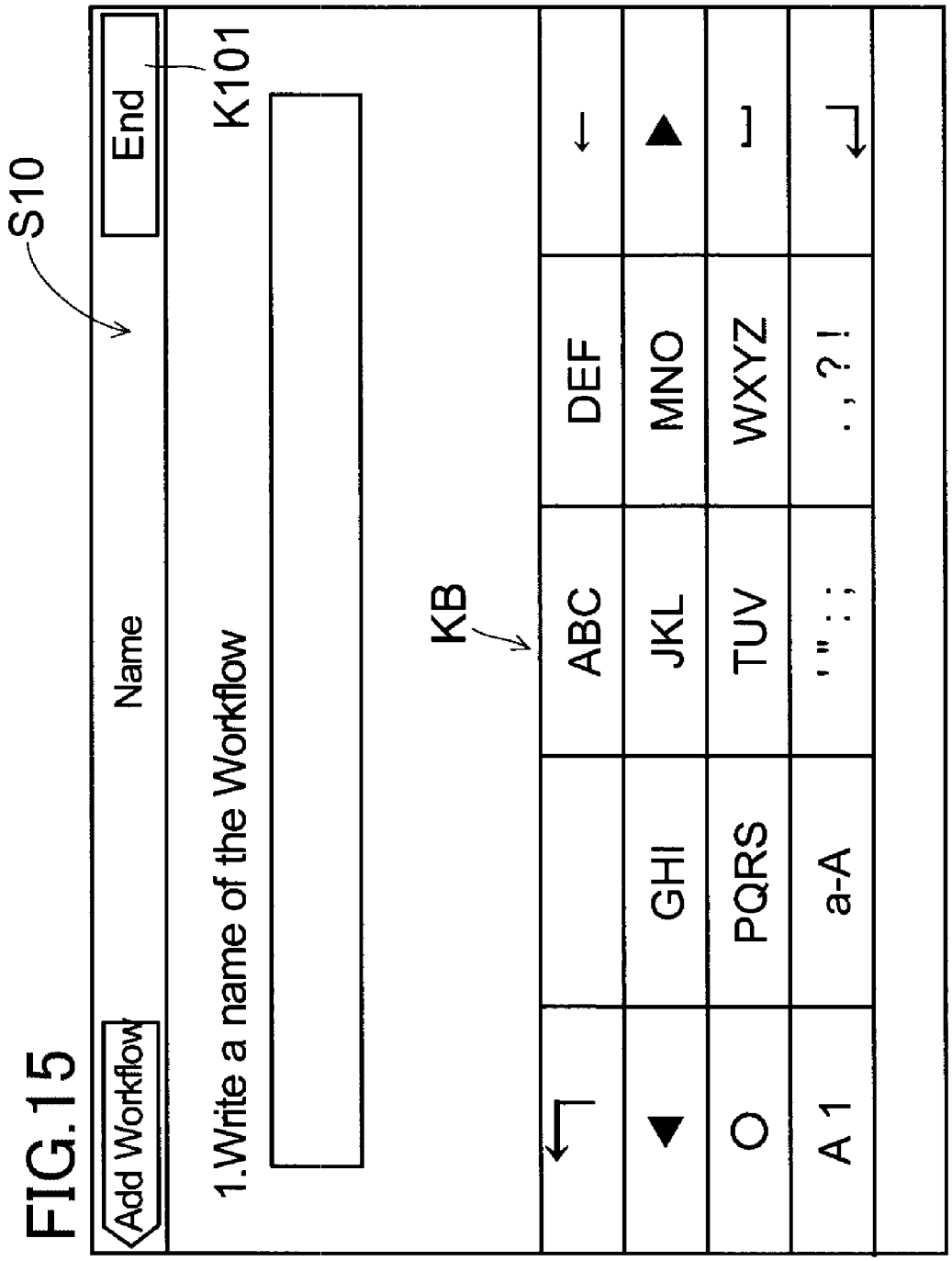
FIG. 15 shows one exemplary embodiment i.e. an example of a workflow name setting screen.

Next, referring to FIGS. 8 to 15, a description will be made as to a creation of a workflow WF and the first procedure of the registration. FIG. 9 is an illustration showing an example of a combination confirmation screen S5 for selecting whether to create a workflow WF with a basic function alone or create a workflow WF with a combination of plural functions. FIG. 10 is an illustration showing an example of a template screen S6 that is displayed when the workflow WF is registered. FIG. 11 is an illustration showing an example of a cloud setting screen S7 when a function that utilizes the cloud is used. FIG. 12 is an illustration showing an example of a content confirmation screen S8. FIG. 13 is an illustration showing an example of the content confirmation screen S8. FIG. 14 is an illustration showing an example of a workflow WF usage type setting screen S9. FIG. 15 is an illustration showing an example of a workflow WF name setting screen S10. It is to be noted that the combination confirmation screen S5, the template screen S6, the content confirmation screen S8, and use format setting screen S9 are screens for use in creating and registering a workflow WF (workflow creation and registration screens).

As shown in FIG. 7, the operation control part 11 causes the display part 12 to display a workflow creation key K30 within an item selection screen S3. It is to be noted that the workflow creation key K30 is arranged within each the item selection screen S3 of each of the basic functions. In the example of FIG. 7, a star shape (star icon) is indicative of the workflow created key K30.

The operation control part 11, when it recognizes that a touch operation is conducted on the workflow creation key K30, allows for displaying a combination confirmation screen S5 as shown in FIG. 9. At this time, the operation control part 11 recognizes that, as the first function, the basic function is selected whose content(s) is (are) set in the item selection screen S3 that was displayed immediately before the combination confirmation screen S5. Also, the operation control part 11 causes the storage part 15 to retain the set content(s) that is (are) set in the item selection screen S3 as the set content(s) of the first function. Further, the operation control part 11 causes the display part 12 to display a first confirmation key K51 and a second confirmation key K52. The first confirmation key K51 is to be operated when a workflow WF is created and registered that has a combination of the basic function as of when the workflow creation key 30 was operated and another (other) function(s). The second confirmation key K52 is to be operated when a workflow WF is created and registered that has the basic function alone (without being combined with another function) as of when the workflow creation key 30 was operated.

The operation control part 11 is configured to execute a control operation that combines the set item (s) selected in the selected first function, the set value(s) changed from the default value(s), and further the pre-specified function(s) allowed to combine with the basic function (combination function). More specifically, when operation for the first confirmation key K51 is recognized, the operation control part 11 causes the display part 12 to display a template screen S6 as shown in FIG. 10.

The template screens S6 is a screen for selecting which function among the combination functions is combined with the first functions that include the copy function, box function, transmission function, and FAX transmission function all of which are provided to the MFP 100. For example, the template screen S6 indicates a plurality of pre-specified combination functions as options.

The template screens S6 allows for determining whether or not the first function is combined with a cloud utilizing function (download function and upload function). The cloud utilizing function of the MFP 100 according to the present exemplary embodiment, is a function to utilize an online (a network) storage service. When the workflow WF is called, the template function screen S6 is capable of performing a setting as to whether or not a copy image transmission function is combined with the first function, the copy image transmission function being able to transmit image data that is identical with the job contents of the executed first function to the computer 400, the FAX device 500, and the main body side storage part 113.

Then, for enabling the display input device 10 and the MFP 100 to utilize the cloud utilizing function, an application APP for utilizing the cloud function is installed in the storage part 15 of the display input device 10 and the main body side storage part 13 of the MFP 100. The operation control part 11 and main control part 110 activate, as necessary, the application AP for utilizing the cloud function, for realizing the function that utilizes the cloud.

1. Download Function

When the download function among the combination functions is used, the operation control part 11 causes, based on the path of the cloud (server 600) defined by data of the called workflow WF, the MFP 100 (main body side communication part 120) to receive data that is to be used in a job from the cloud.

When the job is executed based on the work flow WF in which the first function is combined with the download function, the operation control part 11 causes, based on the downloaded data, the communication part 14 to transmit data, to the communication part 120 (main control part 110) of the main body side of the MFP 100 which is indicative of data that instructs a data downloading from the cloud and executing job pursuant to the setting contents (selected setting item(s) and set value(s)) of the first function that is defined by the workflow WF based on the down-loaded data.

The main control part 110 of the MFP 100 causes, according to the instruction (data) from the display input device 10, operation of the print part and the main body side communication part 120. The main body side communication part 120, based on the path marked in the data received from the operation control part 11, downloads data from the cloud. Then, the main memory 15 of the MFP 100 stores the downloaded data. The main control part 110 of the MFP 100 executes a job based on the downloaded data. For example, incorporating formatted documents for business use and model documents from the cloud allows for an achievement of printing and transmitting error-free documents. In such a case, the display input device 10 acts as a device that gives orders and instructions to the MFP 100.

It is to be noted that the tablet and smartphone, which have an ability to connect with wireless communication systems, are capable of download data from the cloud. Thus, when the tablet or the smartphone is used as the display and input device 10, it may be available that execution of a job pursuant to the workflow WF in which the first function and the download function are combined causes a download of data to be used in a job from the cloud (network storage) and the resulting data is caused to be forwarded to main body side communication part 120 (main control part 110) of the MFP 100.

For example, if an instruction for executing a job is issued based on the workflow WF which combines the transmission function as the first function and the download function, the operation control part 11 causes the communication part 14 to transmit an instruction whose gist is to execute a transmission job pursuant to the setting contents (selected setting item(s) and set value(s)) of the workflow WF and an instruction whose gist is to download data from a location of the path specified by the workflow WF to the main body side communication part 120. The main control part 110, in receipt of these instructions, causes the main body side communication part 120 to download the data from the specified location and control the execution of the job pursuant to the setting contents of the workflow WF.

For the creation of the workflow WF in which the download function is combined, the template screen S6 is provided with a download function key K61. The operation control part 11, when it recognizes an operation to the download function key K61 on the template screen S6, causes the display part 12 to display a cloud setting screen S7 that is shown in FIG. 11.

More specifically, the operation control part 11, when it recognizes the operation on the download function key K61, activates the application AP for the cloud service in the storage part 15 and causes the display part 12 to display a log-in screen (not shown) for setting an account, a user ID, and a password that are essential for utilizing the cloud functions. Then, the operation control part 11 causes the communication part 14 to transmit data that is inputted to the log-in screen to a provider of the online storage (server 600). Then, after receiving an authentication, the operation control part 11 causes the display part 12 to display an online storage data structure screen as shown in FIG. 11.

In the example of FIG. 11, the cloud data structure is in the form of a hierarchical structure. The user repeats a touch operation on displayed folders F and displays contents of the folder F in which data is stored that is desired to be downloaded from the top of the hierarchy. Then, touching the display position specifies the desired data to obtain by downloading. In such a way, in the course of creating the workflow WF in which the download function and the first function are combined, the operation control part 11 recognizes the path of the specified path (path of the download source). Then, the operation control part 11, when it recognizes an operation to an OK key K71 on the cloud setting screen S7, recognizes combining the download function to the first function and the established path of the download source.

2. Upload Function

When the upload function of the combination functions is utilized, the operation control part 11 causes, based on the path of the cloud (server 600) that is defined by the data of the called workflow WF, the main body side communication part 120 of the MFP 100 to upload the data to the cloud.

When executing a job by calling the workflow WF in which the first function and the upload function are combined, the operation control part 11, based on image data obtained by scanning and communications, provides an instruction whose gist is to execute the job pursuant to the setting item(s) of the first function of the workflow WF to the main control part 110. Furthermore, the operation control part 11, pursuant to the path defined by the workflow WF, causes the main body side communication part 120 to transmit an instruction for uploading copy image data as a copy of the job to the main control part 110. The main control part 110 causes, pursuant to these instructions, the print part and the main body side communication part 120.

It is to be noted that the tablet and smartphone, which have an ability to connect with wireless communication systems, are capable of uploading data from the cloud. Thus, when the tablet or the smartphone is used as the display and input device 10, it may be available that calling and executing a job pursuant to the workflow WF in which the first function and the download function are combined causes the terminal control part 301 to receive data that is uploaded from the main body side communication part 120 of the MFP 100 and the terminal communication part 305 uploads the received data to be uploaded to the cloud (network storage).

Here, the copy image data is image data that is indicative of the result of executing the job of the first function, such as print function, transmission function, and box function (storing scanned data in the main storage part 15). It is to be noted that the file format may be different from the image data generated during the execution of the first function based on the setting contents of the workflow WF. For example, when a workflow WF having a setting value of 2 in 1 is called and the job is executed, the copy image data is image data in which two page images are arranged in a single page. For example, a combination of the scan transmission and the upload function makes it possible to create image data of documents including business diaries and reports and retain such image data as a copy in the cloud.

The main control part 110 of the MFP 100, pursuant to instructions from the operation control part 11, controls a job execution. More specifically, the main control part 110 causes the print part, reading part, and the main body side communication part 120 to execute jobs pursuant to the setting contents of the called workflow WF, and causes the main body side communication part 120 of the MFP 100 to upload the copy data to the cloud.

For example, executing the workflow WF in which the transmission function and upload function are combined makes it possible to transmit the image data whose contents are identical with the setting contents of the first function of the workflow WF and to upload the copy image data to a storage location (path) designated by the workflow WF.

For the creation of workflow WF having the combined upload function, the template screen S6 is provided with an upload function key K62. Then, the operation control part 11, when it also recognizes an operation to the upload function key K62 on the template screen S6, causes the display part 12 to display a cloud setting screen S7 as shown in FIG. 11.

More specifically, the operation control part 11, when it recognizes touching the displayed position of the upload function key K62, activates the application AP for the cloud service and causes the display part 12 to display a log-in screen for setting an account, a user ID, and a password that are essential for utilizing the cloud functions. Then, the operation control part 11 causes the communication part 14 to transmit data that is inputted to the log-in screen to a provider of the online storage (server 600). Then, after receiving an authentication, the operation control part 11 causes the display part 12 to display an online storage data structure screen as shown in FIG. 12.

Then, the user designates a folder in which the user desires for storing data to be uploaded by touch operation. Thus, the operation control part 11 recognizes a path of the designated data (path of upload destination) during a process of creating workflow WF in which the upload function and the first function are combined in the creation process. Then, the control part 11, when it recognizes the operation conducted on the OK key on the cloud setting screen S7, recognizes the combining of the upload function to the first function and the determined path of the upload destination.

3. Copy Image Transmission Function

A copy image transmission function is a function to transmit copy image data that is being in combination with the basic function such as the copy function or the box function to a specified transmission destination. For example, sometimes, it is requested to transmit a copy to a specified computer 400 or a FAX device 500 in a case where as to a report and circulating document, a copy for each person is stored in a separate manner and storing a document that is transmitted to a location to which plural persons are capable of accessing. In such a case, utilizing the image transmission function in concurrence with a printing or scanning operation performed by a document creator per se makes it possible to transmit the image data of the document to the specified destinations without omission. It is to be noted that the copy image data is similar to that in the upload function.

More specifically, in the copy image transmission function, the operation control part 11 of the display input device 10 transmits, to the main control part 110 (main body side communication part 120) of the MFP 100, an instruction whose gist is to execute a job pursuant to setting contents that include the first function that is defined in the workflow WF, the setting items selected in the first function, and setting values. The main control part 110 causes the print part, reading part, communication part 14 and others to operate pursuant to instructions to execute the job.

In addition, the operation control part 11 transmits an instruction to the main control part 110 (main body side communication part 120) of the MFP 100, the instruction being indicating of a transmission of copy image data, as a copy of the job of the setting contents of the called workflow WF, to specified transmission destinations (FAX address, Network address, and others). The main control part 110 causes the main body side communication part 120 to transmit the copy image data to the specified destinations according to the instruction.

On the template screen S6, there is provided a copy image transmission function key K63 in order to create and register a workflow FW in which a combination is established of such a basic function of the MFP 100 and the copy image transmission function involving a transmission function of transmission to the computer 400 and more. The operation control part 11, when it recognizes an operation of the copy image transmission function key K63, causes the display part 12 to display a transmission destination setting screen (not shown) similar to the normal transmission job. For example, when the pre-registered destinations are narrowed by name or the like, an address note is displayed. Manual inputting of a destination using a software key board KB makes it possible to specify an address of the transmission destination.

Thus, it is possible to specify a transmission destination (destination, address) in the copy image transmission functions as the combination function (second function). The operation control part 11, when it recognizes an operation for closing the transmission destination setting screen after setting the transmission destination, recognizes that a combination of the copy image transmission function with the basic function is established and the setting has been done whose gist is to transmit the copy image data to the specified destination.

In addition, on the template screen S6, there is provided an others key K64. The others key K64 is to be operated when another function that can be selected, as a function to be combined with the first function, from among functions other than the aforementioned three functions (download function, upload function, and copy image transmission function).

The operation control part 11, when it recognizes an operation (touching) of the others key 64, a screen is displayed for setting the function that is capable of being combined with the first function and that is other than the download function, the upload function, and the copy image transmission function. Through this screen, it is possible to select a basic function other than the first function as a combination function. In other words, the operation part recognizes and receives an operation for creating and registering a workflow WF in which the first function is combined with one or more basic functions as a second function. For this reason, the basic functions that include, for example, the copy function, the transmission function, and the box function are available as combination functions. For example, when the first function is the transmission function, the operation control part 11 recognizes an operation that sets the copy function or the box function as the combination function.

In addition, through the screen on which is displaced the operation (touching) of the others key 64, it is possible to establish another setting wherein the selected one of the first functions and one of the second functions are combined with another function. In other words, it is possible to create a workflow including three or more functions. For example, the touch panel part 13 receives a setting input that causes the copy function as the first function to be combined with the upload function, the copy image transmission function, and others. Then the operation control part 11 recognizes that the basic function (first function) has been combined with plural other functions (the second function).

Furthermore, when the operation is conducted for the function selection after the operation of the others key K64, the operation control part 11 causes the display part 12 to display a screen for making settings for the function to be combined with the first function, the settings include, for example, selecting setting items, setting the setting values, and setting path that related to the second function (first function or combination function) which is set to be combined with the first function. The operation control part 11 recognizes the operation and inputted contents through the setting screen.

On the other hand, after completion of the selection and setting of the combination function (the second function) through the template screen S6, or after making an operation to the next key K65 provided on the template screen S6 instead of the selection of the combination function through the template screen S6, the operation control part 11 allows for displaying a screen for the next step.

More specifically, as the next step of the template screen S6, the operation control part 11 causes the display part 12 to display a content confirmation screen S8, as shown in FIG. 12. In the example of FIG. 12, the second function in the workflow that is in the course of creation is the download function and the first function therein is the copy function.

The content confirmation screen S8 is a screen that is configured to make confirmations and setting changes of the kind of the first function and the setting contents (information) including the setting items that are selected and set in the first function and the setting values, and the second function combined with the first function. On the content confirmation screen S8, there are provided a second function key K81 (leftward key in FIG. 12) corresponding to the combined second function and a first function key K82 (rightward key in FIG. 12) corresponding to the first function.

Then, when the second function is a function related to the cloud and the second function key K81 is operated, the operation control part 11 causes the display part 12 to display, as current setting values of the cloud utilizing function, a list that includes setting contents (information) of the second function, such as a cloud service name, a path name of the upload destination, a path name of the download destination, and a name of data to be download. In addition, when the second function is the copy image transmission function and the second function key K81 is operated, the operation control part 11 causes the display part 12 to display, as a current setting values of the copy image transmission function, a list including information, such as an address of the transmission destination and transmission mode (network transmission or FAX transmission).

Then, the operation control part 11, when it recognizes a touching operation of the first function key K82, causes the display part 12 to display the setting items selected in the first function and names of the setting values of the respective selected items in the form of a list. FIG. 12 illustrates an example wherein, as to color setting, combine print, the number of printing sheets and a sheet size to be used in printing, setting items and their setting values are indicated in the form of a list. It is to be noted that the operation control part 11 is allowed to cause the display part 12 to display each of the list of the second function and the list of the first function immediately when the content confirmation screen S8 appears.

The display part 12 causes the list of the first function and the list of the second function to display one or more item bars B (strip-shaped image). The operation control part 11 recognizes a touching operation on the item bar B of the first function as an operation to change the selection of the setting item or the setting value of the setting item. The operation control part 11 causes the display part 12 to display the setting value setting screen of the setting item corresponding to the operated item bar B of the first function. For example, among the list shown in FIG. 12, the operation control part 12, when it recognizes the operation to the item bar B in the list which includes the characters of Combine, causes the display part 12 to display a screen for selecting setting value of the setting item of the combine print. In such a way, the touch panel part 13 receives resetting the setting value through the content confirmation screen S8 and the operation control part 11 recognizes the resulting setting value.

It is to be noted that all the setting items may not fall within the list due to the fact that the number of the setting items to be placed in the list (selected setting items are too numerous). In such a case, the operation control part 11, when a specified scroll operation (for example, a flick operation) is made on a zone of the list which appears, causes the display part 12 to display a zone that has not appeared.

In addition, although operating the first confirmation key K51 causes the template screen S6 to appear, when an operation is conducted on the next key k65 without selecting and setting the combination function, the control part causes the display part 12 to display the content confirmation screen S8 as shown in FIG. 13. In an example shown in FIG. 13, the combination function is not set and therefore a condition is illustrated wherein the keys and lists are provided.

It is to be noted that, similar to the explanation as to FIG. 12, the content confirmation screen S8 makes it possible to display the list and reset the setting value of the first function.

In addition, after the operation of the workflow creating key K30 on the item selection screen S3, when an operation is conducted on the second confirmation key K52, which means that the user makes an input that is indicative of a creation and registration of a workflow with the basic function alone. In such a case, also, the operation control part 11 allows for displaying, as a next screen, the content confirmation screen S8 as shown in FIG. 13.

Then, the operation control part 11, when it recognizes an operation of the next key K83 that is provided on the content confirmation screen S8, causes the display part 12 to display a using format setting screen S9 for the workflow WF as shown in FIG. 14.

The using format setting screen S9 is capable of setting how to use the workflow WF. At first, each of the registered workflow WF of the present exemplary embodiment includes data that is indicative of a first function selected from among the basic functions of the called workflow WF, selected setting items in the first function, the setting values set in the first function, a second function selected from among the combination functions such as the upload function and the download function, and plural kinds of setting values such as path and address which are specified in the second function.

Then, the utility mode of the workflow WF is divided into the following three main formats.

(1) Direct execution format (executing job immediately upon being called)

(2) Wizard format (displaying the setting value setting screens of the setting items of the first function sequentially upon being called)

(3) Call setting value format (causing the display input device 10 to be set at the setting values defined by the workflow WF)

At first, the operation control part 11 recognizes the operation of touching a display position of a direct execution key K91 of the utilization formatting screen S9, as an instruction to create a workflow WF of the direct execution format. In addition, the operation control part 11 recognizes an operation of touching a display position of a wizard format key K92, as an instruction to create a workflow WF of the wizard format. Furthermore, the operation control part 11 recognizes an operation of touching a display position of a set value call key K93 of use formatting screen S9, as an instruction to create a workflow WF of setting value calling format. It is to be noted that a specific behavior corresponding to the format when calling the workflow WF will be detailed later.

The operation control part 11, when an operation of the next key K94 is made on the utilization formatting screen S9, recognizes that setting of the utilizing form of the workflow WF has been completed. In addition, the operation control part 11 recognizes the utilization form of the operated (selected) key as the utilization format of the workflow WF. Then, when the next key K94 is operated on the utilization format setting screen S9, the operation control part 11 causes the display part 12 to display a name setting screen S10 for the workflow WF, as shown in FIG. 15.

Through the name setting screen S10, it is possible to set a name of the workflow WF to be registered. On the name setting screen S10, there is provided a software keyboard KB. The user, using the software keyboard KB, can input the name of the workflow WF. The operation control part 11 recognizes a touching operation on each of the keys of the software keyboard KB and causes a name indication column to display the resulting characters and symbols.

Then, on the name setting screen S10, there is provided an end key K101 for accepting a completion of the setting (steps) of the workflow WF to be registered is placed. When the operation to the end key K101 (registration operation of the workflow WF) is made, the operation control part 11 completes the setting contents of each function (the first and second functions if both the first and second functions are selected) of the workflow WF to be registered.

When an operation is conducted on the end key K101, the operation control part 11 causes the storage part 15 to store the data of the contents of the workflow WF, which are set during the above mentioned process. More specifically, the operation control part 11 causes values and information, as a workflow WF or data, the values and information include the first function, the setting items of the first function, the setting values of the selected setting items (the setting values that are different from the default set values), the presence or absence of a combination of function, the selected combination function, the setting contents of the second function (data of the storage destination related to the cloud, path of the download source, the destination address in the copy image transmission function etc.), the selected utilization format, the name of the set workflow WF, creation date and time. As a result, the registration of the workflow WF is completed (Creation of a Workflow WF, the Second Step for its Registration)

Figure 16:
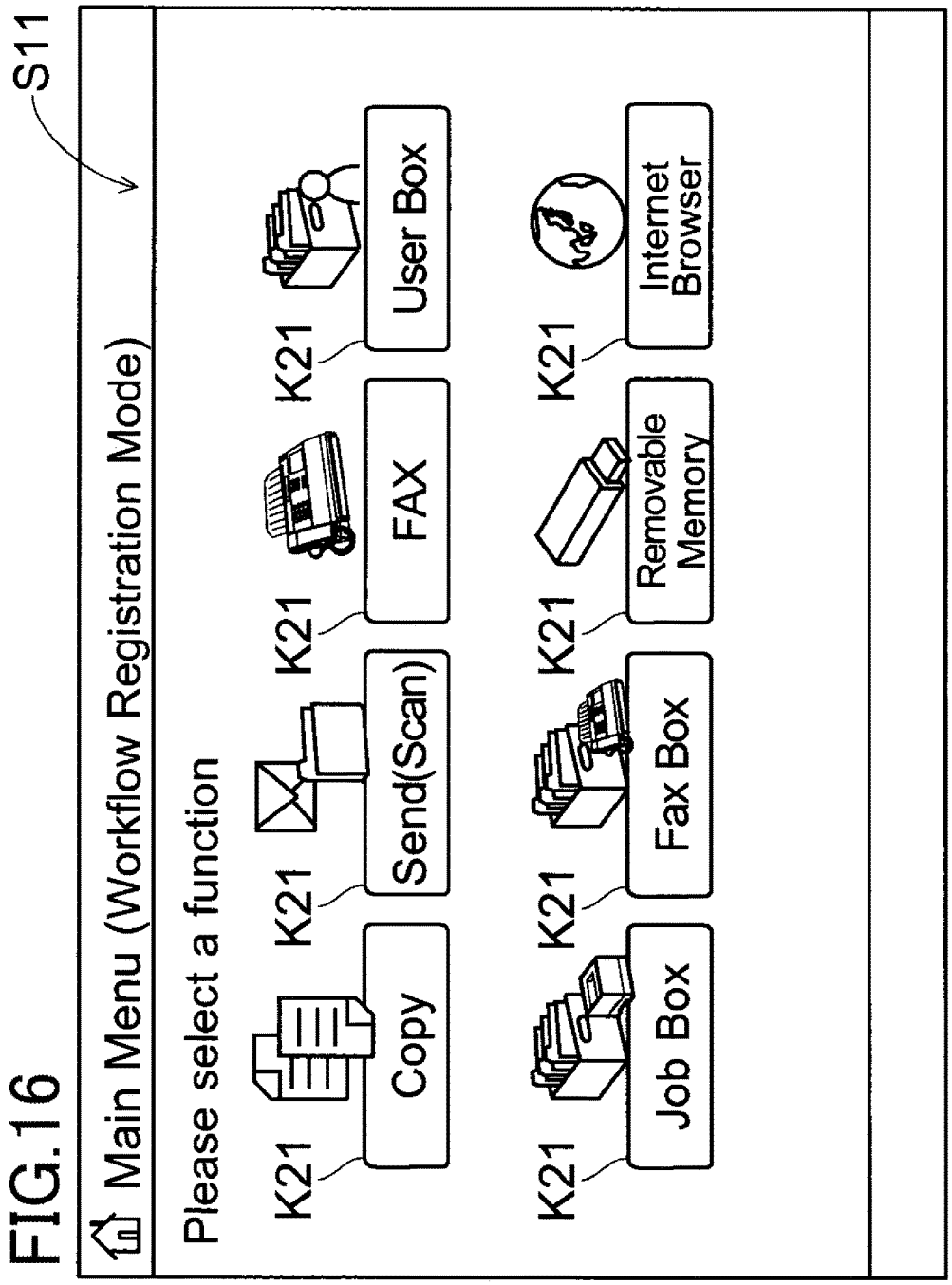
FIG. 16 shows one exemplary embodiment i.e. an example of a function selection main screen for selecting a basic function to be used in a workflow.
Figure 17:
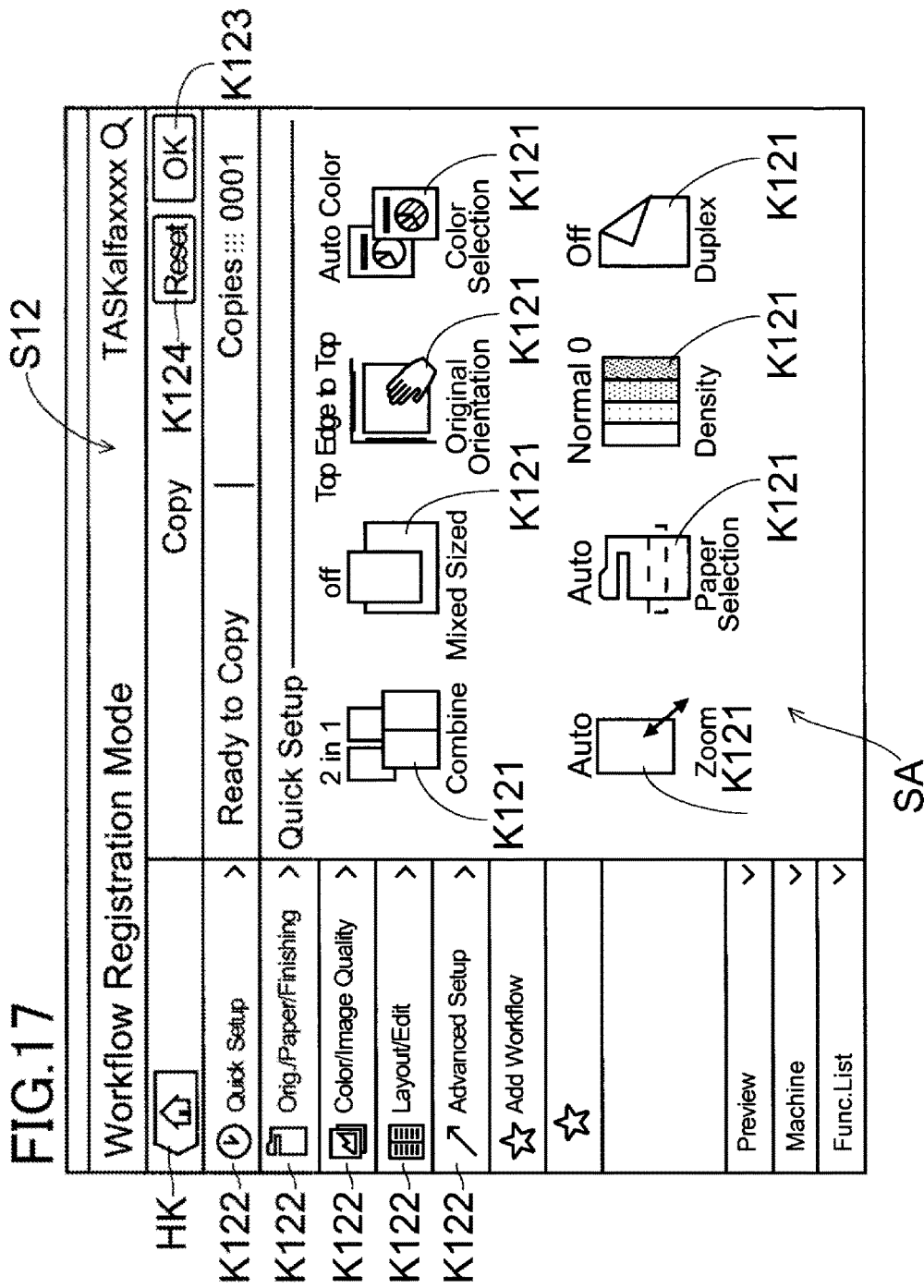
FIG. 17 shows one exemplary embodiment i.e. an example of an item selection screen for selecting a setting item of the first function and setting a setting value.

Next, with reference to FIGS. 8, 16, and 17, a description is made as to a second step of the creating and registration process of the workflows WF. FIG. 16 is an illustration showing an example of a function selection main screen S11 for selecting the basic function used in the workflow WF. FIG. 17 is a view showing an example of the item selection screen S12 for selecting setting items and setting the setting values.

The aforementioned first procedure is to achieve an easy registration of a new workflow WF in a case where the user begins to register the workflow WF whose setting contents of the job which the user has done, while doing the settings for the execution of the job, at the initiation of executing the job, or at the termination of executing the job. This will make it possible to create and register easily a workflow WF whose contents include the currently set condition, or the currently set condition is changed or added with additional setting, without having to destroy the currently selected setting item and setting value, when the user suddenly has an idea to reserve the currently set value during the setting operation or when the user wants to reserve the workflow FW after initiation of the job execution.

Meanwhile, operating the workflow management screen S4 makes it possible to start a new creation and registration of a workflow WF. This is the second step. For example, in a case where the basic functions to be used, the setting items to be selected, and the setting values are previously determined, it is convenient to create and register a new workflow WF using the second step. In addition, providing plural steps for the creation and registration of the workflow WF enhance easiness in creation of workflow WF.

More specifically, for the initiation of a new registration of a workflow WF based on the second step, there is provided a new registration key K40 on the workflow management screen S4. In an example of FIG. 8, the new registration key K40 is arranged as a figure imitating a plus sign that means new additions. Then, the operation control part 11 recognizes the touching operation of the display position of the new registration key K40 as the initiation of the creation and registration of the new workflow WF such that selecting functions, setting items and setting values are made from the blank slate.

It is to be noted that the new registration key K40 may be displayed, other than on the workflow management screen S4, on the initial screen S1 that is one hierarchy level higher than the workflow management screen S4 (ref. FIG. 5). In addition, the new registration key K40 may be displayed only on the initial screen S1 instead of the workflow management screen S4. Providing the new registration K40 on a higher level hierarchy will bring the workflow WF into a more user-friendly one.

The operation control part 11, when an operation is conducted on the newly registered key K40, causes the display part 12 to display the function selection main screen S11 as shown in FIG. 16. Like the home screen S2, the function selection main screen S11 is provided with a basic function keys K21 including a copy key to select the basic functions to be used in the workflow WF. In this arrangement, in order to clearly demonstrate that the workflow WF is under construction, the operation control part 11 may cause the display part 12 to display a message indicating the workflow registration mode (see FIG. 16). Then, the operation control part 11 recognizes the function corresponding to the touch-operated key on the function selection main screen S11 as the basic functions (the first function) to be used in the workflow WF.

Then, when the basic function (the first function) is selected that is to be used in the newly created workflow WF through the function selection main screen S11, the operation control part 11 causes the item selection screen S12 for selecting the setting items of the first function S12 to be displayed. FIG. 17 shows an example of the item selection screen S12 when the copy function is selected.

An item selection screen S12 for each of the basic functions is the same as the item selection screen S3 in the normal setting. However, in order to achieve a clear indication that the workflow WF is under creation, the operation control part 11 may cause the display part 12 to display a message indicating the workflow registration mode (ref. FIG. 17). The operation control part 11 causes the display part 12 to display, instead of a start key K33 for instructing an initiation of job execution in the normal setting, an OK key K123 for completing selection of setting items and settings of setting values thereof.

The operation control part 11 causes a group selection region to display group selection keys S122 in the item selection screen S12. In addition, the operation control part 11 causes the display part 12 to display a plurality of setting items key K121 on a setting item display region SA. When an operation is conducted on any one of the item setting keys K121, the operation control part 11 causes the display part 12 to display a setting value setting screen (not shown) that is for selecting a setting value of the selected (touched) setting item. These are similar to those in the normal setting. The operation control part 11, based on recognition of these operations, recognizes the selected setting item and the selected or set setting value as to the first function that is to be included in the workflow WF.

When an operation is conducted on the OK key K121 on the item selection screen S12, the operation control part 11 recognizes that the setting of the first function of the workflow WF to be newly created has completed. Then, the operation control part 11 causes the display part 12 to display the template screen S6 as shown in FIG. 10.

Then, in the second step, the transfer procedure of the template screen S6 is the same as that in the first step, which makes it possible to apply the description of the first step as it is. In order to avoid repeating the same description, a description that ranges from the template screen S6 to the name input screen is omitted by using the corresponding description of the first step.

(Indication of Workflow Registration Information)

Figure 18:
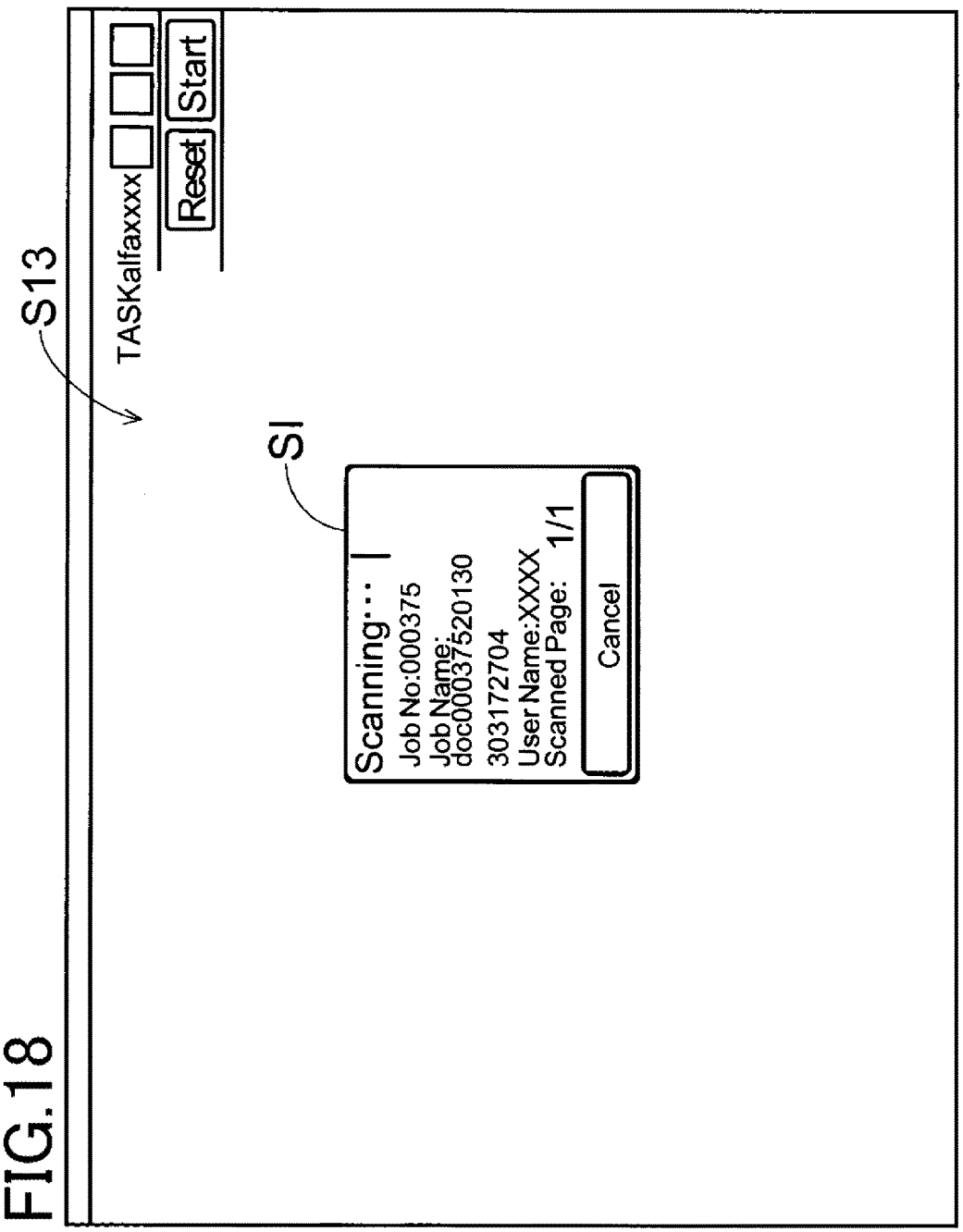
FIG. 18 shows one exemplary embodiment i.e. an example of a status screen that is displayed on a display part while a job is executed.

Next, with reference to FIGS. 18 to 22, a description will be made as to workflow registration information that is to be informed after the job initiation. FIG. 18 is a view that shows an example of a status screen that is displayed on the display part 12 while the job is in execution. FIGS. 19 to 22 show an example of workflow registration information that is to be displayed on the display part 12 in a case where after the job of the basic function is initiated to execute no workflow is registered that include data indicating the setting contents of the basic function.

When the job of the basic function is desired to be executed using the setting contents (that are different from the default setting contents), procedures are taken that include causing the item selection screen S3 to be displayed that corresponds to the selected basic function to be used upon executing the job, changing the setting value to a desired value through the item selection screen S3 (including its lower hierarchy level setting value setting screen), and making a touching operation on the start key K33. According to this changed condition, the MFP 100 causes the job of the basic function to execute pursuant to the changed setting value (desired setting value).

Thus, in a case where the setting value of the basic function (the basic function selected at the job execution) is changed by the user's setting operation, as to the setting item whose setting value is changed, the operation control part 11 updates the setting value into the changed setting value (updates the current setting value data D2) of the among the setting items of the basic function stored in the memory 15 updating the default settings for setting items set value is changed to the set value after the change (update the current setting value data D2). Further, the operation control part 11 also update the setting indication data D3 (ref. FIGS. 1 and 2) that is caused to be displayed on the display part 12 to the changed value. Then, the operation control part 11 causes an upper side of the setting item key K31 that corresponds to the setting item whose setting value is changed to display the changed value.

When the job is initiated, the operation control part 11 causes the display screen to switch from the setting item selection screen S3 to the status screen S13 (ref. FIG. 18). On the status screen S13, there is displayed status information SI that include information related to the job in execution and how the proceeds. FIG. 18 illustrates the status screen S13 when the job in execution is the copy job. For example, in a case of the copy job, when the job is initiated (when a touching operation is conducted on the start key K33), the status screen S13 displays the number of documents D that are read. Then, immediately when reading of the documents D is completed, even though the copy job is in execution (under printing operation), the display screen is caused to return to the original setting item selection screen S3 from the status screen S13.

On the item selection screen S3, there is provided a reset key K34 for resetting the currently set content (the changed value). When a touching operation is conducted on the reset key K34, the operation control part 11 resets the setting content of the basic function which was set through the item selection screen S3. As a result, the setting value, after changing the basic function, returns to the default value. That is, until the touching operation is conducted on the reset key K34, the storage part 15 retains the set value after the change of the basic functions have been changed by the user setting operation. Incidentally, even when a touching operation is conducted on the home screen key HK, the operation control part 11 resets the current setting content (the changed value).

Figure 19:
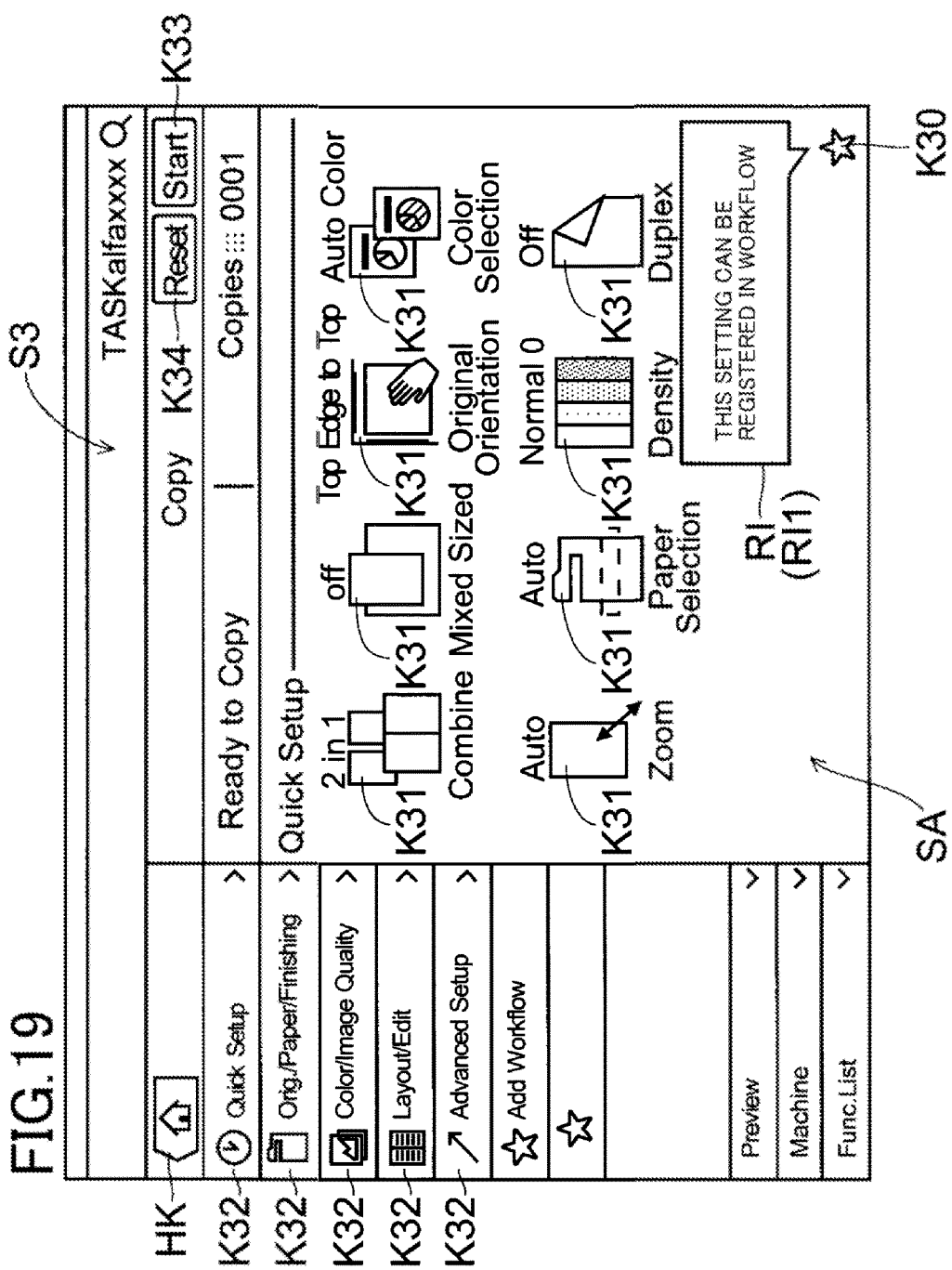
FIG. 19 shows one exemplary embodiment i.e. an example of a display in a case where a workflow is not registered that includes the setting content of the basic function at a time of job initiation.

Then, the operation control part 11, at a time when the touch panel part 13 receives an order that causes the MFP 100 to execute the job of the basic function whose setting content is changed trough the setting item selection screen S3 (when the touching operation is conducted on the start key K33), if workflow WF is not registered which includes the data that is indicative of the setting content of the set basic function which is set through the item selection screen S3 (hereinafter, such a case is referred to as a first case), causes the display part 12 to display, as shown in FIG. 19, a workflow registration workflow registration information RI (RI1) for notifying to the effect that it is possible to register the workflow WF including data that is indicative of the setting content as of the time when the job of the basic function whose setting is made through the item selection screen S3. It is to be noted that displaying the workflow registration information RI is initiated after a specified time elapse from the time of the job acceptance. For example, the operation control part 11 causes a text message, as a workflow registration information RI, to be displayed.

At this stage, although the workflow WF of the basic function alone has been registered that includes the data that is indicative of the setting contents as of the receiving time of the job of the basic function set through the item setting screen S3, sometimes, among the patterns of combination between the basic function and the combination pattern, a combination pattern remains that is not registered as a workflow WF whose setting content is as of the receiving time of the job of the basic function set through the item setting screen S3 (hereinafter referred to as second case). In addition, although the workflow WF of the basic function alone is not registered that includes the data that is indicative of the setting contents as of the receiving time of the job of the basic function set through the item setting screen S3, sometimes, among the patterns of combination between the basic function and the combination pattern, a combination pattern has been registered already as a workflow WF whose setting content is as of the receiving time of the job of the basic function set through the item setting screen S3.

In the second case, if a workflow WF is registered in the form of the basic function alone which includes data that is indicative of the setting contents as of the receiving time of the job of the basic function set through the item setting screen S3, the resulting workflow WF comes to overlap, in content, with the existing workflow WF. On the other hand, if a workflow WF which includes data that is indicative of the setting contents as of the receiving time of the job of the basic function set through the item setting screen S3 is registered in the form of a combination of the basic function and the combination function, the resulting workflow may not come to overlap with, in content, the existing workflow WF depending on a combination function that is to be combine to the basic function.

In the third case, if a workflow WF is registered in the form of the basic function alone which includes data that is indicative of the setting contents as of the receiving time of the job of the basic function set through the item setting screen S3, the resulting workflow WF does not overlap, in content, with the existing workflow WF. On the other hand, if a workflow WF which includes data that is indicative of the setting contents as of the receiving time of the job of the basic function set through the item setting screen S3 is registered in the form of a combination of the basic function and the combination function, the resulting workflow comes to overlap, in content, with the existing workflow WF.

Therefore, the operation control part 11, in both the second and third cases, on or after the job reception time point, causes the display part 12 to display the workflow registration information RI. However, the content of the workflow registration information RI to be displayed in the display part 12 in each the second and third cases is differentiated from the content of the workflow registration information RI to be displayed in the display part 12 in the first case. In addition, the contents of the workflow registration information RI to be displayed in the display part 12 in both of the second and third cases are differentiated with each other. It is to be noted that a content of a message as the workflow registration information RI is not restricted.

Figure 20:
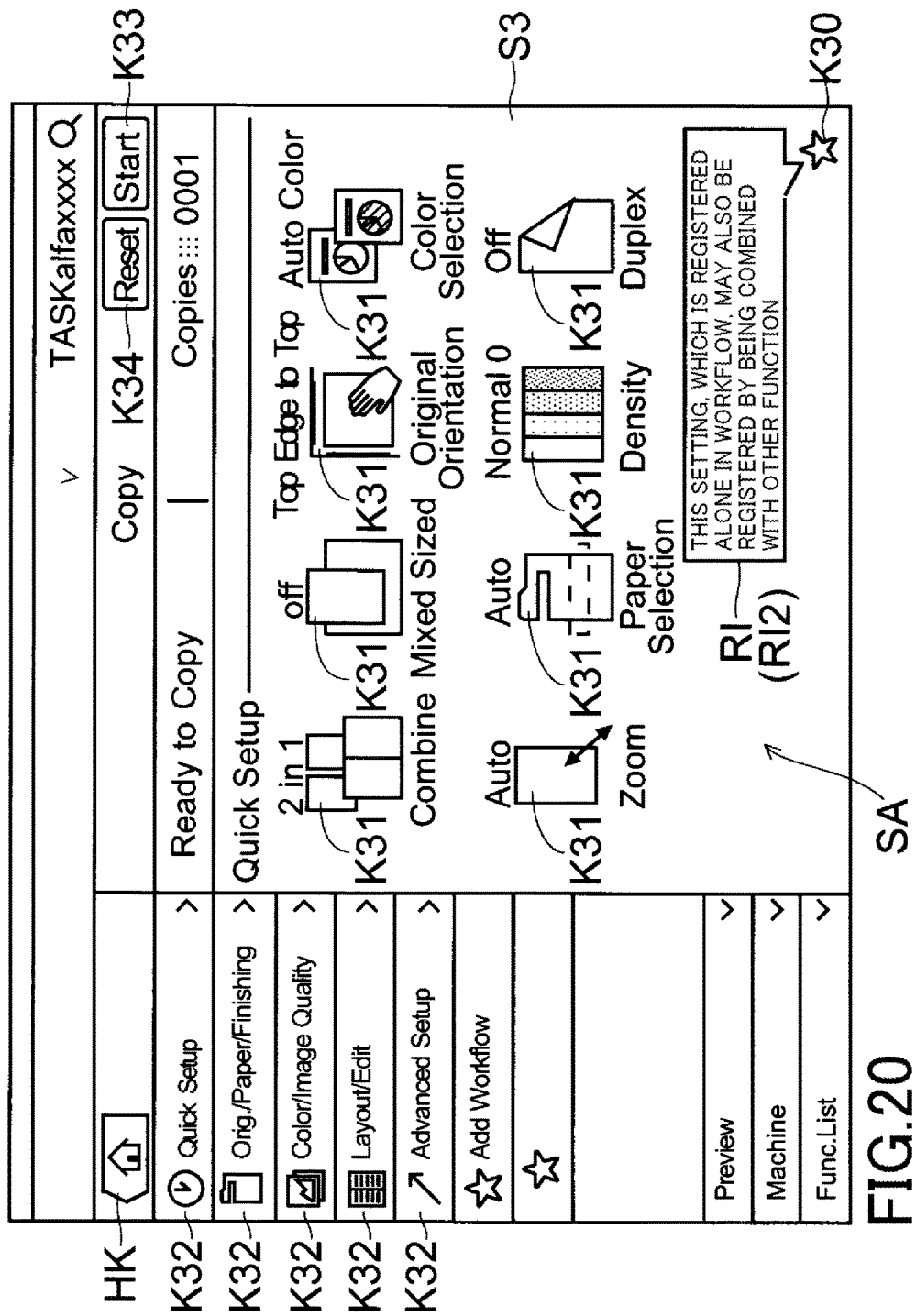
FIG. 20 shows one exemplary embodiment i.e. an example of a display in a case where a workflow is not registered that includes the setting content of the basic function at a time of job initiation.
Figure 21:
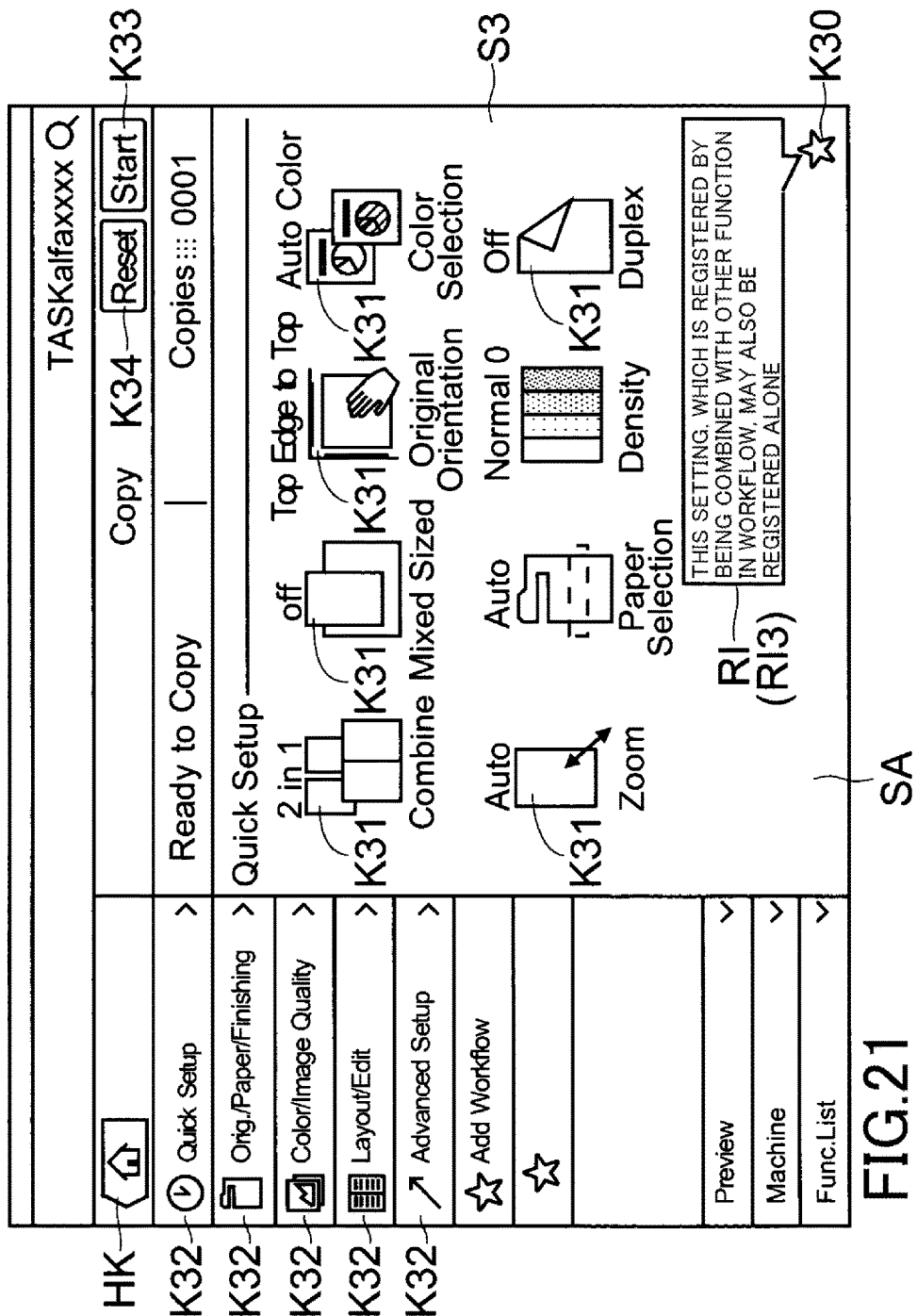
FIG. 21 shows one exemplary embodiment i.e. an example of a display in a case where a workflow is not registered that includes the setting content of the basic function at a time of job initiation.

In the second case, as shown in FIG. 20, in addition to the registration of the workflow WF as the basic function alone which includes data that is indicative of the setting contents as of the receiving time of the job of the basic function, the operation control part 11 causes the display part 12 to a workflow registration information R12 (text message) that is indicative of the possibility of being combined with a combination function. On the contrary, in the third case, as shown in FIG. 21, in addition to the registration of the workflow WF as the combination to the combination function which includes data that is indicative of the setting content as of the receiving time of the job of the basic function, the operation control part 11 causes the display part 12 to a workflow registration information R13 (text message) that is indicative of the possibility of being registered as a basic function alone.

Figure 22:
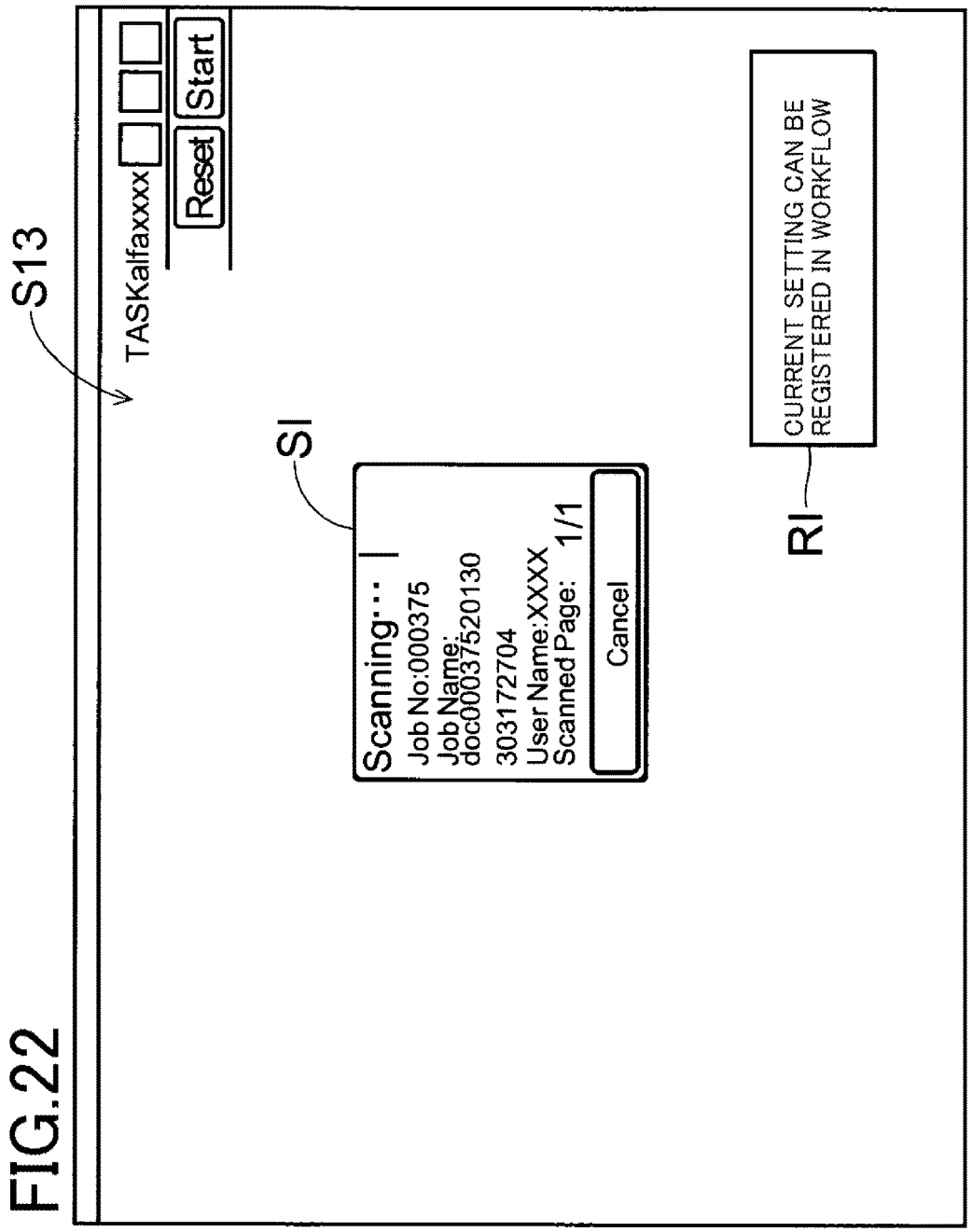
FIG. 22 shows one exemplary embodiment i.e. an example of a display in a case where a workflow is not registered that includes the setting content of the basic function at a time of job initiation.

In a case of displaying the workflow registration information RI on the display part 12, the operation control part 11 causes the display part 12 to initiate such a display at a time point between the job receiving time point and a time point when a touching operation is conducted on a reset key K34. For example, as shown in FIGS. 19 to 21, on or after the job receiving time point (on or after the display part 12 is caused to display the status screen S13), when the operation control part 11 causes the display screen to return to the item selection S3 from the status screen S13, the operation control part 11 causes the item selection screen S3 to indicate the workflow registration information RI. In this case, for example, the workflow registration information RI is indicated in a pop-up format in the vicinity of the displayed position of the workflow creation key K30. Otherwise, it may be possible to initiate an indication of the workflow registration information RI immediately after a touching operation is conducted on start key K33. It is to be noted that in a case where the job initiation causes the status screen S13 to display, as shown in FIG. 22, the workflow registration information RI may be indicated on the item selection screen S3. In this case, after the display screen is switched from the status screen S13 to the item selection screen S3, the workflow registration information RI is allowed to be displayed continuously.

Then, the operation control part 11, from initiating the display of the workflow registration information RI to making the touching operation on the reset key K34, causes the display part 12 to display the workflow registration information RI in a continual manner. Otherwise, after a specified time elapses from initiating the display of the workflow registration information RI (before making the touching operation on the reset key K34), it may be possible to stop indicating the workflow registration information RI.

During a period ranging from the initiation of displaying the workflow registration information RI to the touching operation made on the reset key K34, when a touching operation is conducted on the workflow creation key K30, the operation control part 11 causes the combination confirmation screen S5 (ref. FIG. 9) to be displayed. In this case, if a workflow WF is desired to be created in which the basic function and the combination function are combined, it is possible to display the template screen S6 (ref. FIG. 10). Also, if a workflow WF is desired to be created which includes the basic function alone, it is possible to display, instead of the template screen S6, the utilization format setting screen S9 (ref. FIG. 14).

It is to be that, in the second case, when a touching operation is conducted on the workflow creating key K30, it is also possible to cause the template screen S6 to be displayed immediately. Further, when a touching operation is conducted on the workflow creating key K30, it is also possible to cause the utilization format setting screen S9 to be displayed immediately. That is to say, in the second case and the third case, displaying the combination confirmation screen S5 may be omitted.

Incidentally, sometimes, the workflow WF of the basic function alone has been registered that includes the data that is indicative of the setting content as of the receiving time of the job of the basic function that is set through the item setting screen S3 and among the patterns of combination of the basic function and the combination pattern, all the combination patterns are registered as a workflow WF whose setting content is as of the receiving time of the job of the basic function set through the item setting screen S3. In this case, the operation control part 11 does not cause the display part 12 to display the workflow registration information RI. Also, in this case, a touching operation that is made on the workflow creation key K30 is made invalid and the display of the item selection screen S3 may remain unchanged even though a touching operation is conducted on the workflow creation key K30. Otherwise, it may be possible to provide a notification whose gist is that it is impossible to register the workflow WF of the basic function alone has been registered that includes the data that is indicative of the setting content as of the receiving time of the job of the basic function.

(Calling Workflow WF)

Next, with reference to FIG. 8, a description will be made as to a process of calling (using) the registered workflow WF.

On the display input device 10, through the workflow management screen S4 shown in FIG. 8, it is possible to call (use) a registered workflow WF. As described above, each of the registered workflows WF is indicated as its corresponding symbols (including an image, an icon, and a workflow key K41). Then, operation control part 11 recognizes a specified calling operation that is made on the workflow key K41 as an instruction for calling a workflow WF corresponding to the calling-operated workflow key K41. In other words, the operation control part 11, based on the output of the touch panel part 13, recognizes the calling operation for defining a workflow WF to be called from among the registered workflows WF in the storage part 15. The operation control part 11 causes the communication part 14 to transmit an instruction and data that depend on the format that is selected through the utilization format setting screen S9 (see FIG. 14) toward the main body side communication part 120 of the MFP 100.

The main control part 110 is configured to operate and process based on the instructions that received from the display input device 10. Depending on the format of the workflow WF, the content varies that the display input device 10 transmits to the main body side communication part 120 and the main control part 110 of the MFP 100. Hereinbelow, descriptions will be made as to each of the formats of the workflow and a instruction content thereto.

(1) Direct Execution Format

As described above, the setting of the utilization format setting screen S9 makes it possible to register the work flow WF as one which is of a direct execution format. Calling the workflow WF of the direct execution format is capable of executing a job immediately.

More specifically, when an operation is conducted that is for calling the work flow WF of the direct execution format, the operation control part 11 refers to the content of the called work flow WF for confirmation which is stored in the storage part 15. Then, the operation control part 11 causes the communication part 14 to transmit the data that includes the first function of the called workflow WF, the settings items, and the setting value (different from the default value) of each of the setting items to the main body side communication part 120. The main control part 110 of the MFP 100 recognizes the instructions and the data that the main body side communication part 120.

Also, when the workflow WF is combined with the combination function (when the workflow WF includes data of the setting content of the second function), the operation control part 11 refers to the data of the called workflow WF and adds the setting content (information related to path and address) to the data to be transmitted. Furthermore, when the second function is the download function or the upload function, the operation control part 11 adds the information (for example, information for being authenticated, such as an ID and a password) which is required for using the cloud services to the data to be transmitted. In other words, the operation control part 11 causes the communication part 14 to transmit an instruction for executing the called workflow WF and the data of the setting content of the called workflow WF to the main control part 110.

Based on the received instruction and data, the received data including the first function, the selected setting item, setting value, the selected combination function (the second function), and the setting value of the second function, the main control part 110 of the MFP 100 causes the reading part, printing part, the main body side communication part 120, and other parts to operate to execute the job pursuant to the data that is defined by the setting content of the workflow WF. This direct execution format causes the job to execute immediately on which the setting content of the called workflow WF is mirrored. For example, when 4 in 1 is set in the workflow (instruction, data), the main control part 110 causes the job of 4 in 1 to be executed.

(2) Wizard Format (Interactive Format)

As described above, the setting through the utilization format setting screen S9 (ref. FIG. 14) makes it possible to register the workflow WF as a wizard format workflow. When the workflow WF of the wizard format is called, the operation control part 11 causes the display part 12 of the display input device 10 to display the setting screen for the setting items (setting values) of the first function defined by the workflow WF in a sequential manner.

At first, when an operation is conducted that is for calling the workflow WF of the wizard format, the operation control part 11 accesses the storage part 15 to refer to the data of the called workflow WF of the wizard format and recognizes the setting content of the workflow WF. Then, based on the setting content that includes the first function of the called workflow WF, the setting item of the first function, and the selected (set) setting value (that is different from the default setting), the operation control part 11 determines setting items to be displayed in the wizard format and the display sequence of the setting items. The display sequence may be determined in an arbitrary fashion.

Then, the operation control part 11 causes the display part 12 to display the setting items in the defined sequence. In addition, based on outputs of the touch panel part 13, the operation control part 11 recognizes the setting value that is set in each of the setting items. Then, the operation control part 11, when it recognizes a completion of an input operation action on the last sequential setting value setting screen, causes the display part 12 to terminate the display in the wizard format.

When the display in the wizard format completes, the operation control part 11 causes the communication part 14 to transmit, to the main body side communication part 120 (main controller 110), the data including the first function, the setting item, and the setting value (the changed value if being changes in the wizard format display) of the called workflow WF and an instruction for executing the called workflow WF. In this way, in this format, as to the setting item whose setting value is changed during the display in the wizard format, the changed value is included in the data, while as to the setting item whose setting value is not changed during the display in the wizard format, the setting value that is defined in the workflow WF is included in the data. Then, the main control part 110 of the MFP 100 recognizes the instruction and data changed value that the main body side communication part 120 receives.

Incidentally, as to how to process the workflow in which any combination function is combined, due to its similarity to the direct execution format, its description will be omitted. In addition, as to the job execution that is performed by the main control part 110 of the MFP 100, its description will be also omitted due to the similarity to the direct execution format.

(3) Setting Value Calling Format

As described above, the setting through the utilization format setting screen S9 (ref. FIG. 14) makes it possible to achieve a registration of the workflow WF whose format is of the condition wherein the setting value that is set is included in the workflow WF that is called by the display input device 10. The operation control part 11 causes the storage part 15 to store the setting content (that includes the selected setting item and its setting value) of the workflow WF, as data that is indicative of current setting value. In other words, when the workflow WF of the setting value calling format is called, the operation control part 11 updates the data of current setting value of each setting item to store the storage part 15 (current setting value data D2, ref. FIGS. 1 and 2).

In detail, on the display input device 10, when the workflow WF of the setting value calling format is called, as to the setting item of the first function defined in the called workflow WF, first function among the data included in the current setting value data D2, the operation control part 11 makes a rewriting to the setting value that is defined in the workflow WF. Thus, the display input device 10 comes to be in a condition wherein the setting content is set by making a one-touching operation (by making a single calling operation).

Thus, only calling the workflow WF of the setting value calling format makes it possible to change the setting values of the plural setting items at a single operation. The user is capable of adding and/or deleting various settings by manipulating the item selection screen S3 after displaying the setting content defined in the workflow WF. Then, the main control part 110 of the MFP 100 causes the printing part, the reading part, and the main body side communication part 120 to execute the job.

(Confirmation and Edition of Content of Workflow WF)

Next, with reference to FIG. 8 and FIGS. 23 to 27, as to a confirmation and editing of the content of the workflow WF a description will be made. FIG. 23 is a view showing an example of an edition for rearranging a function. FIG. 24 is a view showing an example of an edition for deleting a function. FIG. 26 is a view showing an example of an edition for changing a setting value. FIG. 27 is a view showing an example of an edition for deleting a setting value.

Through the display input device 10 of the present exemplary embodiment, it is possible to confirm the content of a registered workflow WF and to edit (change) the content of a registered workflow WF. Hereinbelow, a description is made as to a procedure for the confirmation and editing of the content of the registered workflow WF.

Before the confirmation and editing of the content, first of all, the user conducts an operation of the next page key K42 or the preceding page key K43 to cause the workflow management screen S4 to display the workflow key K41 corresponding to the workflow WF that is desired to be edited.

Here, as shown in FIG. 8, on each of the workflow keys K41, there is provided an information key K44 for shifting to a confirmation and editing screen S14 that is configured to confirmation or edit the content of a workflow WF. In the example shown in FIG. 8, the information key K44 is shown in a form of a shaded circle. However, the shape of the information key K44 is not limited to be a circle and on the workflow key K41. For example, as the information key K14, an image is available that provides a meaning of editing operation (for example, a writing utensil shaped symbol) and that is positioned adjacent to an outside of the information key K44.

The operation control part 11, based on an output of the touch panel part 13, recognizes a touch on the display position of the information key K44. Then, the operation control part 11 recognizes such an operation as an instruction for initiation of selecting (a content confirmation instruction) a workflow WF corresponding to the workflow key K41 that contains the operation touched information key K44. Then, the operation control part 11 causes the display part 12 to display the confirmation and editing screen S14 for the confirmation and editing of the workflow WF.

In detail, through the confirmation and editing screen S14, it is possible, as to the function(s) (the first function or the first and second functions if they are selected) which is (are) included in the workflow WF, to make edit operations that include, for example, a function rearrangement, a function deletion, a function addition, a setting value change, and a setting item deletion. Hereinbelow, with reference to FIGS. 23 to 27, a description is made with respect to the content confirmation and these edit operations.

The confirmation and editing screens S14 that are shown in FIGS. 23 to 27 are similar to the content confirmation screen S8 (ref. FIG. 12). It is to be noted that the confirmation and editing screen S14 is not necessary to be similar to the content confirmation screen S8 and therefore is allowed for being another type screen.

Then, the operation control part 11 causes the display screen 12 to display a first function key K142 (right side key) and a second function key K141 (left side key) on within the confirmation and editing screen S14, the first function key K142 corresponding to the first function that is selected in the workflow WF to which the content confirmation instruction is directed, the second function key K141 corresponding to the function that is being combined. It is to be noted that as to the workflow WF in which the combination function (the second function) is not combined, the operation control part 11 does not cause the display part 12 to display the second function key K141. This makes it possible to confirm, through the confirmation and editing screen S14, the first function and second function of the workflow WF that to which a content confirmation instruction is directed.

On within the first function key K142, there is indicated a kind of the selected first function. In the examples of the workflow which are illustrated in FIGS. 23 to 27, either the copy function or transmission function is selected as the first function. On within the second function key K141, there is indicated a kind of the selected combination function. In FIGS. 23 to 27, "From: Cloud" is indicative of the download function, while "To: Cloud" means the upload function.

Further, the operation control part 11 causes the display part 12 to display, in a list format, the setting content of the first function that is selected in the current workflow WF on within the confirmation and editing screen S14, the setting content including names of the setting items of the first function and the setting values of the setting items. In the examples illustrated in FIGS. 23 to 27, the workflow WF selects the setting items including a color selection, a combine print, the number of copies, and a paper (to be used in printing) selection, whose setting values are indicated in the list. It is to be noted that when the setting items and their setting values are too many to indicate in the form of an at-a-glance list, a specified scroll operation (for example, a flick operation) makes it possible to display setting items excluded from the list indication.

Further, the operation control part 11, when the workflow WF includes the second function, causes the setting content of the second function that is currently selected in the work flow WF to be displayed on within the confirmation and editing screen S14.

More specifically, when the second function is the cloud utilizing function (the download function or the upload function), similar to the description that is made with reference to FIG. 11, the operation control part 11 causes the display part 12 to disclose the setting content (the setting value or information) that includes, for example, the cloud service that uses at present, the path of the upload destination, the path of the download destination, and the name of the data to be downloaded. In a case where the second function is the copy image transmission function, the operation control part 11 causes the display part 12 to display a list that includes the data such as the address of the destination of the copy image transmission function and the transmission method (network transmission or FAX transmission) on within the confirmation and editing screen S14 (not shown for convenience). It is to be noted that in FIGS. 23 to 27, in corresponding to the selected second function, the path of the upload destination, the path of the download destination, the name of the data to be downloaded, and the folder name of the upload destination etc. are displayed in a list format, as the setting content. Thereby, through the confirmation and editing screen S14, it is possible to confirm the setting content of the second function of the workflow WF to which the content confirmation is instructed.

1. Rearrangement of Functions

Next, with reference to FIG. 23, a description will be made as to a rearrangement of functions. On the display input device 10 of the present exemplary embodiment, it is possible to rearrange the functions included in the workflow WF. The first function can be rearranged to another basic function, while the second function can be rearranged to another combination function. FIG. 23 shows an example wherein the download function as the second function is rearranged to the upload function, among the functions of the workflow WF to which the content confirmation is instructed.

Here, it is possible to determine, in an arbitrary manner, as to what kind of operation should be regarded as an operation for conducting the rearrangement of functions (rearrangement operation). For example, the operation control part 11 recognizes a specified gesture operation, such as a long pressing operation, which is made on the display position of the first function key K142 or the second function key K141. Otherwise, as shown in FIG. 23, the operation control part 11 may recognize an operation on either one of the first function key K142 and the second function Key K141 as the rearrangement operation after operating the change key 143 that is provided on within the confirmation and editing screen S14.

When, the rearrangement operation for the second function is conducted, the operation control part 11 causes the display part 12 to display, as shown in FIG. 10, the template screen S6 for selecting a new arrangement of functions. Then, the operation control part 11 recognizes an input that is conducted through the template screen S6 for selecting the arrangement of functions as an input for setting a newly combined combination function.

In addition, similar to when the workflow WF is created and registered, when a new combination function is selected through the template screen S6, the operation control part 11 causes the display part 12 to display a screen for setting required items (setting values) that include, a cloud service to be used, a path of the destination of the upload, a path of the destination of the download, a name of data to be downloaded, an address of the transmission destination of the copy image transmission function, a transmission method, and information required for receiving an authentication in the cloud service (ref. FIG. 11). The operation control part 11 recognizes the setting required items (setting values) inputted for the new combination function through the screen. When the touch panel part 13 is conducted thereon with an operation for terminating the setting contents of the newly selected second function, the operation control part 11 causes the display part 12 to display again the confirmation and editing screen S14.

When an operation is conducted for rearranging the first function, the operation control part 11 causes the display part 12 to display, as shown in FIG. 16, the function selection main screen S11 for selecting a new first function (basic function). Then, the operation control part 11 recognizes an input (an operation that is conducted on the basic function key K21) for selecting a basic function as an input for setting a newly combined first function.

In addition, when a new basic function is selected through the function selection main screen S11, similar to when the workflow WF is created and registered, the operation control part 11 causes the item selection screen S12 (screen for selecting a setting item) to be displayed which corresponds to the selected first function. For example, when the copy function is selected as a new first function while the workflow WF is being under editing, the item selection screen 12 as shown in FIG. 17 is displayed.

The operation control part 11 recognizes operations that are conducted on the group selection key K122 for selecting a group to which the setting item belongs and the setting item key K121 in the setting item display region SA, among the item selection screen S12. Then, when an operation is conducted on one of the setting item keys K121, the operation control part 11 causes the display part 12 to display a setting value setting screen (not shown) for selecting a setting value of the setting item which is selected (touched). These are similar to those when the workflow WF is created and registered and when the normal setting is conducted. By recognizing these operations, the operation control part 11 recognizes the selected setting item and its setting value that is selected or set with respect to the first function to be included in the workflow.

When an operation is conducted on the OK key K121 (When an input is conducted that is roughly indicative of terminating the setting content of the selected first function), the operation control part 11 recognizes the completion of setting the first function of the workflow WF that is to be newly created. Then, the operation control part 11 causes the confirmation and editing screen S14 to be displayed again.

Then, as to the image that is displayed within the first function key K142 or the second function key K141, whichever is rearranged, the operation control part 11 switches from the image that is indicative of the originally selected function to an image that is indicative of the rearranged function (changes from the upper illustration to the lower illustration in FIG. 23). In other words, the operation control part 11 causes the display part 12 to display either the first function key K142 or the second function key K141, whichever includes a figure and character that correspond to the newly selected function.

In this way, the confirmation and editing screen S14 allows for changing the function (the first function or the second function) of the once-registered workflow WF. Then, the operation control part 11 deletes the data, among the data of the workflow WF to which the content confirmation is instructed, which is related to the function before the rearrangement (the setting content data of the first function when the first function is rearranged, while the setting content data of the second function when the second function is rearranged). Then, the control part 11 causes the storage part 15 to perform an update in such a manner that the data related to the setting content (setting value) of the after-rearrangement (newly selected) function (either the first function or the second function) is included to the data of the workflow WF.

2. Removal of Function

Next, with reference to FIG. 24, a description is made as to deleting a function. It is possible to delete the first function and also is possible to delete the second function. FIG. 24 illustrates an example of deleting the download function as the second function from the workflow WF to which the content confirmation is instructed.

Here, it is possible to determine, in an arbitrary manner, what kind of operation should be regarded as an operation for conducting the deletion of functions (deletion operation). For example, the operation control part 11 recognizes a specified gesture operation, such as an operation crossing, which is made on the display position of the first function key K142 or the second function key K141. Otherwise, as shown in FIG. 24, the operation control part 11 may recognize an operation on either one of the first function key K142 and the second function Key K141 as the deletion operation after conducting the delete key 144 that is provided on within the confirmation and editing screen S14.

Then, when the deletion operation for the second function is conducted, the operation control part 11 causes the display part 12 to make disappear the second function key K141 that is indicative of the originally selected combination function from the confirmation and editing screen S14 (Change from the upper illustration to the lower illustration in FIG. 24). Thus, it is possible, through the confirmation and editing screen S14, to delete the second function from the workflow WF to which the content confirmation is instructed. Then, the operation control part 11 causes the storage part 15 to perform an update by deleting the data related to the deleted combination function among the data of the workflow WF to which the content confirmation is instructed.

Moreover, when a deletion operation is conducted on the first function, the operation control part 11 causes the display part 12 to make disappear the originally selected first function key K142 from the confirmation and editing screen S14 (the case of deleting the first function is not shown). In this way, it is possible, through the confirmation and editing screen S14, to delete the first function of the workflow WF to which the content confirmation is instructed. Then, the operation control part 11 causes the storage part 15 to perform an update by deleting the data related to the deleted combination function among the data of the workflow WF to which the content confirmation is instructed.

3. Addition of Function

Next, with reference to FIG. 25, a description will be made as to a function addition function. With the display input device 10 of the present embodiment, it is possible to add a function included in the workflow WF. In addition to being able to add the first function in the workflow WF, it is also possible to add a second function in the workflow WF.

Here, it is possible to determine, in an arbitrary manner, what kind of operation should be regarded as an operation for conducting the addition of functions (addition operation). For example, the operation control part 11 regards a gesture operation, such as a pinch out or a flick operation on a blank area as the addition operation. Otherwise, as shown in FIG. 25, the operation control part 11 may recognize an operation on a display portion of an addition key K145 that is provided on within the confirmation and editing screen S14 as an addition operation of the first function or the second operation.

When an addition operation is conducted under a condition wherein the first function is selected, the operation control part 11 causes the display part 12 to display the template screen S6 for selecting the second function, as shown in FIG. 10, to be added.

The operation control part 11 recognizes an input to select the second function that is conducted through the template screen S6 as an input for setting a newly added second function. In addition, similar to when the workflow WF is created and registered, when a new combination function is selected through the template screen S6, the operation control part 11 causes the display part 12 to display a screen (ref. FIG. 11) for setting required items (setting values) that include, a cloud service to be used, a path of the destination of the upload, a path of the destination of the download, a name of data to be downloaded, an address of the transmission destination of the copy image transmission function, a transmission method, and information required for receiving an authentication in the cloud service. Then, the operation control part 11 recognizes the setting required items (setting values) inputted for the new combination function through the screen. When the touch panel part 13 is conducted thereon with an operation for terminating the setting contents of the newly selected second function, the operation control part 11 causes the display part 12 to display again the confirmation and editing screen S14.

Then, the operation control part 11 causes the second function key K141 that is indicative of the added combination function to be displayed within the confirmation and editing screen S14 (change from the upper illustration to the lower illustration in FIG. 25). In other words, the operation control part 11 causes the display part 12 to display the second function key K141 that includes a figure and a character that are indicative of the added second function. In this way, through the confirmation and editing screen S14, it is possible to add the second function of the workflow WF. Then, the control part 11 causes the storage part 15 to perform an update in such a manner that the data related to the setting content (setting value) of the newly added second function is included to the data of the workflow WF to which the content confirmation is instructed.

Meanwhile, when an addition operation is conducted under a condition wherein no first function is selected at all or when a rearrangement operation is conducted on the first function, the operation part 11 causes the display part 12 to display the function selection main screen S11, as shown in FIG. 16, for selecting a new first function (basic function).

Then, the operation control part 11 recognizes an input, which is conducted through the function selection main screen S11 (operation conducted on the basic function key K21), for selecting the basic function as an input for setting the newly combined first function.

In addition, when a new basic function is selected through the function selection main screen S11, similar to when the workflow WF is created and registered, the operation control part 11 causes the item selection screen S12 (screen for selecting setting items) which corresponds to the selected first function (ref. FIG. 17).

Furthermore, the operation control part 11 recognizes operations that are conducted on the group selection key K122 for selecting a group to which the setting item belongs and the setting item key K121 in the setting item display region SA, among the item selection screen S12. Then, when an operation is conducted on one of the setting item keys K121, the operation control part 11 causes the display part 12 to display a setting value setting screen (not shown) for selecting a setting value of the setting item which is selected (touched). These are similar to those when the workflow WF is created and registered and when the normal setting is conducted. By recognizing these operations, the operation control part 11 recognizes the selected setting item and its setting value that is selected or set with respect to the first function to be added to the workflow WF.

When an operation is conducted on the OK key K121 (When an input is conducted that is roughly indicative of terminating the newly added setting content of the first function), the operation control part 11 recognizes the completion of setting the first function of the workflow WF that is to be newly created. Then, the operation control part 11 causes the confirmation and editing screen S14 to be displayed again.

Then, the operation control part 11, in response to the added function, causes either the new first function key K142 or second function key K141 to be displayed on within the confirmation and editing screen S14. In other words, the operation control part 11, when the workflow WF is added with the first function, causes the display part 12 to display newly the first function key K142 that includes a figure and a character that are indicative of the added first function, while the operation control part 11, when the workflow WF is added with the first function, causes the display part 12 to display newly the second function key K141 that includes a figure and a character that are indicative of the added second function (change from the upper illustration to the lower illustration in FIG. 25).

Thus, through the confirmation and editing screen S14, it is possible to add the first function and the second function to the workflow WF. Then, the operation control part 11 causes the storage part 15 to perform an update the data of the workflow WF to which the content confirmation is instructed by an addition of the data that is indicative of the setting content of the first function when the first function is selected or by an addition of the data that is indicative of the setting content of the second function when the second function is selected.

4. Changing Setting Content of First Function

Next, with reference to FIG. 26, a description is made as to a change of the setting value of the first function that is set in the workflow WF to which the content confirmation is instructed. FIG. 26 illustrates a changing example as to the first function (color function) wherein the setting value of the setting item of color selection is changed from "Full Color" to "Mono Color", the setting value of the setting item of combine print is changed from "2 in 1" to "4 in 1", and the setting value of the setting item of the number of copies is changed from "5 sheets" to "10 sheets".

It is possible to determine, in an arbitrary manner, what kind of operation (change designation operation) should be regarded as an operation for designating a setting value (setting item) to be changed. For example, the operation control part 11 recognizes a touching operation of the item bar B that is provided on the first function key K142 as an operation for designating the setting value (setting item). Otherwise, as shown in FIG. 26, it may be possible to provide the change key K143 on the confirmation and editing screen S14 and the operation control part 11 recognizes, after the display portion of the change key K143 is touched, recognizes a touching operation of the display portion of the item bar B provided on the change key 142 as an operation to designate the setting item of the first function whose setting value is to be changed.

When the change designation operation is conducted, the operation control part 11 causes the display part 12 to display the setting value setting screen that is for changing the targeted setting value. For example, when a touching operation is conducted on the item bar B corresponding to the setting item of Combine Print among the plural setting items that are indicated in the form of a list, the operation control part 11 causes the display part 12 to display a screen for selecting the setting value of Combine Print. Then, the operation control part 11 recognizes an input that defines a setting value through the setting value setting screen as an input that defines a changed setting value.

When an input is conducted on the touch panel part 13 which is indicative of a termination of the setting through the setting value setting screen, the operation control part 11 causes the confirmation and editing screen S14 to be displayed again. Ii is to be noted that an automatic return to the confirmation and editing screen S14 is available immediately upon the operation for selecting the setting value through the setting value setting screen.

Then, when the setting value is changed through the setting value setting screen, the operation control part 11 causes the display part 12 to switch the setting value in the list that is provided on the first function key K142 from the originally indicated value to the changed value (Change from the upper illustration from the lower illustration in FIG. 26). It is to be noted that no switching is made unless the setting value is changed. In other words, the operation control part 11 causes the display part 12 to display, as to the setting item of the first function to which the change designation operation is conducted, the new setting value (the changed setting value). Thus, it is possible to change the setting value of the setting item that the workflow WF selects in the confirmation and editing screen S14. Then, the operation control part 11 causes the storage part 15 to update (rewrite) the data that corresponds to the changed setting value of the first function, among the data of the workflow WF to which the content confirmation is instructed.

5. Deletion and Addition of Setting Value (Setting Item) of First Function

Next, with reference to FIG. 27, a description will be made as to a deletion of the setting value (setting item) of the first function which is set in the workflow WF to which the content confirmation is instructed. FIG. 27 indicates an example of deleting the setting value of Combine Print.

It is possible to determine, in an arbitrary manner, what kind of operation should be regarded as an operation for the deletion of setting value of the first function (deletion designation operation). For example, the operation control part 11 recognizes a specified gesture operation, such as an operation crossing, which is conducted on the display position of the item bar B which is a listed one on the first function key K142 and which includes the setting value to be deleted as an operation that designates the setting value of the first function (refer to the upper illustration in FIG. 27). Otherwise, as shown in FIG. 27, the operation control part 11 may recognize a touching operation that is conducted on the item bar B in the list on the first function key K142 as the deletion operation, after conducting a touching operation on the displayed portion of the deletion key 144 that is provided on within the confirmation and editing screen S14.

The operation control part 11, when it recognizes the deletion designation operation, deletes the item bar B that is originally displayed but that corresponds to the setting value (selected setting item) of the first function to which an instruction is issued to delete (change from the upper illustration to the lower illustration in FIG. 27). Thus, it is possible to delete, through the confirmation and editing screen S14, the user desired setting value (setting item) of the first function in the registered workflow WF. Then, the operation control part 11 causes the storage part 15 to update (rewrite) the data for deletion which is indicative of the deletion-instructed setting value of the workflow WF, among the data of the workflow WF to which the content confirmation is instructed.

It is to be noted that, other than deleting a setting value, an editing of adding a setting item (setting value) to the content confirmation instructed workflow WF can be conducted. It is possible to determine, in an arbitrary manner, as to what kind of operation should be regarded as an operation for conducting the addition of setting item and setting value (addition instruction operation). For example, the operation control part 11 recognizes a long pressing operation, which is conducted on the display position of the first function key K142 as an instruction to add a new setting item and setting value (a new setting item and selection of a setting value). Otherwise, as shown in FIG. 27, the operation control part 11 may recognize an operation on the first function key K142 as the addition operation after conducting a touching operation on the displayed portion of the addition key 145 that is provided on within the confirmation and editing screen S14.

The operation control part 11, when it recognizes the addition instruction operation, causes the display part 12 to display, as shown in FIG. 17, the item selection screen S12 pursuant to the current first function. Then, an operation is conducted for selecting a setting item, and the operation control part 11 causes the display part 12 to display the setting value setting screen pursuant to the selected setting item. The operation part 11 recognizes operations that are conducted on these screens as operations for selecting new setting item and setting value.

When an operation is conducted that is indicative of the settings through the item selection screen S12 and the setting value setting screen, the operation control part 11 causes the confirmation and editing screen S14 to be displayed again. It is to be noted that an automatic return to the confirmation and editing screen S14 is available immediately upon the operation for selecting the setting value through the setting value setting screen.

When the setting item is added and the new value is set, the operation control part 11 causes the display part 12 to display additionally an item bar B that includes the newly added setting item and a character of its setting value both of which are added to the list of the first function (change from the lower illustration to the upper illustration in FIG. 27). In other words, the operation control part 11 causes the setting item and the setting value, both of which are selected after conducting the addition instruction operation, of the first function to be displayed on the confirmation and editing screen S14. Thus, through the confirmation and editing screen S14, it is possible to add the setting item and the setting value of the first function to the registered workflow WF. Then, the operation control part 11 causes the storage part 15 to perform an update (rewrite) of the data of the workflow WF to which the content confirmation is instructed by an addition of the data that is indicative of the setting content of the first function.

6. Change of the Setting Content of the Second Function

The operation control part 11, when it recognizes an operation conducted on the second function key K141 and the item bar B included in the displayed list, causes the display part 12 to display the cloud setting screen S7 as shown in FIG. 11 or a screen for setting a transmission destination of the copy image transmission function pursuant to the selected combination function. Then, the control part 11, based on an output from the touch panel part 13, recognizes inputs of reconfiguring of the setting values (setting contents) that includes, for example, the cloud service to be used, the path of the upload destination, the path of the download destination, the name of data to be downloaded, the address of the transmission destination of the copy image transmission function, and the transmission function. In such a way, it is possible to edit the setting contents (the setting values) of the second function of the workflow WF to which the content confirmation is instructed through the confirmation and editing screen S14.

Then, the operation control part 11, when it recognizes the changing operation the setting contents of the second function of the workflow WF to which the content confirmation is instructed, causes the storage part 15 to perform an update (rewrite) from the before-changing setting contents to the after-changing setting contents, as to the setting contents of the combination function among the data of the workflow WF to which the content confirmation is instructed.

As described above, the display input device 10 of the present exemplary embodiment is configured to provide settings on the MFP 100 (image forming device) on which plural functions are mounted, the plural functions including basic functions each of which is available alone and combination functions each of which is available when being combined to one of the basic functions, and includes the display part 12 (display input part) and the touch panel part 13 (display input part) that are configured to display a screen and receive an operation, the storage part 15 that is configured to store data, and the operation control part 11 (control part) that is configured to control the display operation of the display input part 12 and recognizes the operation conducted on the touch panel part 13. Then, the operation control part 11 instructs the display part 12 and the touch panel part 13 to display the workflow creation and registration screen (the combination confirmation screen S5, the template screen S6, the content confirmation screen S8, the utilization format setting screen S9, and the name setting screen S10) for creating and registering the workflow WF, receives the operation for creating and registering the workflow, the workflow being of a combination of the basic function and the combination function, the workflow including data that is indicative of the first function selected from basic functions which is to be registered, setting contents of the first function, the second function selected from combination functions which is to be registered, and setting contents of the second function and combining the basic function and the combination function, and causes the workflow management screen S4 for calling the registered workflow to be displayed in order to cause the workflow management screen S4 to receive an operation that calls the registered workflow. In addition, the operation control part 11 is configured to cause, when it recognizes that the operation for the registration of the workflow is conducted on the touch panel part 13, the storage part 15 to store the workflow WF and to cause, when it recognizes that the operation for calling the workflow WF is conducted through the touch panel part 13, the MFP 100 to execute a job pursuant to the setting contents that are indicated by the data that is included in the called workflow WF.

Thus, in the configuration of the present exemplary embodiment, the receiving of the operation for the creation and registration of the workflow WF in which the basic function (the first function) and the combination function (the second function) are combined is conducted through the display part 12 and the touch panel part 13 and the resulting workflow WF is stored in the storage part 15. Also, when the workflow WF in which the basic function and the combination function are combined is called, the operation control part 11 performs the process for causing the MFP 100 to execute the job pursuant to the setting content that is indicated by the data included in the resulting workflow WF. Thereby, it is possible to register the workflow WF in which the basic function and the combination function are combined and only the necessity of calling the workflow will cause the MFP 100 to execute the job of the combination of the basic function and the combination function pursuant to the desired setting content. As a result, it is possible for the user who desires to execute each of two or more functions collectively to enhance his/her convenience.

Further, in the present exemplary embodiment, the control part 11 causes the display part 12 to display the item selection screen S3 for receiving the selection of setting item whose set value is to be changed, the setting item being among setting items of the basic function that is selected at an initiation of executing the job, causes the touch panel part 13 to receive the operation for changing the set value of the selected setting item, and causes the touch panel part 13 to receive the operation for causing the MFP 100 to execute the basic function whose setting content is set through the item selection screen S3. Also, the operation control part 11 transmits, when it recognizes that the touch panel part 13 receives the operation for causing the MFP 100 to execute the job, the data that is indicative of the content of the setting item of the basic function which is set through the item selection screen S3. Here, the workflow creation key K30 is provided in the item selection screen S3 and the control part 11 causes, when it recognizes that the operation is conducted on the workflow creation key K30, the display part 12 to switch the display screen from the item selection screen S3 to the workflow creation and registration screen, and recognizes that the basic function whose setting item is set through the item selection screen S3 is selected as the first function. Then, the control part 11 causes, when it causes the display part 12 to switch the display screen from the item selection screen S3 to the workflow creation screen, the storage part 15 to keep on storing the setting content that is set through the item selection screen S3 as a setting content of the first function.

With this configuration, when the setting content of the basic function that is set through the item selection screen S3 is desired to be registered as the workflow WF, conducting the operation to the workflow creation key K30 causes the basic function that is set through the item selection screen S3 is recognized as the setting content as the first function, resulting in that the setting content of the basic function which is set through the item selection screen S3 is retained as the setting content as the first function. Thereby, setting the first function (the basic function that is set through the item selection screen S3) again is not necessary, which increase the user's convenience.

In the present exemplary embodiment, as described above, the control part 11 causes, when the operation is conducted on the workflow creation key K30, the display part 12 to display a combination confirmation screen S5, as the workflow creation and registration screen, to select whether a creation and registration of the workflow WF having a combination of the basic function selected as the first function and the combination function or a creation and registration of the workflow WF having the basic function alone. Then, the control part 11 causes, when it recognizes the selection of the creation and registration of the workflow WF having a combination of the basic function and the combination function, the display part 12 to display the workflow creation and registration screen for creating and registering the workflow having the combination of the basic function and the combination function. Thereby, only when the workflow WF having a combination of the basic function and the combination function is desired to be registered, it is possible to display the template screen S6 and the content conformation screen S8, each of which is acting as the workflow creation screen for creating and registering the workflow WF having a combination of the basic function and the combination function. In brief, when the workflow WF having the basic function alone is desired to registered, it is possible to omit displaying the template screen S6 and the content conformation screen S8.

Furthermore, in the present exemplary embodiment, as described above, the control part 11 causes, when it recognizes the selection of the creation and registration of the workflow WF having the combination of the basic function and the combination function, the display part 12 to display a template screen S6, as the workflow creation and registration screen, which is configured to receive a selection of the combination function to be combined to the first function and which is indicative of a plural kinds of the combination functions. Then, the control part 11 causes, when the touching operation is conducted on the touch panel part 13 for selecting one or more combination functions to be combined with the basic function, the display part 12 to display the content confirmation screen S8, as the workflow creation and registration screen, which is configured to confirm and change current setting contents of the respective first function and the second function as the combination function that is selected through the template screen S6. Using such the template screen S6 makes it possible to select the second function in an easy way which is the combination function to be combined to the first function. In addition, selecting the second function through the template screen S6 causes the content confirmation screen S8 to appear, which makes it possible to confirm and change the current setting content of each of the first function and the second function.

Moreover, in the present exemplary embodiment, as described above, one of the plural kinds of the functions is an online storage utilizing function, the online storage utilizing function including a download function that downloads data from a server 600 to the MFP 100 and an upload function that uploads data from the MFP100 to the server 600. Then, at least the download function and the upload function are displayed, as the options, on the template screen S6. Thereby, it is possible to register the workflow WF in which the basic function is a combined with the upload function and/or the download function.

Second Exemplary Embodiment

Next, a description is made as to a second exemplary embodiment as one exemplary embodiment of the present invention.

In the configuration of the present exemplary embodiment, the control part 11 causes the display part 12 to display the item selection screen S3 for receiving a setting item whose set value is to be changed, the setting item being among setting items of the basic function that is selected when the job is selected, causes the touch panel part 13 to receive an operation for changing the set value of the selected setting item, causes the touch panel part 13 to receive an operation for causing the MFP 100 to execute the basic function whose setting content is set through the item selection screen S3, and transmits to the main control part 110 of the MFP 100, when it recognizes that the touch panel part 13 receives the operation for causing the MFP 100 to execute the job, data that is indicative of the content of the setting item of the basic function which is set through the item selection screen S3. Here, the item selection screen S3 is thereon provided with the workflow creation key K30 for instructing an initiation of creating and registering the workflow in which the first function is the basic function whose setting content is set through the item selection screen S3 and the workflow management screen S4 is provided thereon with a new registration key K40 for instructing an initiation of newly creating and registering the workflow WF. Then, the operation part 11 causes, even if an operation is conducted on either of the workflow creation key K30 and the newly registration key K40, in the subsequent receiving process of the operation of creating crating and registering and the workflow WF, the touch panel part 13 to receive the operation for displaying the template screen S6, the template screen being the screen for receiving the operation to select the combination function to be combined to the first function and being concurrently the screen as the workflow creation and registration screen that indicates plural kinds of combination functions.

With this configuration, in either of the transfer from the item selection screen S3 to the creation and registration of the workflow WF and the transfer from the workflow management screen S4 to the creation and registration of the workflow WF, it is possible to display the template screen S6. More specifically, it is possible to create and register the workflow WF in which the basis function and the combination function are combined. Thereby, the user's convenience is enhanced.

Further, in the present exemplary embodiment, as described above, in a case where if an operation is conducted on the touch panel part 13 for select a combination function that is capable of being combined to the first function while the display part 12 displays the template screen S6, the operation control part 11 causes the display part 12 to display, as the workflow creation and registration screen, the content confirmation screen S8 in order to confirm and changes the current setting contents of the first function and the second function that is the combination function selected through the template function S6. Thereby, it is possible to confirm and change the current setting contents of the respective first function and the second function in an easy way.

Moreover, in the present exemplary embodiment, as described above, one of the plural kinds of the functions is an online storage utilizing function, the online storage utilizing function including a download function that downloads data from a server 600 to the MFP100 and an upload function that uploads data from the MFP100 to the server 600. Then, at least the download function and the upload function are displayed, as the options, on the template screen S6. Thereby, it is possible to register the workflow WF in which the basic function is a combined with the upload function and/or the download function.

In the present exemplary embodiment, as described above, the control part 11 causes, when the operation is conducted on the workflow creation key K30, the display part 12 to display a combination confirmation screen S5 to select whether a creation and registration of the workflow WF having a combination of the basic function selected as the first function and the combination function or a creation and registration of the workflow WF having the basic function alone. Then, the control part 11 causes, when it recognizes the selection of the creation and registration of the workflow WF having a combination of the basic function and the combination function, the display part 12 to display the template screen S6. Thereby, only when the workflow WF having a combination of the basic function and the combination function is desired to be registered, it is possible to display the template screen S6 and the content conformation screen S8, each of which acting as the workflow creation screen for creating and registering the workflow WF having a combination of the basic function and the combination function. In brief, when the workflow WF having the basic function alone is desired to registered, it is possible to omit displaying the template screen S6 and the content conformation screen S8.

Third Exemplary Embodiment

Next, a description is made as to a third embodiment as one exemplary embodiment of the present invention.

In the configuration of the present exemplary embodiment, the control part 11 causes the display part 12 to display the item selection screen S3 for receiving the selection of a setting item whose current value is to be changed, the setting item being among setting items of the basic function which are selected upon execution of the job, causes the touch panel part 13 to receive the operation for changing the setting value of the selected setting item, causes the touch panel part 13 to receive the operation for causing the multiple function periphery 100 to execute a job of the basic function whose setting content is set through the item selection screen S3, and transmits the data that is indicative of the setting content that is set through the item selection screen to the main control part 110 of the multiple function periphery 100 when it recognizes that the touch panel part 13 receives the operation for executing the job. Then, the control part 11 causes, at a job receiving time that is defined as a time at which the touch panel part 13 receives the operation for causing the MFP 100 to execute the job of the basic function whose setting item is set through the item selection screen S3, in a case where no workflow WF is registered at the job receiving time which includes data that is indicative of the setting content that is set through the item selection screen S3, the display part 12 to display workflow registration information RI (R11) whose gist is to notify that after the job receiving time the setting content of the basic function which is set through the item selection screen S3 at the job receiving time can be registered as the workflow.

With this configuration, it is possible to cause the user to recognize whether the workflow WF is registered or not that includes the data indicating the current setting content. For this reason, for example, it is possible for the user to restrict an operation (unnecessary operation) for creating and registering a new workflow that includes the data indicating the current setting content despite of the registration of the workflow that includes the data indicating the current setting content. Thus, the user's convenience comes to be further enhanced.

Further, in the present exemplary embodiment, as described above, in a case where the workflow WF is registered whose basic function alone includes data that is indicative of setting content of the basic function which is set through the item selection screen S3 at the job receiving time, but among combination patterns each of which is a combination of the basic function and the combination function is not still registered whose setting content of the basic function is set through the item selection screen S3 at the job receiving time, the control part 11 causes the display part 12 to display an information (workflow registration information RI2) whose gist is to notify that as the workflow registration information RI the workflow that is a combination of the basic function and the combination function whose setting content of the basic function as of the job receiving time can be registered as the workflow. In addition, in a case where the workflow WF is not registered whose basic function alone includes data that is indicative of setting content of the basic function which is set through the item selection screen S3 at the job receiving time, but all of the combination patterns among combination patterns each of which is a combination of the basic function and the combination function is already registered whose setting content of the basic function is set through the item selection screen S3 at the job receiving time, the control part 11 causes the display part 12 to display workflow registration information (RI3) whose gist is to notify that as the workflow registration information RI the workflow having the basic function alone after the job receiving time can be registered. Thereby, it is possible to inform a more detailed registration status of the workflow to the user.

Furthermore, in the present exemplary embodiment, as described above, the item selection screen S3 is provided thereon with a workflow creation key K30 that switches the display screen from the item selection screen S3 to the workflow creation and registration screen. Then, the control part 11 causes the display part 12 to display the workflow registration information RI after the job reception time. Thereby, after confirmation of the workflow registration information RI, if necessary, it is possible to cause the display screen to switch immediately to the workflow creation and registration screen.

Furthermore, in the present exemplary embodiment, as described above, the control part 11 causes, when the operation is conducted on the workflow creation key K30, the display part 12 to display a combination confirmation screen S5 to select whether the creation and registration of the workflow WF having a combination of the basic function selected as the first function and the combination function or the creation and registration of the workflow WF having the basic function alone. Then, the control part 11 causes the display part 12, when it recognizes the selection of the creation and registration of the workflow WF having a combination of the basic function and the combination function, to display the workflow creation screen for creating and registering the workflow in which the basis function and the combination function are combined. Thereby, only when the workflow WF having a combination of the basic function and the combination function is desired to be registered, it is possible to display the template screen S6 and the content conformation screen S8, each of which acts as the workflow creation screen for creating and registering the workflow WF having a combination of the basic function and the combination function. In brief, when the workflow WF having the basic function alone is desired to be registered, it is possible to omit displaying the template screen S6 and the content conformation screen S8.

Still further, in the present exemplary embodiment, as described above, the control part 11 causes, when it recognizes the selection of the creation and registration of the workflow WF having a combination of the basic function and the combination function, the display part 12 to display the template screen S6, as the workflow creation and registration screen, which is configured to receive a selection of the combination function to be combined with the first function and which is indicative of a plural kinds of the combination functions, and causes, when one or more operations are conducted on the touch panel part 13 for selecting one or more combination functions to be combined with the basic function, the display part 12 to display a content confirmation screen S8, as the workflow creation and registration screen, which is configured to confirm and change current setting contents of the respective first function and the second function as the combination function that is selected through the template screen S6. Using such a template screen S6 will provide an easy selection of the second function as the combination function which is to be combined to the first function. Thereby, selecting the second function through the template screen S6 causes the content confirmation screen S8 to appear, which makes it possible to confirm and change the current setting content of each of the first function and the second function in an easy way.

Moreover, in the present exemplary embodiment, as described above, one of the plural kinds of the functions is an online storage utilizing function, the online storage utilizing function including a download function that downloads data from a server 600 to the MFP100 and an upload function that uploads data from the MFP100 to the server 600. Then, at least the download function and the upload function are displayed, as the options, on the template screen S6. Thereby, it is possible to register the workflow WF in which the basic function is a combined with the upload function and/or the download function.

Fourth Exemplary Embodiment

Next, a description is made as to a fourth exemplary embodiment as one exemplary embodiment of the present invention.

Typical image forming devices that include, for example, a copier, a MFP, a printer, and a FAX device come rapidly to have multi functions and therefore the kinds of items that can be set (setting items) and setting value that can be set are very numerous. In order to obtain desired results, users are involved in selecting his/her required all setting items from among the available setting items and selecting suitable setting values for the selected setting items. In particular, in the case of an MFP in which plural functions are available collectively, such as a print function, a manuscript reading function, and image data transmission function, there are many selectable setting items and setting values. For this reason, in order to obtain the desired results, the setting procedure is apt to be complex and sometimes time is required for the setting.

One of the ideas to reduce such a user's cumbersome setting operation, memorizing (registering) the setting content (selected setting item and its setting value) is made available for later printing pursuant to the similar settings. In detail, a printing setting device is provided wherein a display device is configured to display a print setting condition screen, the print setting condition screen indicates plural print setting condition items, the print setting condition screen indicates a name registration area for enabling the currently setting print condition to register with a name, and the print setting condition screen indicates a print setting condition, and causes a storage device to store the registered name inputted to the name registration by being related to the currently set printing condition. A technology has been provided which incorporates this configuration to indicate the currently setting print condition on the screen when the setting print condition is stored, thereby enabling an input of the registered name with a confirmation to the setting print condition.

In such a typical technology, a combination of the frequently used setting item and setting condition is made easy to memorize. For example, when it is desired to reduce the number of sheets of paper to be consumed, combine print (e.g., 2 in 1 or 4 in 1) and double-sided print are frequently combined. In addition, when the transmission data capacity of image data that is obtained by reading a manuscript is desired to be reduced, there are many combination cases of setting items and setting values such as low reading resolution, monochromatic reading, and page combine. Then, when a job is requested to be executed later pursuant to the similar setting content, memorizing frequently combined setting contents (combination of setting item and setting value) makes it possible to execute the job of the same content only by calling the setting content (setting condition).

Here, the image forming device, such as the MFP, is provided with plural functions (plural kinds) concurrently that includes, for example, print (e.g. copy) function, manuscript reading (scan) function, and data transmission, like an image data transmission, function. However, it is impossible, for the typical device having plural functions (plural kinds of jobs), to register a setting content as a combination of the plural functions (plural kinds of jobs). In even the device having plural functions (plural kinds of jobs), it is possible to register a setting content within a range of a single function.

For example, in a case of a regular task (operation) wherein a copy job is executed pursuant to a specified setting content and image data whose content is identical with the resulting printed matter, as to the copy function, a setting item and its setting value are selected and is stored as a copy function setting content. In addition, similarly, as to the image data transmission, the transmission function setting content is memorized. Then, when this regular task is executed at a later time, the going-through procedures are executing the copy job by calling the registered copy function setting content and executing the transmission job, after completion of the copy job, by calling the registered transmission function setting content.

Thus, typically, storing the setting content is available only in the range of a single function and therefore storing the setting contents in a case of a combination of functions cannot be achieved, thereby presenting an inconvenience problem. In other words, even calling a setting content fails to activate plural function in a collaborative.

Further, sometimes, the image forming device is requested to be used to activate a new function (for example, a data transmission/receiving service utilizing a cloud) which is not available on the image forming machine alone.

However, it is typically impossible to store the setting contents when plural functions are combined and therefore, for example, it is impossible to execute jobs by collaborating the cloud function with the functions, such as printing and transmission functions, which the image forming device have, thereby also presenting of an inconvenience problem. In addition, there is a problem wherein such collaboration between these functions may not be easy to realize due to the fact that a complex setting and/or another knowledge on software may be required.

It is to be noted that in the typical technology the printing condition when using the printer is stored and the setting condition (setting content) is stored in the range of the printer function alone. Thus, it is impossible for this technology to solve the aforementioned problems.

The present exemplary embodiment is to enable a creation and registration of workflow to which plural functions (jobs of different kinds) and to make a procedure of creating and registration the workflow on method of such a creation and registration of workflow easy to understand, without having to have a high level expertise.

More specifically, as to the configuration according to the present exemplary embodiment, a display input device 10 (an operation panel 200, a portable information terminal 300) includes a storage part 15 (a panel storage part 212, a terminal storage part 302) that is configured to store a workflow FW, the workflow FW being created and registered by a user, the workflow FW being for executing a job pursuant to a setting that is included in the workflow FW when the workflow FW is called, a display input part that includes a display part 12 (a panel display part 202, a terminal display part 303) that is configured to display a screen and a touch panel part 13 (main body touch panel part 203, a terminal touch panel part 304) that is configured to receive an operation of the user by detecting a touching on a display position, and a control part (an operation control part 11, a panel control part 201, a terminal control part 301) that is configured to recognize a setting operation by the user based on an output from the display input device and to recognize a calling operation for determining a workflow FW to be called from among the workflows FW registered in the storage part 15. Then, the display part 12 is configured to display a new registration key K40 for an initiation instruction of a new creation and registration of a workflow FW by selecting function, setting item and setting value from first, the control part, during the creation and registration of the new workflow FW, recognizes a first function that is selected as a function to be used in the newly created workflow FW from among a plurality of pre-specified functions, and the setting item and the setting value both are selected in the first function, as setting contents of the first function, the control part causes the display input part to display a template screen S6 that is configured to select a combination function from among specified combination functions which is to be combined with the first function, the control part recognizes a second function that is the combination function selected through the template screen S6 based on the output from the display input device and setting contents of the second function, the control part is configured to cause the storage part to register data of the setting content of the first function as the new workflow FW in the storage part 15 when the second function is not selected, and to cause the storage part 15 to register data of the setting content of the first function and the setting content of the second function as the new workflow FW when the second function is selected.

Thereby, selecting the basic function (job type) in the workflow FW and enabling the selection of the second function as the combination function to be combined to the first function through the template screen S6 enable the workflow FW to be stored as the workflow FW in which setting contents of the different functions (different kinds of jobs). Therefore, only calling the workflow FW makes it possible to execute jobs under a collaboration of plural functions and to conduct settings and inputs related to these jobs.

Moreover, in the course of creating and registering a new workflow FW, in order to select a combination function that is to be combined to the first function, the required process is only conducting an operation to select the second function through the for-selection template screen S6. In this way, the creation of the workflow FW in which the first function is combined with the second function can be achieved in an easy way without having to have expertise in the field of software and the technique for combining functions is very easy to understand.

Moreover, one of the combination functions is a download function for downloading data to be used from a cloud. Then, the control part (the operation control part 11, the panel control part 201, the terminal control part 301) recognizes the selection of the download function during the creation and registration of the new workflow FW and a path of a download source that is setting inputted, causes the storage part 15 (the panel storage part 212, the terminal storage part 302) to register the workflow FW that includes data indicating the path of the download source, causes the image forming device (the MFP 100), as an operation subject, from a location indicated by the path to download the data to be used in the job from a location indicated by the path of the download source that is specified by the calling operated workflow when the download function is combined to the calling operated workflow FW, and causes the image forming device to execute the job using the downloaded data to which is applied the setting content of the first function of the calling operated workflow FW.

Thereby, combining the first function that is provided to the image forming device (the MFP 100) and the download function related to the cloud service will make it possible to create and register the workflow FW in which the first function and download function are in collaboration. In addition, calling the workflow FW is capable of causing the job to execute under the collaboration of the first function and the download function to execute and the job to be set. Moreover, the creation of the workflow FW that is under the collaboration of the first function and the download function can be achieved only by conducting an input to the display input part without having to have expertise in the field of software.

Still further, one of the combination functions is an upload function for uploading the copy image data to be used to a cloud, the control part (the operation control part 11, the panel control part 201, the terminal control part 301) recognizes the selection of the upload function during the creation and registration of the new workflow and a path of an upload destination that is setting inputted, causes the storage part 15 (the panel storage part 212, the terminal storage part) to register the workflow FW that includes data indicating the path of the upload destination, causes the image forming device (the MFP 100), as an operation subject, to execute a job to which the setting content of the calling operated workflow FW the job when the upload function is combined to the calling operated workflow FW, and causes the image forming device (the MFP 100) to upload a copy image data indicating the execution result of the job of the first function to a location that is indicated by the path of the upload destination.

Thereby, combining the first function that is provided to the image forming device (the MFP 100) and the upload function related to the cloud service will make it possible to create and register the workflow FW in which the first function and upload function are in collaboration. In addition, calling the workflow FW is capable of causing the job to execute under the collaboration of the first function and the upload function to execute and the job to be set. Moreover, the creation of the workflow FW that is under the collaboration of the first function and the upload function can be achieved only by conducting an input to the display input part without having to have expertise in the field of software.

Still furthermore, one of the combination functions is a copy image data transmission function for transmitting copy data that is indicative of an execution result of the first function. The control part (the operation control part 11, the panel control part 201, the terminal control part 301) recognizes the selection of the copy data transmission function during the creation and registration of the new workflow FW and a set inputted destination of the copy data, causes the storage part 15 (the panel storage part 212, the terminal storage part 302) to register the workflow FW that includes data indicating the destination, causes the image forming device (the MFP 100) to execute a job to which the setting content of the first function of the calling operated workflow FW, as an operation subject when the copy image transmission function is combined to the calling operated workflow, and causes the image forming device to transmit the copy image data to the destination when the calling operated workflow is combined with the copy image data transmission function.

Thereby, combining the basic function that is provided to the image forming device (the MFP 100) and the copy image transmission function will make it possible to create and register the workflow FW in which the first function and copy image transmission function are in collaboration. In addition, calling the workflow FW is capable of causing the job to execute under the collaboration of the first function and the copy image function to execute and the job to be set. Moreover, the creation of the workflow FW that is under the collaboration of the first function and the copy image transmission can be achieved only by conducting an input to the display input part without having to have expertise in the field of software.

Still moreover, the display input part displays an initial screen S1 as an uppermost layer of setting screens, displays a workflow management screen S4 that is capable calling the workflow FW as a next lower hierarchy level screen than the initial screen S1, and displays the new registration key K40 on either one or both of the workflow management screen S4 and the initial screen S1.

Thereby, it is possible to establish a prompt initiation of the creation and registration (workflow registration mode) of the workflow FW when compared to going down a number of layers. Thus, it is possible to urge a new creation and registration of workflow and a utilization of the registered workflow. The utilization frequency of the workflow for each of the users becomes higher than ever before, which makes it possible for each of the users to reduce time and labor that are required for the setting inputs.

Still moreover, the control part causes the display input part (the operation control part 11, the panel control part 201, the terminal control part 301) to display a utilization format setting screen S9 for determining how to use the workflow FW while the workflow FW is in the new creation and registration process, and recognizes a selected one of a format that brings a job execution immediately when being called, a format that displays, when being called, each of setting value setting items of the first format sequentially in a wizard format, or a format that causes the display input device 10 (the operation panel 200, the mobile information terminal 300) to be in a condition that is set by workflow defined setting values.

Thereby, it is possible to set the behavior that is conducted when calling the workflow FW in a selective manner together with the newly creating and registering the workflow FW. Then, setting the desired format make it possible for the user to use the workflow FW in his/her desired manner.

Further moreover, the image forming device (the MFP 100) according to the exemplary embodiment includes the above-described display input device 10 (the operation panel 200, the mobile information terminal 300). Thereby, calling the workflow FW to which different functions are combined will cause the image forming apparatus (the MFP 100) to be capable of executing a job under the collaboration of the plural functions. Besides, due to including the aforementioned display input device 10, it is possible to provide the image forming device that is easy to conduct an operation for newly creating and registering a workflow FW that is under collaboration of the plural functions and that is easy to use.

In summary, according to the present exemplary embodiment, it is possible to achieve a creation and registration of workflow in which plural functions (different kinds of jobs) are combined. The process of the creation and registration of workflow is made easy to understand. In addition, it is possible to achieve, in an easy way, a creation and registration of the workflow in which plural functions are combined without having to have a high level expertise and which is active under the collaboration of the plural functions.

Fifth Exemplary Embodiment

Next, a description is made as to a fifth exemplary embodiment as one exemplary embodiment of the present invention.

The typical technology as described above is capable of storing the setting content in a case of only one single function (kind of job) and is not capable of storing setting contents when plural functions are combined, thereby presenting a problem of inconvenience.

Therefore, for linking the plural functions (plural kinds of jobs), an idea is proposed to store a combination of the setting contents of the plural functions. However, combining the setting contents of the plural functions, when compared to storing the setting content of the single function, the resulting setting content becomes complex, thereby presenting a problem of a difficulty in confirmation of the same. In addition, the setting content to be stored becomes increased when compared to that of the single function which also presents a problem that an achievement of setting each of the function at one time without mistake is very difficult in order for the user to obtain his/her desired result.

It is to be noted that in the typical technology the printing condition when using the printer is stored and the setting condition (setting content) is stored in the range of the printer function alone. Thus, it is impossible for the technology described in Patent Literature 1 to solve the aforementioned problems.

The present exemplary embodiment has an object, when setting contents of plural functions are stored in combination, to ensure an easy confirmation of the setting item of each of the functions and to enable an editing of the stored setting contents in an easy way.

More specifically, as to the configuration according to the present exemplary embodiment, a display input device 10 includes a storage part 15 (a panel storage part 212, a terminal storage part 302) that is configured to store a workflow FW, the workflow FW being created and registered by a user, the workflow FW being for executing a job pursuant to a setting that is included in the workflow FW when the workflow FW is called, a display input part that includes a display part 12 (a panel display part 202, a terminal display part 303) that is configured to display a screen and a touch panel part 13 (main body touch panel part 203, a terminal touch panel part 304) that is configured to receive an operation of the user by detecting a touching on a display position, and a control part (an operation control part 11, a panel control part 201, a terminal control part 301) that is configured to recognize a setting operation by the user based on an output from the display input device and to recognize a calling operation for determining a workflow FW to be called from among the workflows FW registered in the storage part 15. Then, the storage part 15 stores, as data of the workflow FW, the data of the setting content of the first function which includes its selected setting item and setting value, the first function being selected from among predetermined basic functions, and further, as to the workflow FW that is determined to combine the first function and a predetermined combination function, the storage part 15 stores the data of the setting content of the combination function that is combined, together with the data of the setting content of the first function, as the data of the preceding workflow FW. In addition, the control part, when it recognizes a content confirmation instruction for selecting the workflow FW, which is to be confirmed in content, from among the registered workflows FW based on the output of the display input part, causes the display input part to display the confirmation and editing screen S14 such that on the confirmation and editing screen S14 are displayed the setting content of the workflow FW to which the content confirmation is instructed and the setting content of the second function when the combination function is combined.

Thus, the first function alone, or the first function and the second function, can verify the contents of the combined workflow FW. Then, in the case where the first function and workflow FW second function are combined, the display part 12 (the panel display part 202, the terminal display part 303) is capable of displaying the setting content of the first function and the setting content of the second content in one screen. Thus, for each of the first function and the second function, it is displayed in a configuration that makes it easier to understand what setting is currently being made and the user can easily confirm the contents of the workflow FW.

Moreover, the control part (an operation control part 11, a panel control part 201, a terminal control part 301), when it recognizes the operation for rearranging the first function or the second function that are included in the workflow FW to another function is conducted through the confirmation and editing screen S14, or when the rearrangement operation is conducted, causes a screen (a template screen S6, a function selection main screen S11, an item selection screen S12) for the selection of a function to be combined to be displayed, confirms an input for selecting a new function to be newly combined through the screen and the setting content of the newly combined function, deletes the pre-rearrangement data of the workflow FW to which the content confirmation is instructed, and causes the storage part 15 (the panel storage part 212, the terminal storage part 302) to perform an updating that causes the data of the workflow FW to which the content conformation is instructed to include the data of the setting content of the newly combined function.

Thereby, it is possible to rearrange either one of the currently selected first function and the second function to another function. Therefore, even though an error exists in selecting the first function or the second function during the creation and registration of the workflow FW, it is possible to correct the error for the correct function in an easy way after the registration of the workflow FW. Besides, no expertise in the field of software is required for achieving a correction of the complicated workflow FW in which plural functions are combined. In such a way, it is possible to edit the setting content of the workflow FW in a flexible manner. Besides, the setting content of the function that is out of the rearrangement can be utilized as it is and therefore, even though an error exists in selecting the basis function or the combination function when a workflow FW is created in which the setting contents of the plural functions are combined, the user is made free from re-creating the workflow FW with the correct function.

Still moreover, the control part (the operation control part 11, the panel control part 201, the terminal control part 301) recognizes the deletion operation is conducted through the confirmation and editing screen S14 for deleting the first function or the second function that are included in the workflow FW, and causes the storage part 15 (the panel storage part 212, the terminal storage part 302) to delete the data of the function to which the operation for the deletion is conducted from the workflow FW to which the content confirmation is instructed.

Thereby, it is possible to delete later the first function or the second function that are selected by mistake during the creation and registration of the workflow FW (erroneously selected in the workflow FW). Therefore, even though an error exists in selecting the first function or the second function during the creation and registration of the workflow FW, it is possible to correct the error for establishing the user desired content in an easy way after the registration of the workflow FW. Besides, no expertise in the field of software is required for achieving a deletion of either one of the functions from the complicated workflow FW in which plural functions are combined. In such a way, it is possible to edit the setting content of the workflow FW in a flexible manner. Besides, the setting content of the function that is out of the deletion remains unchanged and therefore, even though an error exists in adding a function when a workflow FW is created, the user is made free from re-creating the workflow FW with the correct function.

Moreover, the control part (an operation control part 11, a panel control part 201, a terminal control part 301), when it recognizes that the operation for adding the first function or the second function is conducted through the confirmation and editing screen S14, or when the addition operation is conducted, causes a screen (a template screen S6, a function selection main screen S11, an item selection screen S12) for the selection of a function to be added to be displayed, confirms an input for selecting a new function to be newly added and the setting content of the newly added function, and causes the storage part 15 (the panel storage part 212, the terminal storage part 302) to perform an updating for adding the setting content of the added function to the data of the workflow FW to which the content conformation is instructed.

Thereby, it is possible to add the desired function in an easy way even though an error exists in missing a function during the creation and registration of the workflow FW. Besides, no expertise in the field of software is required for achieving an addition of the function to the complicated workflow FW in which plural functions are combined. In such a way, it is possible to edit the setting content of the workflow FW in a flexible manner. Besides, the setting content of the function can be utilized as it is and therefore, even though an error exists in missing in setting the combination function when a workflow FW is created, the user is made free from re-creating the workflow FW with the correct function.

Besides, the control part (operation control part 11, the panel control part 201, the terminal control part 301) recognizes that an input for re-setting the setting content of the second function of the workflow FW to which the content confirmation is instructed, and causes the storage part 15 (the panel storage part 212, the terminal storage part 302) to perform an updating from the pre-changing setting content to the post-changing setting content as to the content of the second function of the workflow FW to which the content confirmation is instructed.

With this configuration, it is possible to correct an error in the setting content (setting item and/or setting value) of the second function while the workflow FW that includes the plural functions is being in creation and registration process. Therefore, it is possible to edit flexibly the setting content included in the second function. In such a way, due to the capability of the later correction, a perfect or errorless setting of the second function is not requested when the workflow FW is created and registered, which makes it possible to degrade the difficulty in creating the workflow WF having a content that the user desires.

Moreover, the controller (the operation control part 11, the panel control part 201, and the terminal control part 301) is configured to, based on the output of the display input device, recognizes the operation for making a change, deletion, or addition regarding the setting item or setting value of the first function included in the workflow FW that is instructed with the content confirmation through the confirmation and editing screen S14 and causes the storage part 15 (the panel storage part 212 and the terminal storage part 302) to update the data of the setting content of the first function of the workflow FW that is instructed with the content confirmation depending on the operation that is made through the confirmation and editing screen S14 for making a change, deletion, or addition regarding the setting item or setting value of the first function included in the workflow FW.

Thus, it is possible to correct an error in the setting content (setting item and/or setting value) of the first function while the workflow FW that includes the plural functions is in creation and registration. In this way, it is also possible to edit flexibly the setting content of the first function that is combined in the workflow FW. Therefore, even though the workflow FW is created with a mistake in the setting item or the setting value of the first function, the user is free from recreating a new workflow FW.

The second function includes any one or more of the download function for downloading, from the cloud, the data to be used in the job of the first feature from the cloud, the upload function for uploading, to the cloud, the copy image data that is indicative of the execution result of the job of the first function, and the copy image transmission function for transmitting, to a designated destination, the copy image data that is indicative of the execution result of the job of the first function.

Thus, the collaboration of the first function and the second function that includes the download and upload functions which are related to the cloud service and the copy image transmission function will make it possible to operate the image forming device (the MFP 100).

In addition, the controller (operation control part 11, the panel control part 201, and the terminal control part 301), is configured to perform a control as to the calling operated workflow FW based on the format that is defined in the workflow FW, the format being either one of the formats: the format that causes the job to be executed immediately based on the data of the workflow FW, the wizard format that causes the setting value setting screens for the setting items to be displayed in a sequential manner, and the format that brings, when being called, the display input device 10 into a condition having the setting value that is defined by the workflow FW.

This will make it possible for the behavior of the workflow FW when being called to have diversity and selectivity. In addition, setting the workflow FW in a desired format will make it possible for the user to use the workflow FW in his/her desired mode.

Also, the image forming device (the MFP 100) according to the present exemplary embodiment includes the display input device 10 as described above. Thus, calling the workflow FW in which different functions are combined makes it possible to provide an image forming device that is capable of executing a job by collaborating the plural functions. Moreover, it is possible to provide an image forming device which is capable of confirming or editing the content of the workflow FW that collaborates the plural functions and of getting user desired job execution results in an easy way.

In summary, the present embodiment provides an easy confirmation of the setting content of the workflow when the workflow that combines plural functions or the workflow of a single function is in registration.

It is to be noted that the disclosed exemplary embodiments are illustrative in all respects and should not be understood in a restrictive manner. The scope of the invention is not by the description of the exemplary embodiments is defined by the following claims and by any equivalent modifications and variations that fall within the true spirit of the invention.

INDUSTRIAL APPLICABILITY

The present invention is applicable to a sheet feeding device for feeding papers by using a motor.

The invention claimed is:

1. A display input device that is configured to provide settings to an image forming device on which plural functions are mounted, the plural functions including basic functions each of which is available alone and combination functions each of which is available when being combined with one of the basic functions, the display input device comprising:

a display input part that is configured to display a screen and receive an operation;

a storage part that is configured to store data; and a control part that is configured to control a display operation of the display input part and recognize an operation conducted on the display input part, the control part being configured to cause the display input part to display a workflow creation and registration screen for creating and registering a workflow and to receive an operation for creating and registering the workflow, the workflow being of a combination of the basic function and the combination function, the workflow including data that is indicative of a first function selected from basic functions which is to be registered, setting contents of the first function, a second function selected from combination functions which is to be registered, and setting contents of the second function and the workflow combining the basic function and the combination function, the control part being configured to cause the display input part to display a workflow management screen for calling the registered workflow and to cause the workflow management screen to receive an operation that calls the registered workflow, the control part being configured to cause, when the control part recognizes that the operation for the registration of the workflow is conducted to the display input part, the storage part to store the workflow, the control part being configured to cause, when the control part recognizes that the operation of calling the workflow is conducted to the display input part, the image forming device to execute a job pursuant to the setting contents that are indicated by the data that is included in the called workflow, wherein the control part causes the display input part to display an item selection screen for receiving a selection of setting item whose current set value is to be changed, the setting item being among setting items of the basic function that is selected at an initiation of executing the job, the control causes the display input part to receive an operation for changing the set value of the selected setting item, causes the display input device to receive an operation for causing the image forming device to execute a job of the basic function whose setting content is set through the item selection screen, and transmits, when the control part recognizes that the display input part receives the operation for causing the image forming operation to execute the job of the basic function having data that is indicative of the content of the setting item of the basic function which is set through the item selection screen, wherein a workflow creation key is provided in the item selection screen, wherein the control part causes, when the control part recognizes that an operation is conducted on the workflow creation key, the display input part to switch a display screen from the item selection screen to the workflow creation and registration screen and recognizes that the basic function whose setting item is set through the item selection screen is selected as the first function, wherein the control part causes, when the control part causes the display input part to switch the display screen from the item selection screen to the workflow creation screen, the storage part to keep on storing the setting content that is set through the item selection screen as a setting content of the first function, wherein the control part causes, when the operation is conducted on the workflow creation key, the display input part to display a combination confirmation screen to select as the workflow creation and registration screen whether a creation and registration of the workflow having a combination of the basic function selected as the first function and the combination function or a creation and registration of the workflow having the basic function that is selected as the first function alone, and causes, when then control part recognizes the selection of the creation and registration of the workflow having a combination of the basic function and the combination function, the display input device to display the workflow creation and registration screen for creating and registering the workflow having the combination of the basic function and the combination function.

2. The display input device according the claim 1, wherein the control part causes, when the control part recognizes the selection of the creation and registration of the workflow having the combination of the basic function and the combination function, the display input part to display a template screen, as the workflow creation and registration screen, which is configured to receive a selection of the combination function to be combined to the first function and which is indicative of plural kinds of the combination functions, and wherein the control part causes, when one or more operations are made to the display input device for selecting one or more combination functions to be possibly combined with the first function, the display input part to display a content confirmation screen, as the workflow creation and registration screen, which is configured to confirm and change current setting contents of the respective first function and the second function as the combination function that is selected through the template screen.

3. The display input device according the claim 2, wherein one of the plural kinds of the functions is an online storage utilizing function, the online storage utilizing function including a download function that downloads data from a server to the image forming device and an upload function that uploads data from the image forming device to the server, and at least the download function and the upload function are displayed, as the options, on the template screen.

4. A display input device that is configured to provide settings to an image forming device on which plural functions are mounted which include basic functions each of which is available alone and combination functions each of which is available when being combined with one of the basic functions, the display input device comprising:

a display input part that is configured to display a screen and receive an operation;

a storage part that is configured to store data; and a control part that is configured to control a display operation of the display input part and recognize an operation of the display input part, the control part being configured to cause the display input device to display a workflow creation and registration screen to receive an operation for creating and registering a workflow that is a combination of the basic function and the combination function which include data that is indicative of a first function that is selected from the basic operations to be registered, setting contents of the first function, a second function that is selected from the combination functions to be registered, and setting contents of the second function, the control part being configured to cause the display input part to display a workflow management screen for receiving an operation for calling the registered workflow in order to call the registered workflow, the control part being configured to cause, when the control part recognizes that the operation for the registration of the workflow is made to the display input part, the storage part to store the workflow, the control part being configured to use a process that causes the image forming device to execute a job pursuant to the setting contents that are indicated by data that is included in the called workflow, when the control part recognizes that an operation for calling the workflow is conducted to the display input part, the control part causing the display input part to display an item selection screen for receiving a setting item whose current set value is to be changed, the setting item being among setting items of the basic function that is selected when the job is selected, causing the display input part to receive an operation for changing the set value of the selected setting item, causing the display input device to receive an operation for causing the image forming device to execute the with the basic function whose setting content is set through the item selection screen, and transmitting, when the control part recognizes that the display input device receives the operation for causing the image forming operation to execute the job, to a main control part of the image forming device, data that is indicative of the content of the setting item of the basic function which is set through the item selection screen, the item selection screen being provided with a workflow creation key for instructing an initiation of creating and registering the workflow in which the first function is the basic function whose setting content is set through the item selection screen, the workflow management screen being provided with a new registration key for instructing an initiation of newly creating and registering the workflow, the control part causing, even when either one of the control part recognizes that an operation is conducted on the workflow creation key and an operation is conducted on the workflow new registration key, the display input part to receive an operation for displaying a template screen during subsequent receipt of operations for creating and registering the workflow, the template screen being a screen for receiving an operation for the selection of one of the combination functions that is to be combined with the first function, the template screen being treated as the workflow creation and registration screen that is a screen for displaying the plural combination functions as options, wherein the control part causes, when an operation is conducted on the workflow creation key, the display input part to display a combination confirmation screen to receive a selection of whether a creation and registration of the workflow having a combination of the basic function selected as the first function and the combination function or a creation and registration of the workflow having the basic function alone, and causes the display input device, when the control part recognizes the selection of the creation and registration of the workflow having a combination of the basic function and the combination function, to display the template screen.

5. The display input device according the claim 4, wherein, when an operation for selecting a combination function that is capable of being combined with the first function is made, to the display input part that displays the template screen, the control part causes the display input part to display a content confirmation screen, as the workflow creation and registration screen, for confirming and changing current setting contents of the respective first and second functions that are selected through the template screen as the combination functions.

6. A display input device that is configured to provide settings to an image forming device on which plural functions are mounted which include basic functions each of which is available alone and combination functions each of which is available when being combined with one of the basic functions, the display input device comprising:
    a display input part that is configured to display a screen and receive an operation;
    a storage part that is configured to store data; and
    a control part that is configured to control a display operation of the display input device and recognize the operation manipulated to the display input part,
    the control part being configured to instruct the display input device to display a workflow creation and registration screen to receive operations for creating and registering a workflow, the workflow being a combination of the basic function and the combination function which include data that is indicative of a first function that is selected from the basic operations to be registered function, setting contents of the first function, a second function that is selected from the combination functions to be registered, and setting contents of the second function, the control part being configured to instruct the display input device to display a workflow management screen for calling the registered workflow in order to call the registered workflow,
    the control part being configured to cause, when the operation for the registration of the workflow is made to the display input device, the storage part to store the workflow, the control part being configured to use a process that causes the image forming device to execute a job pursuant to the setting contents that are indicated by data that is included in the called workflow, when the control part recognizes that an operation for calling the workflow is conducted to the display input part,
    the control part causing the display input part to display an item selection screen for receiving a selection of a setting item whose current value is to be changed, the setting item being among setting items of the basic function which are selected upon execution of the job, causing the display input part to receive an operation for changing the setting value of the selected setting item, causing the display input part to receive an operation for causing the image forming device to execute a job of the basic function whose setting content is set through the item selection screen, transmitting data that is indicative of the setting content that is set through the item selection screen to a main control part of the image forming device when the control part recognizes that the display input device receives the operation for executing the job,
    the control part causing, at a job receiving time that is defined as a time at which the display part receives the operation for causing the image forming device to execute the job of the basic function whose setting item is set through the item selection screen, in a case where no workflow is registered at the job receiving time which includes data that is indicative of the setting content of the basic function which is set through the item selection screen, after the job receiving time, the display input device to display workflow registration information whose gist is to notify that the setting content of the basic function which is set through the item selection screen at the job receiving time can be registered as the workflow,
    wherein in a case where the workflow is registered whose basic function alone includes data that is indicative of setting content of the basic function which is set through the item selection screen at the job receiving time, but among combination patterns each of which is a combination of the basic function and the combination function is not still registered whose setting content of the basic function is set through the item selection screen at the job receiving time, after the receiving time, the control part causes the display input device to display workflow registration information whose gist is to notify that as the workflow registration information the workflow that is a combination of the basic function and the combination function whose setting content of the basic function which is set through the item selection screen as of the job receiving time can be registered as the workflow.

7. A display input device that is configured to provide settings to an image forming device on which plural functions are mounted which include basic functions each of which is available alone and combination functions each of which is available when being combined with one of the basic functions, the display input device comprising:
    a display input part that is configured to display a screen and receive an operation;
    a storage part that is configured to store data; and
    a control part that is configured to control a display operation of the display input device and recognize the operation manipulated to the display input part,
    the control part being configured to instruct the display input device to display a workflow creation and registration screen to receive operations for creating and registering a workflow, the workflow being a combination of the basic function and the combination function which include data that is indicative of a first function that is selected from the basic operations to be registered function, setting contents of the first function, a second function that is selected from the combination functions to be registered, and setting contents of the second function, the control part being configured to instruct the display input device to display a workflow management screen for calling the registered workflow in order to call the registered workflow,
    the control part being configured to cause, when the operation for the registration of the workflow is made to the display input device, the storage part to store the workflow, the control part being configured to use a process that causes the image forming device to execute a job pursuant to the setting contents that are indicated by data that is included in the called workflow, when the control part recognizes that an operation for calling the workflow is conducted to the display input part,
    the control part causing the display input part to display an item selection screen for receiving a selection of a setting item whose current value is to be changed, the setting item being among setting items of the basic function which are selected upon execution of the job, causing the display input part to receive an operation for changing the setting value of the selected setting item, causing the display input part to receive an operation for causing the image forming device to execute a job of the basic function whose setting content is set through the item selection screen, transmitting data that is indicative of the setting content that is set through the item selection screen to a main control part of the image forming device when the control part recognizes that the display input device receives the operation for executing the job, the control part causing, at a job receiving time that is defined as a time at which the display part receives the operation for causing the image forming device to execute the job of the basic function whose setting item is set through the item selection screen, in a case where no workflow is registered at the job receiving time which includes data that is indicative of the setting content of the basic function which is set through the item selection screen, after the job receiving time, the display input device to display workflow registration information whose gist is to notify that the setting content of the basic function which is set through the item selection screen at the job receiving time can be registered as the workflow, wherein in a case where the workflow is not registered whose basic function alone includes setting content of the basic function which is set through the item selection screen at the job receiving time, but all combination patterns among combination patterns each of which is a combination of the basic function and the combination function is already registered whose setting content of the basic function is set through the item selection screen at the job receiving time, the control part causes the display input device to display workflow registration information whose gist is to notify that as the workflow registration information the workflow having the basic function alone after the job receiving time can be registered.

8. The display input device according to claim 6, wherein the item selection screen is provided thereon with a workflow creation key that switches a display screen from the item selection screen to the workflow creation screen, and the control part causes the display input device to display the workflow registration information after the job reception time as the workflow.

9. The display input device according to claim 6, wherein the control part causes, when the control part recognizes the selection of the creation and registration of the workflow having a combination of the basic function and the combination function, display of a template screen, as the workflow creation and registration screen, which is configured to receive a selection of the combination function to be combined to the first function and which is indicative of plural kinds of the combination functions, and wherein the control part causes, when one or more operations are made to the display input device for selecting one or more combination functions to be combined with the first function, display of a content confirmation screen, as the workflow creation and registration screen, which is configured to confirm and change current setting contents of the respective first function and the second function as the combination function that is selected through the template screen.

10. A display input device comprising:

a storage part that is configured to store a workflow, the workflow being created and registered by a user, the workflow being for executing a job pursuant to a setting that is included in the workflow when the workflow is called;

a display input part that includes a display part that is configured to display a screen and a touch panel part that is configured to receive an operation of the user by detecting a touching on a display position; and a control part that is configured to recognize a setting operation by the user based on an output from the display input device and to recognize a calling operation for determining a workflow to be called from among the workflows registered in the storage part, the display being configured to display a new registration key for an initiation instruction of a new creation and registration of a workflow by selecting function, setting item and setting value from first, the control part, during the creation and registration of the new workflow due to a recognition of an operation that is conducted on the new registration key, recognizing a first function that is selected as a function to be used in the newly created workflow from among a plurality of pre-specified functions, and the setting item and the setting value both are selected in the first function, as setting contents of the first function, the control part causing the display input part to display a template screen that is configured to select a combination function from among specified combination functions which is to be combined with the first function, the control part recognizing a second function that is the combination function selected through the template screen based on the output from the display input device and setting contents of the second function, and the control part being configured to cause the storage part to register data of the setting content of the first function as the new workflow in the storage part when the second function is not selected, and to cause the storage part to register data of the setting content of the first function and the setting content of the second function as the new workflow when the setting content data of the first function is registered and the second function is selected, wherein one of the combination functions is an upload function for uploading copy image data that is indicative of the job result of the first function to a cloud, and the control part recognizes the selection of the upload function during the creation and registration of the new workflow and a path of an upload destination that is setting inputted, causes the storage part to register the workflow that includes data indicating the path of the upload destination, causes the image forming device, as an operation subject, to execute a job to which the setting content of the calling operated workflow is applied setting content of the first function when the upload function is combined with the calling operated workflow, and causes the image forming device to transmit a copy image data indicating the execution result of the job of the first function to a location that is indicated by the path of the upload destination.

11. The display input device according to claim 10, wherein one of the combination functions is a download function for downloading data to be used from a cloud, the control part recognizes the selection of the download function during the creation and registration of the new workflow and a path of a download source that is setting inputted, causes the storage part to register the workflow that includes data indicating the path of the download source, causes the image forming device, as an operation subject, from a location indicated by the path to download the data to be used in the job from a location indicated by the path of the download source that is specified by the calling operated workflow when the download function is combined with the calling operated workflow, and causes the image forming device to execute the job using the downloaded data to which is applied the setting content of the first function of the calling operated workflow.

12. The display input device according to claim 10, wherein
one of the combination functions is a copy image data transmission function for transmitting copy data that is indicative of an execution result of the job of the first function,
the control part recognizes the selection of the copy data transmission function during the creation and registration of the new workflow and a set inputted destination of the copy data, causes the storage part to register the workflow that includes data indicating the destination, causes the image forming device to execute a job to which the setting content of the first function of the calling operated workflow is applied, as an operation subject when the copy image transmission function is combined to the calling operated workflow, and causes the image forming device to transmit the copy image data to the destination.

13. The display input device according to claim 10, wherein the display input part displays an initial screen as an uppermost layer of setting screens, displays a workflow management screen that is capable of calling the workflow as a next lower hierarchy level screen than the initial screen, and displays the new registration key on either one or both of the workflow management screen and the initial screen.

14. The display input device according to claim 10, wherein the control part causes the display input part to display a utilization format setting screen for determining how to use the workflow while the workflow is in the new creation and registration process, and recognizes a format that is selected from a format that brings a job execution immediately when being called, a format that displays, when being called, each of setting value setting items of the first format sequentially in a wizard format, and a format that causes the display input device to be in a condition that is set by workflow defined setting values.

15. An image forming device comprising the display input device according to claim 1.

* * * * *